(12) United States Patent
Tsusaka

(10) Patent No.: US 8,290,621 B2
(45) Date of Patent: Oct. 16, 2012

(54) CONTROL APPARATUS AND CONTROL METHOD FOR ROBOT ARM, ROBOT, CONTROL PROGRAM FOR ROBOT ARM, AND ROBOT ARM CONTROL-PURPOSE INTEGRATED ELECTRONIC CIRCUIT

(75) Inventor: Yuko Tsusaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/416,660

(22) Filed: Mar. 9, 2012

(65) Prior Publication Data

US 2012/0173021 A1 Jul. 5, 2012

Related U.S. Application Data

(60) Division of application No. 13/096,376, filed on Apr. 28, 2011, now Pat. No. 8,175,750, which is a continuation of application No. PCT/JP2010/005705, filed on Sep. 21, 2010.

(30) Foreign Application Priority Data

Sep. 28, 2009 (JP) .................................. 2009-222378

(51) Int. Cl.
*G05B 19/18* (2006.01)
*G05B 19/00* (2006.01)
(52) U.S. Cl. ........ 700/257; 700/250; 700/253; 700/259; 700/260; 700/261; 901/4; 901/47
(58) Field of Classification Search .................. None
See application file for complete search history.

(56) References Cited

U.S. PATENT DOCUMENTS

| 4,589,810 | A | 5/1986 | Heindl et al. |
|---|---|---|---|
| 5,495,410 | A | 2/1996 | Graf |
| 5,880,956 | A | 3/1999 | Graf |
| 6,285,920 | B1 | 9/2001 | McGee et al. |
| 6,385,508 | B1 | 5/2002 | McGee et al. |
| 2005/0102066 | A1 | 5/2005 | Watanabe et al. |
| 2010/0286826 | A1 | 11/2010 | Tsusaka et al. |

FOREIGN PATENT DOCUMENTS

| EP | 0 416 123 | 3/1991 |
|---|---|---|
| JP | 59-157715 | 9/1984 |
| JP | 1-146645 | 6/1989 |

(Continued)

OTHER PUBLICATIONS

International Preliminary Report on Patentability issued Apr. 19, 2012 in International (PCT) Application No. PCT/JP2010/005705.

(Continued)

*Primary Examiner* — Khoi Tran
*Assistant Examiner* — Bao Long T Nguyen
(74) *Attorney, Agent, or Firm* — Wenderoth, Lind & Ponack, L.L.P.

(57) ABSTRACT

Motion information of a robot arm stored in a motion information database is acquired. A person manipulates the robot arm, and correction motion information at the time of the motion correction is acquired. An acquiring unit acquires environment information. A motion correction unit corrects the motion information while the robot arm is in motion. A control rule generating unit generates a control rule for allowing the robot arm to automatically operate based on the corrected motion information and the acquired environment information. The motion of the robot arm is controlled based on the generated control rule.

12 Claims, 47 Drawing Sheets

FOREIGN PATENT DOCUMENTS

| | | |
|---|---|---|
| JP | 2-250782 | 10/1990 |
| JP | 6-190753 | 7/1994 |
| JP | 9-325806 | 12/1997 |
| JP | 10-254527 | 9/1998 |
| JP | 10-307617 | 11/1998 |
| JP | 2000-176869 | 6/2000 |
| JP | 2002-120174 | 4/2002 |
| JP | 2003-305678 | 10/2003 |
| JP | 2004-49731 | 2/2004 |
| JP | 2004-148466 | 5/2004 |
| JP | 2005-148789 | 6/2005 |
| JP | 2006-82185 | 3/2006 |
| JP | 2007-190662 | 8/2007 |
| JP | 2009-181526 | 8/2009 |
| WO | 2009/107358 | 9/2009 |

OTHER PUBLICATIONS

International Search Report issued Nov. 2, 2010 in International (PCT) Application No. PCT/JP2010/005705.

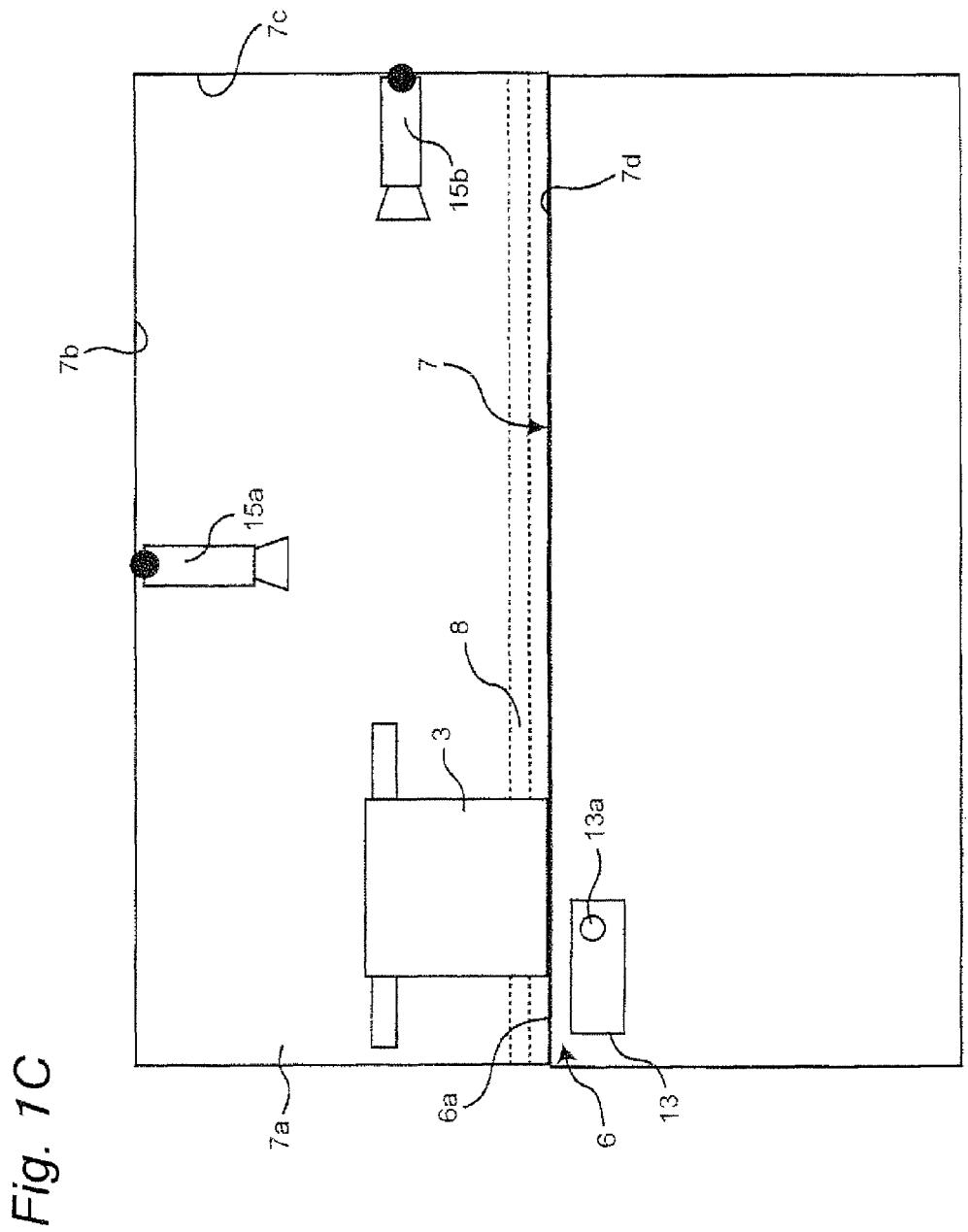

Fig. 5A

| MOTION ID | KEY MOTION ID | POSITION ORIENTATION (m) $(x, y, z, \phi, \theta, \psi)$ | FORCE (N) $(f_x, f_y, f_z, f_\phi, f_\theta, f_\psi)$ | FLAG (32 BITS) | HAND | TIME (sec) | CORRECTION PARAMETER FLAG (32 BITS) |
|---|---|---|---|---|---|---|---|
| 1 | 1 | 0.1, 0.1, 0, 0, 0, 0 | 0, 0, 5, 0, 0, 0 | BIT 0, 1, 3, 4, 5, 8: 1 | 1 | 0.37 | BIT 0, 1, 8: 1, REMAINDER: 0 |
| 1 | 2 | 0.1, 0.2, 0, 0, 0, 0 | 0, 0, 5, 0, 0, 0 | BIT 0, 1, 3, 4, 5, 8: 1 | 1 | 0.2 | BIT 0, 1, 8: 1, REMAINDER: 0 |
| : | : | : | : | : | : | : | : |
| 1 | 8 | 0.2, 0.1, 0, 0, 0, 0 | 0, 0, 5, 0, 0, 0 | BIT 0, 1, 3, 4, 5, 8: 1 | 1 | 0.37 | BIT 0, 1, 8: 1, REMAINDER: 0 |
| : | : | : | : | : | : | : | : |
| 2 | 10 | 0.1, 0.1, 0.4, 0, 0, 0 | 0, 0, 0, 0, 0, 0 | BIT 0-5: 1, REMAINDER: 0 | 1 | 0.3 | BIT 0, 1, 2: 1, REMAINDER: 0 |
| : | : | : | : | : | : | : | : |
| 2 | 17 | 0.2, 0.2, 0.4, 0, 0, 0 | 0, 0, 0, 0, 0, 0 | BIT 0-5: 1, REMAINDER: 0 | 1 | 0.15 | BIT 0, 1, 2: 1, REMAINDER: 0 |
| : | : | : | : | : | : | : | : |

Fig. 5B

| MOTION ID | KEY MOTION ID | POSITION ORIENTATION (m) (x, y, z, φ, θ, ψ) | FORCE (N) (fx, fy, fz, fφ, fθ, fψ) | FLAG (32 BITS) | HAND | TIME (sec) | CORRECTION PARAMETER FLAG (32 BITS) |
|---|---|---|---|---|---|---|---|
| 1 | 1 | 0.1,0.1,0,0,0,0 | 0,0,5,0,0,0 | BIT 0, 1, 3, 4, 5, 8: 1 | 1 | 0.37 | BIT 0, 1, 8: 1, REMAINDER: 0 |
| 1 | 2 | 0.1,0.2,0,0,0,0 | 0,0,5,0,0,0 | BIT 0, 1, 3, 4, 5, 8: 1 | 1 | 0.2 | BIT 0, 1, 8: 1, REMAINDER: 0 |
| : | : | : | : | : | : | : | : |
| 1 | 8 | 0.2,0.1,0,0,0,0 | 0,0,5,0,0,0 | BIT 0, 1, 3, 4, 5, 8: 1 | 1 | 0.37 | BIT 0, 1, 8: 1, REMAINDER: 0 |
| : | : | : | : | : | : | : | : |
| 2 | 10 | 0.1,0.1,0.4,0,0,0 | 0,0,0,0,0,0 | BIT 0-5: 1, REMAINDER: 0 | 1 | 0.3 | BIT 0, 1, 2: 1, REMAINDER: 0 |
| : | : | : | : | : | : | : | : |
| 2 | 17 | 0.2,0.2,0.4,0,0,0 | 0,0,0,0,0,0 | BIT 0-5: 1, REMAINDER: 0 | 1 | 0.15 | BIT 0, 1, 2: 1, REMAINDER: 0 |
| : | : | : | : | : | : | : | : |
| 3 | 20 | 0.3,0.3,0.4,0,0,0 | 0,0,0,0,0,0 | BIT 0-1: 1, REMAINDER: 0 | 1 | 0.37 | BIT 0, 1, 2: 1, REMAINDER: 0 |
| : | : | : | : | : | : | : | : |
| 3 | 31 | 0.4,0.4,0.4,0,0,0 | 0,0,0,0,0,0 | BIT 0-1: 1, REMAINDER: 0 | 1 | 0.3 | BIT 0, 1, 2: 1, REMAINDER: 0 |

Fig.5C

| MOTION ID | KEY MOTION ID | POSITION ORIENTATION (m) (x, y, z, φ, θ, ψ) | FORCE (N) (fx, fy, fz, fφ, fθ, fψ) | FLAG (32 BITS) | HAND | TIME (sec) | CORRECTION PARAMETER FLAG (32 BITS) |
|---|---|---|---|---|---|---|---|
| 1 | 1 | 0.1, 0.1, 0, 0, 0, 0 | 0, 0, 5, 0, 0, 0 | BIT 0, 1, 3, 4, 5, 8: 1 | 1 | 0.37 | BIT 0, 1, 8: 1, REMAINDER: 0 |
| 1 | 2 | 0.1, 0.2, 0, 0, 0, 0 | 0, 0, 5, 0, 0, 0 | BIT 0, 1, 3, 4, 5, 8: 1 | 1 | 0.2 | BIT 0, 1, 8: 1, REMAINDER: 0 |
| : | : | : | : | : | : | : | : |
| 1 | 8 | 0.2, 0.1, 0, 0, 0, 0 | 0, 0, 5, 0, 0, 0 | BIT 0, 1, 3, 4, 5, 8: 1 | 1 | 0.37 | BIT 0, 1, 8: 1, REMAINDER: 0 |
| 2 | 10 | 0.1, 0.1, 0.4, 0, 0, 0 | 0, 0, 0, 0, 0, 0 | BIT 0-5: 1, REMAINDER: 0 | 1 | 0.3 | BIT 0, 1, 2: 1, REMAINDER: 0 |
| : | : | : | : | : | : | : | : |
| 2 | 17 | 0.2, 0.2, 0.4, 0, 0, 0 | 0, 0, 0, 0, 0, 0 | BIT 0-5: 1, REMAINDER: 0 | 1 | 0.15 | BIT 0, 1, 2: 1, REMAINDER: 0 |
| 3 | 20 | 0.3, 0.3, 0.4, 0, 0, 0 | 0, 0, 0, 0, 0, 0 | BIT 0-1: 1, REMAINDER: 0 | 1 | 0.37 | BIT 0, 1, 8: 1, REMAINDER: 0 |
| 3 | 31 | 0.4, 0.4, 0.4, 0, 0, 0 | 0, 0, 0, 0, 0, 0 | BIT 0-1: 1, REMAINDER: 0 | 1 | 0.3 | BIT 0, 1, 2: 1, REMAINDER: 0 |
| 4 | 32 | 0.2, 0.3, 0, 0, 0, 0 | 0, 0, 8, 0, 0, 0 | BIT 0, 1, 8: 1, REMAINDER: 0 | 1 | 0.37 | BIT 0, 1, 8: 1, REMAINDER: 0 |
| : | : | : | : | : | : | : | : |
| 4 | 38 | 0.3, 0.3, 0, 0, 0, 0 | 0, 0, 8, 0, 0, 0 | BIT 0, 1, 8: 1, REMAINDER: 0 | 1 | 0.37 | BIT 0, 1, 8: 1, REMAINDER: 0 |

Fig.6

| | | | | | | | | | | | | | | | | | | | |
|---|---|---|---|---|---|---|---|---|---|---|---|---|---|---|---|---|---|---|---|
| | x | y | z | φ | θ | ψ | $f_x$ | $f_y$ | $f_z$ | $f_\phi$ | $f_\theta$ | $f_\psi$ | | | UNUSED | | | | |
| BIT NUMBER | 0 | 1 | 2 | 3 | 4 | 5 | 6 | 7 | 8 | 9 | 10 | 11 | 12 | 13 | 14 | 15 | 16 | 17 | 18 | ... | 31 |
| VALUE | 1 | 1 | 0 | 1 | 1 | 1 | 0 | 0 | 1 | 0 | 0 | 0 | 0 | 0 | 0 | 0 | | | | ... | 0 |

POSITION & ORIENTATION: bits 0–5
FORCE: bits 6–11

Fig.7

| BIT NUMBER | 0 | 1 | 2 | 3 | 4 | 5 | 6 | 7 | 8 | 9 | 10 | 11 | 12 | 13 | 14 | 15 | 16 | 17 | 18 | ... | 31 |
|---|---|---|---|---|---|---|---|---|---|---|---|---|---|---|---|---|---|---|---|---|---|
| | x | y | z | $\phi$ | $\theta$ | $\psi$ | $f_x$ | $f_y$ | $f_z$ | $f_\phi$ | $f_\theta$ | $f_\psi$ | | | | | | | | | |
| | POSITION & ORIENTATION | | | | | | FORCE | | | | | | UNUSED | | | | | | | | |
| VALUE | 0 | 1 | 0 | 1 | 1 | 1 | 0 | 0 | 1 | 0 | 0 | 0 | 0 | 0 | 0 | 0 | | | ... | | 0 |

Fig.9A

| ENVIRONMENT ID | IMAGE ID | IMAGE PICKUP APPARATUS ID | FORCE (N) $(f_x, f_y, f_z, f_\phi, f_\theta, f_\psi)$ | FLAG (32 BITS) |
|---|---|---|---|---|
| 1 | IMAGE 1 | 1 | 0,0,5,0,0,0 | BIT 6: 1 REMAINDER: |
| 2 | IMAGE 2 | 2 | 0,0,5,0,0,0 | BIT 6: 1 REMAINDER: |
| . . | . . | | . . | . . |
| 10 | IMAGE 3 | 1 | . . | BIT 6: 1 REMAINDER: 0 |
| 11 | IMAGE 4 | 1 | 2,3,5,3,3,3 | BIT 0-6: 1 |
| . . | . . | | . . | . . |
| 20 | IMAGE 5 | 2 | . . | BIT 6: 1 REMAINDER: 0 |
| 21 | IMAGE 6 | 2 | . . | BIT 6: 1 REMAINDER: 0 |
| . . | . . | | . . | . . |
| 30 | IMAGE 7 | 2 | 4,1,5,0,3,6 | BIT 6: 1 REMAINDER: 0 |
| 31 | . . | . . | 4,1,8,0,3,6 | BIT 0-5: 1 REMAINDER: 0 |
| 32 | . . | . . | 2,1,11,0,2,5 | BIT 0-5: 1 REMAINDER: 0 |
| 33 | IMAGE 8, IMAGE 9 | 1,2 | . . | BIT 6: 1 REMAINDER: 0 |
| . . | . . | | . . | . . |

Fig. 9B

| | $f_x$ | $f_y$ | $f_z$ | $f_\phi$ | $f_\theta$ | $f_\psi$ | 1 | | | | | | | | | | | | | |
|---|---|---|---|---|---|---|---|---|---|---|---|---|---|---|---|---|---|---|---|---|
| BIT NUMBER | 0 | 1 | 2 | 3 | 4 | 5 | 6 | 7 | 8 | 9 | 10 | 11 | 12 | 13 | 14 | 15 | 16 | 17 | 18 | ... | 31 |
| VALUE | 0 | 1 | 0 | 0 | 0 | 0 | 1 | 0 | 0 | 0 | 0 | 0 | 0 | 0 | 0 | 0 | 0 | 0 | 0 | ... | 0 |

FORCE: bits 0–5 ($f_x, f_y, f_z, f_\phi, f_\theta, f_\psi$)
IMAGE: bit 6
UNUSED: bits 7–31

Fig.10A

| TASK ID | ENVIRONMENT ID | MOTION ID | PROGRESS INFORMATION |
|---|---|---|---|
| 1 | -1 | 1 | 1 |
| 2 | -1 | 2 | 0 |
| 3 | -1 | 11 | 0 |
| 3 | 20 | 12 | 0 |
| 4 | -1 | 21 | 0 |
| 4 | 30 | 22 | 0 |
| 4 | 31 | 23 | 0 |
| .. | .. | .. | .. |

MOTION INFORMATION DATABASE (FIGS. 5, 22, AND 32)

ENVIRONMENT INFORMATION DATABASE (FIG. 9A)

| TASK ID | ENVIRONMENT ID | MOTION ID | PROGRESS INFORMATION |
|---|---|---|---|
| 1 | -1 | 1 | 1 |
| 1 | 11 | 4 | 0 |
| 2 | -1 | 2 | 0 |
| 2 | 10 | 3 | 0 |
| 3 | -1 | 11 | 0 |
| 3 | 20 | 12 | 0 |
| 3 | 21 | 13 | 0 |
| 4 | -1 | 21 | 0 |
| 4 | 30 | 22 | 0 |
| 4 | 31 | 23 | 0 |
| 4 | 32 | 24 | 0 |
| .. | .. | .. | .. |

MOTION INFORMATION DATABASE (FIGS. 5, 22, AND 32)

ENVIRONMENT INFORMATION DATABASE (FIG. 9A)

Fig.11A

| CONTROL MODE | ENVIRONMENT INFORMATION TYPE ID |
|---|---|
| POSITION CONTROL MODE | 1 |
| FORCE CONTROL MODE | 2 |
| IMPEDANCE CONTROL MODE | 1 |
| HIGH-RIGIDITY POSITION CONTROL MODE | 2 |

Fig.11B

| ENVIRONMENT INFORMATION TYPE ID | TYPE |
|---|---|
| 1 | IMAGE |
| 2 | FORCE |

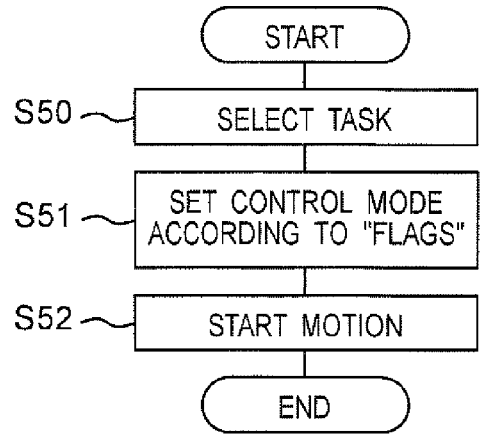
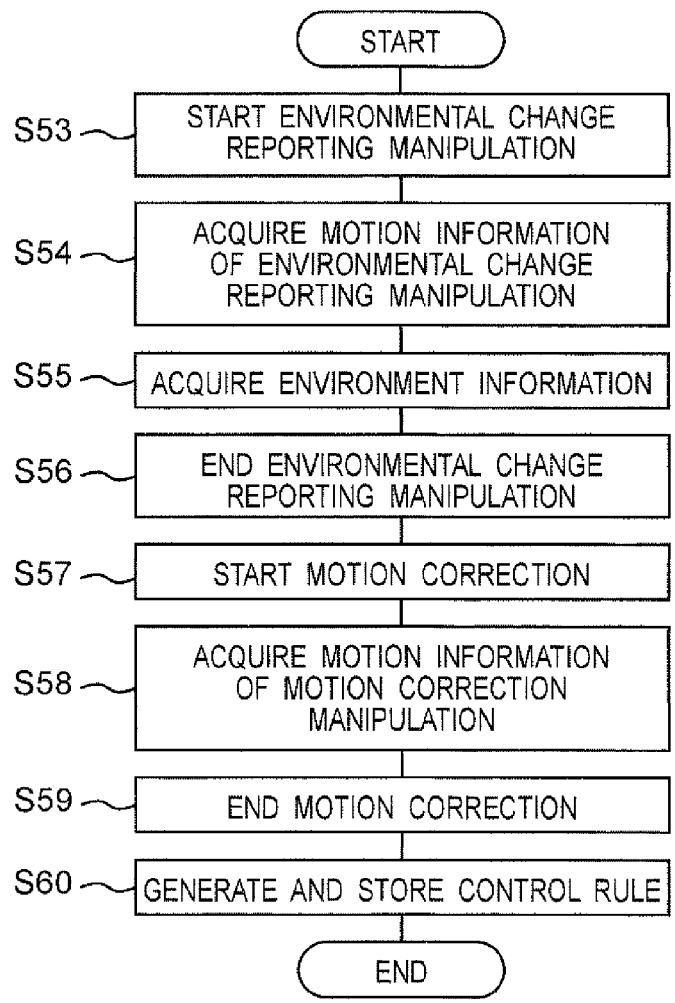

Fig.22A

| MOTION ID | KEY MOTION ID | POSITION ORIENTATION (m) (x, y, z, φ, θ, ψ) | FORCE (N) (fx, fy, fz, fφ, fθ, fψ) | FLAG (32 BITS) | HAND | TIME (sec) | CORRECTION PARAMETER FLAG (32 BITS) |
|---|---|---|---|---|---|---|---|
| : | : | : | : | : | : | : | : |
| 11 | 41 | 0.1, 0.1, 0, 0, 0, 0 | 0, 0, 0, 0, 0, 0 | BIT 0-5: 1 | 1 | 0.37 | BIT 0, 1, 2: 1, REMAINDER: 0 |
| 11 | 42 | 0.1, 0.2, 0, 0, 0, 0 | 0, 0, 0, 0, 0, 0 | BIT 0-5: 1 | 1 | 0.37 | BIT 0, 1, 2: 1, REMAINDER: 0 |
| : | : | : | : | : | : | : | : |
| 11 | 48 | 0.2, 0.1, 0, 0, 0, 0 | 0, 0, 0, 0, 0, 0 | BIT 0-5: 1 | 1 | 0.37 | BIT 0, 1, 2: 1, REMAINDER: 0 |
| 12 | 50 | 0.1, 0.1, 0.4, 0, 0, 0 | 0, 0, 5, 0, 0, 0 | BIT 0, 1, 3, 4, 5, 8,, 12, 13, 15, 16, 17: 1, REMAINDER:0 | 1 | 0.37 | BIT 8: 1, REMAINDER: 0 |
| : | : | : | : | : | : | : | : |
| 12 | 57 | 0.2, 0.2, 0.4, 0, 0, 0 | 0, 0, 5, 0, 0, 0 | BIT 0, 1, 3, 4, 5, 8,, 12, 13, 15, 16, 17: 1, REMAINDER:0 | 1 | 0.37 | BIT 8: 1, REMAINDER: 0 |
| : | : | : | : | : | : | : | : |

Fig.22B

| MOTION ID | KEY MOTION ID | POSITION ORIENTATION (m) (x, y, z, φ, θ, ψ) | FORCE (N) (fx, fy, fz, fφ, fθ, fψ) | FLAG (32 BITS) | HAND | TIME (sec) | CORRECTION PARAMETER FLAG (32 BITS) |
|---|---|---|---|---|---|---|---|
| ... | ... | ... | ... | ... | ... | ... | ... |
| 11 | 41 | 0.1, 0.1, 0, 0, 0, 0 | 0,0,0,0,0,0 | BIT 0-5: 1 | 1 | 0.37 | BIT 0, 1, 2: 1, REMAINDER: 0 |
| 11 | 42 | 0.1, 0.2, 0, 0, 0, 0 | 0,0,0,0,0,0 | BIT 0-5: 1 | 1 | 0.37 | BIT 0, 1, 2: 1, REMAINDER: 0 |
| ... | ... | ... | ... | ... | ... | ... | ... |
| 11 | 48 | 0.2, 0.1, 0, 0, 0, 0 | 0,0,0,0,0,0 | BIT 0-5: 1 | 1 | 0.37 | BIT 0, 1, 2: 1, REMAINDER: 0 |
| ... | ... | ... | ... | ... | ... | ... | ... |
| 12 | 50 | 0.1, 0.1, 0.4, 0, 0, 0 | 0,0,5,0,0,0 | BIT 0, 1, 3, 4, 5, 8,,12, 13, 15, 16, 17: 1, REMAINDER:0 | 1 | 0.37 | BIT 8: 1, REMAINDER: 0 |
| ... | ... | ... | ... | ... | ... | ... | ... |
| 12 | 57 | 0.2, 0.2, 0.4, 0, 0, 0 | 0,0,5,0,0,0 | BIT 0, 1, 3, 4, 5, 8,,12, 13, 15, 16, 17: 1, REMAINDER:0 | 1 | 0.37 | BIT 8: 1, REMAINDER: 0 |
| ... | ... | ... | ... | ... | ... | ... | ... |
| 13 | 60 | 0.3, 0.3, 0.4, 0, 0, 0 | 0,0,0,0,0,0 | BIT 0-2:1, REMAINDER: 0 | 1 | 0.37 | BIT 0, 1, 2: 1, REMAINDER: 0 |
| 13 | 67 | 0.4, 0.4, 0.4, 0, 0, 0 | 0,0,0,0,0,0 | BIT 0-2:1, REMAINDER: 0 | 1 | 0.37 | BIT 0, 1, 2: 1, REMAINDER: 0 |
| ... | ... | ... | ... | ... | ... | ... | ... |

Fig. 23

| BIT NUMBER | VALUE | |
|---|---|---|
| x | 0 | 1 |
| y | 1 | 1 |
| z | 2 | 0 |
| $\phi$ | 3 | 1 |
| $\theta$ | 4 | 1 |
| $\psi$ | 5 | 1 |
| $f_x$ | 6 | 0 |
| $f_y$ | 7 | 0 |
| $f_z$ | 8 | 1 |
| $f_\phi$ | 9 | 0 |
| $f_\theta$ | 10 | 0 |
| $f_\psi$ | 11 | 0 |
| $s_x$ | 12 | 0 |
| $s_y$ | 13 | 0 |
| $s_z$ | 14 | 0 |
| $s_\phi$ | 15 | 0 |
| $s_\theta$ | 16 | |
| $s_\psi$ | 17 | |
| UNUSED | 18 | |
| ... | ... | |
| | 31 | 0 |

- Bits x, y, z, $\phi$, $\theta$, $\psi$: POSITION & ORIENTATION
- Bits $f_x$, $f_y$, $f_z$, $f_\phi$, $f_\theta$, $f_\psi$: FORCE
- Bits $s_x$, $s_y$, $s_z$, $s_\phi$, $s_\theta$, $s_\psi$: POSITION & ORIENTATION (STOP)

Fig. 32A

| MOTION ID | KEY MOTION ID | POSITION ORIENTATION (m) (x, y, z, φ, θ, ψ) | FORCE (N) (fx, fy, fz, fφ, fθ, fψ) | FLAG (32 BITS) | HAND | TIME (sec) | CORRECTION PARAMETER FLAG (32 BITS) |
|---|---|---|---|---|---|---|---|
| : | : | : | : | : | : | : | : |
| 21 | 61 | 0.1, 0.1, 0, 0, 0, 0 | 0, 0, 0, 0, 0, 0 | BIT 0-5: 1 | 1 | 0.37 | BIT 0, 1, 2: 1, REMAINDER: 0 |
| 21 | 62 | 0.1, 0.2, 0, 0, 0, 0 | 0, 0, 0, 0, 0, 0 | BIT 0-5: 1 | 1 | 0.37 | BIT 0, 1, 2: 1, REMAINDER: 0 |
| : | : | : | : | : | : | : | : |
| 21 | 68 | 0.2, 0.1, 0, 0, 0, 0 | 0, 0, 0, 0, 0, 0 | BIT 0-5: 1 | 1 | 0.37 | BIT 0, 1, 2: 1, REMAINDER: 0 |
| : | : | : | : | : | : | : | : |
| 22 | 70 | 0.1, 0.1, 0.4, 0, 0, 0 | 0, 0, 5, 0, 0, 0 | BIT 0, 1, 3, 4, 5, 8, 12, 13, 15, 16, 17: 1, REMAINDER: 0 | 1 | 0.37 | BIT 8: 1, REMAINDER: 0 |
| : | : | : | : | : | : | : | : |
| 22 | 77 | 0.2, 0.2, 0.4, 0, 0, 0 | 0, 0, 5, 0, 0, 0 | BIT 0, 1, 3, 4, 5, 8, 12, 13, 15, 16, 17: 1, REMAINDER: 0 | 1 | 0.37 | BIT 8: 1, REMAINDER: 0 |
| : | : | : | : | : | : | : | : |
| 23 | 78 | 0.2, 0.2, 0.4, 0, 0, 0 | 0, 0, 10, 0, 0, 0 | BIT 0, 1, 3, 4, 5, 8, 12, 13, 15, 16, 17: 1, REMAINDER: 0 | 1 | 0.37 | BIT 8: 1, REMAINDER: 0 |
| : | : | : | : | : | : | : | : |
| 23 | 86 | 0.2, 0.2, 0.9, 0, 0, 0 | 0, 0, 10, 0, 0, 0 | BIT 0, 1, 3, 4, 5, 8, 12, 13, 15, 16, 17: 1, REMAINDER: 0 | 1 | 0.37 | BIT 8: 1, REMAINDER: 0 |
| : | : | : | : | : | : | : | : |

Fig. 32B

| MOTION ID | KEY MOTION ID | POSITION ORIENTATION (x, y, z, φ, θ, ψ) | FORCE (N) (fx, fy, fz, fφ, fθ, fψ) | FLAG (32 BITS) | HAND | TIME (sec) | CORRECTION PARAMETER FLAG (32 BITS) |
|---|---|---|---|---|---|---|---|
| ... | ... | ... | ... | ... | ... | ... | ... |
| 21 | 61 | 0.1,0.1,0,0,0,0 | 0,0,0,0,0,0 | BIT 0-5: 1 | 1 | 0.37 | BIT 0, 1, 2: 1, REMAINDER: 0 |
| 21 | 62 | 0.1,0.2,0,0,0,0 | 0,0,0,0,0,0 | BIT 0-5: 1 | 1 | 0.37 | BIT 0, 1, 2: 1, REMAINDER: 0 |
| ... | ... | ... | ... | ... | ... | ... | ... |
| 21 | 68 | 0.2,0.1,0,0,0,0 | 0,0,0,0,0,0 | BIT 0-5: 1 | 1 | 0.37 | BIT 0, 1, 2: 1, REMAINDER: 0 |
| ... | ... | ... | ... | ... | ... | ... | ... |
| 22 | 70 | 0.1,0.1,0.4,0,0,0 | 0,0,5,0,0,0 | BIT 0, 1, 3, 4, 5, 8, 12, 13, 15, 16, 17: 1, REMAINDER:0 | 1 | 0.37 | BIT 8: 1, REMAINDER: 0 |
| ... | ... | ... | ... | ... | ... | ... | ... |
| 22 | 77 | 0.2,0.2,0.4,0,0,0 | 0,0,5,0,0,0 | BIT 0, 1, 3, 4, 5, 8, 12, 13, 15, 16, 17: 1, REMAINDER:0 | 1 | 0.37 | BIT 8: 1, REMAINDER: 0 |
| ... | ... | ... | ... | ... | ... | ... | ... |
| 23 | 78 | 0.2,0.2,0.4,0,0,0 | 0,0,10,0,0,0 | BIT 0, 1, 3, 4, 5, 8, 12, 13, 15, 16, 17: 1, REMAINDER:0 | 1 | 0.37 | BIT 8: 1, REMAINDER: 0 |
| ... | ... | ... | ... | ... | ... | ... | ... |
| 23 | 86 | 0.2,0.2,0.9,0,0,0 | 0,0,10,0,0,0 | BIT 8: 1, REMAINDER: 0 | 1 | 0.37 | BIT 8: 1, REMAINDER: 0 |
| 24 | 90 | 0.2,0.2,0.4,0,0,0 | 0,0,12,0,0,0 | BIT 8: 1, REMAINDER: 0 | 1 | 0.37 | BIT 8: 1, REMAINDER: 0 |
| ... | ... | ... | ... | ... | ... | ... | ... |
| 24 | 98 | 0.2,0.2,0.9,0,0,0 | 0,0,12,0,0,0 | BIT 8: 1, REMAINDER: 0 | 1 | 0.37 | BIT 8: 1, REMAINDER: 0 |

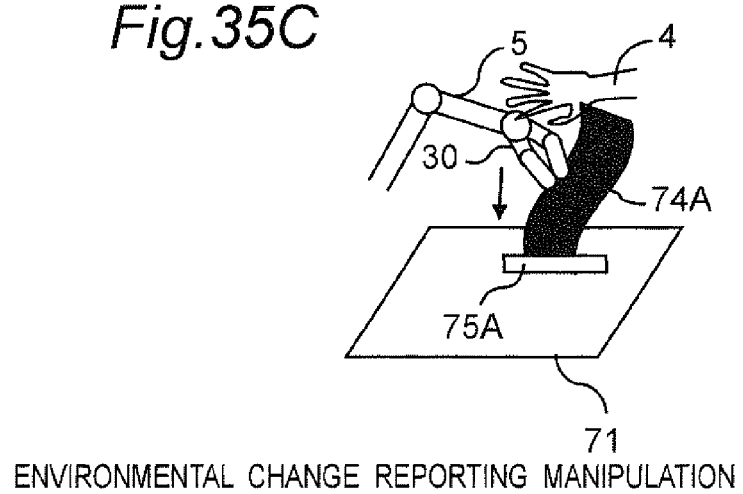
ENVIRONMENTAL CHANGE REPORTING MANIPULATION
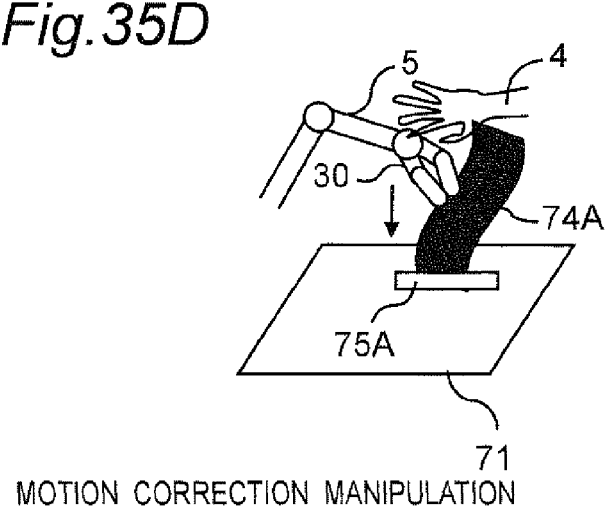
MOTION CORRECTION MANIPULATION
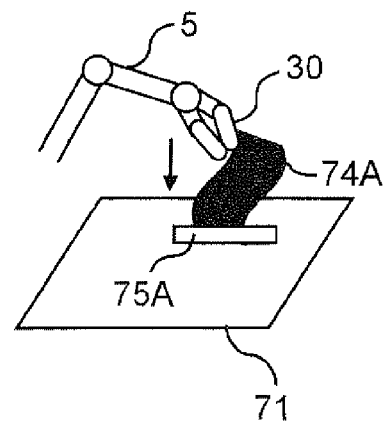

CONTROL APPARATUS AND CONTROL METHOD FOR ROBOT ARM, ROBOT, CONTROL PROGRAM FOR ROBOT ARM, AND ROBOT ARM CONTROL-PURPOSE INTEGRATED ELECTRONIC CIRCUIT

This application is a divisional of U.S. application Ser. No. 13/096,376, filed Apr. 28, 2011, now U.S. Pat. No. 8,175,750, which is a continuation application of International Application No. PCT/JP2010/005705, filed Sep. 21, 2010.

BACKGROUND OF THE INVENTION

The present invention relates to a control apparatus and a control method for a robot arm for generating and teaching a motion of a robot arm, a robot including a control apparatus for a robot arm, a control program for a robot arm, and a robot arm control-purpose integrated electronic circuit.

In recent years, household robots such as nursing-care robots, housework assistant robots, or the like have actively been developed. Being different from industrial robots, such household robots are manipulated by laymen at home and, therefore, the motion thereof must simply be taught. Further, because the motion environment in which the robots perform tasks varies depending on each home, such robots must flexibly address a great variety of household environments.

An exemplary teaching method for a robot apparatus is performed as follows. A force sensor is attached to the wrist of a robot, and a teaching person directly grips a handle attached to the tip of the force sensor so as to guide the robot to teaching points. Thus, the positions of the robot are taught (see Patent Document 1).

PRIOR ART DOCUMENT

Patent Document

Patent Document 1: Japanese Unexamined Patent Publication No. 59-157715

SUMMARY OF THE INVENTION

Issues to be Resolved by the Invention

However, in Patent Document 1, because the teaching person must teach all the teaching points, the teaching takes time and is very laborious. Further, in the field of industrial use, when a part of taught motion is to be modified, this must be done through programming through the use of a remote apparatus called a teaching pendant; otherwise, the entire motion must be taught again from the beginning. Thus, it is inefficient.

In particular, the household robot requires the minimized teaching time. Further, such parallel use with programming, involving the use of a remote apparatus such as a teaching pendant, increases the manipulation steps, and necessitates learning of programming languages. Thus, it presents difficulties for a layman at home.

Further, as disclosed in Patent Document 1, with an industrial robot, a teaching task for teaching a motion to the robot and a practical task actually performed by the robot are carried out in a distinctly separate manner. However, when the taught task is executed at home, often, an environment being different from the environment in which the teaching took place is varied. Accordingly, even when the taught task is executed as it is, the robot may stop or erroneously perform the task due to such environment variation. As used herein, the environment variation refers to variations in the position or state of surrounding objects when the robot operates, and variations in the position or state of the objects caused by the person or the robot directly acting on the ambient environment. For example, in the home environment, the arrangement or the shape of the household objects appears in various manners. For example, in a cooking task, an environment variation such as a change in shape or state of an object takes place before and after cooking. Further, in an industrial use, the shape of a soft material such as a flexible circuit board in cell manufacturing may change, and the position of its connector in a wiring procedure frequently varies. Still further, in a recycling factory, the home electric appliances to be scrapped are in various shapes. Furthermore, the shape of the screw varies due to aging, such as a damaged portion 92 as shown in FIG. 37B which is a top view of a head 73*a* of a screw 73 in FIG. 37A), a contaminated portion 93 as shown in FIG. 37C, and a rusty portion 94 as shown in FIG. 37D.

It is difficult to predict and to teach all of such environment variations in advance.

Further, in a manufacturing site of an assembly task, for example, model change frequently occurs, and hence the teaching task frequently occurs.

Accordingly, instead of teaching the entire motion from the beginning every time the environment variation or the model change occurs, the person checks the situation of the robot in motion, and informs the robot of the environment change upon every occurrence if any. In this manner, it becomes possible to manipulate in a manner unconscious of teaching. Further, even when an environment variation which has not been expected at the time of teaching occurs, if the person teaches about the variation upon every occurrence, it becomes possible for the robot to operate.

However, with this method, the person must perform manipulation every time the environment variation occurs and, therefore, it is troublesome.

The present invention has been made in consideration of the issues described above, and its object is to provide a control apparatus and a control method for a robot arm, a robot, control program for a robot arm, and a robot arm control-purpose integrated electronic circuit, each of which is capable of realizing the robot control that allows any worker to easily and quickly teach the robot arm, even when an unexpected environment variation occurs.

Means for Resolving the Issues

In order to achieve the object described above, the present invention is structured as follows.

In accordance with a first aspect of the present invention, there is provided a control apparatus for a robot arm controlling a motion of the robot arm, comprising:

a motion information acquiring unit that acquires motion information, from a motion information database having stored therein as the motion information in a time-oriented manner at least one of a position, an orientation, and a speed of the robot arm as being corresponding to the motion;

a correction motion information acquiring unit that acquires correction motion information corresponding to at least one piece of the motion information included in the motion information acquired by the motion information acquiring unit, when a person corrects the motion of the robot arm by manipulating the robot arm;

an environment information acquiring unit that acquires environment information being information as to an object on which the robot arm acts upon, in accordance with an environmental change reporting manipulation of the person to the robot arm;

a position control unit that controls the robot arm in a position control mode, such that the robot arm is shifted based on the motion information acquired by the motion information acquiring unit;

a motion correction unit that corrects the motion information in accordance with the correction motion information at each time acquired by the correction motion information acquiring unit while the robot arm is shifting in the position control mode under control of the position control unit; and a control rule generating unit that generates a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other, wherein the motion of the robot arm is controlled based on the control rule generated by the control rule generating unit while referring to the environment information acquired by the environment information acquiring unit.

In accordance with a second aspect of the present invention, there is provided a control apparatus for a robot arm controlling a motion of the robot arm, comprising:

a motion information acquiring unit that acquires motion information, from a motion information database having stored therein as the motion information in a time-oriented manner a force that the robot arm applies to an object as being corresponding to the motion;

a correction motion information acquiring unit that acquires correction motion information relating to the motion information acquired by the motion information acquiring unit and as to a force that the robot arm applies, when a person corrects the motion of the robot arm by manipulating the robot arm;

an environment information acquiring unit that acquires environment information being information as to the object on which the robot arm acts upon, in accordance with an environmental change reporting manipulation of the person to the robot arm;

a control unit that controls the robot arm in a force control mode, such that the robot arm exerts a force control over the object with the force set in the motion information acquired by the motion information acquiring unit;

a motion correction unit that corrects the motion information in accordance with the correction motion information at each time acquired by the correction motion information acquiring unit while the control unit is controlling the robot arm in the force control mode; and a control rule generating unit that generates a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other, wherein the motion of the robot arm is controlled based on the control rule generated by the control rule generating unit, while referring to the environment information acquired by the environment information acquiring unit.

In accordance with a twelfth aspect of the present invention, there is provided a control method for a robot arm controlling a motion of the robot arm, comprising:

acquiring motion information, by a motion information acquiring unit, from a motion information database having stored therein as the motion information in a time-oriented manner at least one of a position, an orientation, and a speed of the robot arm as being corresponding to the motion;

acquiring, by a correction motion information acquiring unit, correction motion information corresponding to at least one piece of the motion information included in the motion information acquired by the motion information acquiring unit, when a person corrects the motion of the robot arm by manipulating the robot arm;

acquiring by an environment information acquiring unit environment information being information as to an object on which the robot arm acts upon, in accordance with an environmental change reporting manipulation of the person to the robot arm;

controlling, by a position control unit, the robot arm in a position control mode, such that the robot arm is shifted based on the motion information acquired by the motion information acquiring unit;

correcting, by a motion correction unit, the motion information in accordance with the correction motion information at each time acquired by the correction motion information acquiring unit while the robot arm is shifting in the position control mode under control of the position control unit;

generating, by a control rule generating unit, a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other; and controlling the motion of the robot arm based on the control rule generated by the control rule generating unit while referring to the environment information acquired by the environment information acquiring unit.

In accordance with a thirteenth aspect of the present invention, there is provided a robot, comprising the robot arm, and the control apparatus for a robot arm according to any one of the first to eleventh aspects for controlling the robot arm.

In accordance with a fourteenth aspect of the present invention, there is provided a control program for a robot arm for controlling a motion of the robot arm, for executing the steps of:

acquiring, by a motion information acquiring unit, motion information, from a motion information database having stored therein as the motion information in a time-oriented manner at least one of a position, an orientation, and a speed of the robot arm as being corresponding to the motion;

acquiring by a correction motion information acquiring unit correction motion information corresponding to at least one piece of the motion information included in the motion information acquired by the motion information acquiring unit, when a person corrects the motion of the robot arm by manipulating the robot arm;

acquiring, by an environment information acquiring unit, environment information being information as to an object on which the robot arm acts upon, in accordance with an environmental change reporting manipulation of the person to the robot arm;

controlling, by a position control unit, the robot arm in a position control mode, such that the robot arm is shifted based on the motion information acquired by the motion information acquiring unit;

correcting, by a motion correction unit, the motion information in accordance with the correction motion information at each time acquired by the correction motion information acquiring unit while the robot arm is shifting in the position control mode under control of the position control unit;

generating, by a control rule generating unit, a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other; and controlling the motion of the robot arm based on the control rule generated by the control rule generating unit while referring to the environment information acquired by the environment information acquiring unit.

In accordance with a fifteenth aspect of the present invention, there is provided a robot arm control-purpose integrated electronic circuit for controlling a motion of a robot arm, comprising:

acquiring, by a motion information acquiring unit, motion information, from a motion information database having stored therein as the motion information in a time-oriented manner at least one of a position, an orientation, and a speed of the robot arm as being corresponding to the motion;

acquiring, by a correction motion information acquiring unit, correction motion information corresponding to at least one piece of the motion information included in the motion information acquired by the motion information acquiring unit, when a person corrects the motion of the robot arm by manipulating the robot arm;

acquiring, by an environment information acquiring unit, environment information being information as to an object on which the robot arm acts upon, in accordance with an environmental change reporting manipulation of the person to the robot arm;

controlling, by a position control unit, the robot arm in a position control mode, such that the robot arm is shifted based on the motion information acquired by the motion information acquiring unit;

correcting, by a motion correction unit, the motion information in accordance with the correction motion information at each time acquired by the correction motion information acquiring unit while the robot arm is shifting in the position control mode under control of the position control unit;

generating, by a control rule generating unit, a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other; and controlling the motion of the robot arm based on the control rule generated by the control rule generating unit while referring to the environment information acquired by the environment information acquiring unit.

Effects of the Invention

As has been described in the foregoing, according to the present invention, when the ambient environment changes, the person corrects a motion by manipulating the robot arm, whereby, when the same environment is varied next time, the robot arm is allowed to autonomously operate based on a control rule generated by the control rule generating unit while referring to the environment information acquired by the environment information acquiring unit.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1C is a view showing an overview of the robot according to the first embodiment of the present invention and its ambient environment;

FIG. 5A is a view describing motion information being data in a motion information database of the control apparatus;

FIG. 5B is a view describing motion information being data in the motion information database of the control apparatus;

FIG. 5C is a view describing motion information being data in the motion information database of the control apparatus;

FIG. 6 is a view describing information of flags in the motion information database of the control apparatus;

FIG. 7 is a view describing information relating to correction parameter flags in the motion information database of the control apparatus;

FIG. 9A is a view describing a list of environment information in an environment information database of the control apparatus;

FIG. 9B is a view describing information of flags in the environment information database of the control apparatus;

FIG. 10A is a view describing a list of control rules in a control rule database of the control apparatus;

FIG. 11A is a view describing a list of detecting unit selection rules in a detecting unit selection rule database of the control apparatus;

FIG. 11B is a view describing information as to environment information types of the detecting unit selection rules of the detecting unit selection rule database of the control apparatus;

FIG. 13B is a view showing a motion of the control apparatus for the robot arm and a manipulation state of a person according to the first embodiment of the present invention;

FIG. 17A is a flowchart showing motion steps of a motion instruction unit according to the first embodiment of the present invention;

FIG. 17B is a flowchart showing motion steps of a motion correction unit, a motion instruction unit, a control rule generating unit, an environment information acquiring unit, and a control parameter managing unit according to the first embodiment of the present invention;

FIG. 22A is a view describing a list of motion information in a motion information database of a control apparatus for a robot arm of the robot according to the third embodiment;

FIG. 22B is a view describing a list of motion information in the motion information database of the control apparatus for the robot arm of the robot according to the third embodiment;

FIG. 23 is a view describing information of flags in the motion information database of the control apparatus for the robot arm of the robot according to the third embodiment;

FIG. 32A is a view describing a list of motion information in a motion information database according to the fourth embodiment;

FIG. 32B is a view describing a list of the motion information in the motion information database according to the fourth embodiment;

FIG. 35C is a view showing a motion of the control apparatus for the robot arm and a manipulation state of a person according to the fourth embodiment of the present invention;

FIG. 35D is a view showing a motion of the control apparatus for the robot arm and a manipulation state of a person according to the fourth embodiment of the present invention;

FIG. 35F is a view showing a motion state of the control apparatus for the robot arm according to the fourth embodiment of the present invention;

DETAILED DESCRIPTION OF THE PREFERRED EMBODIMENTS

Figure 1A:
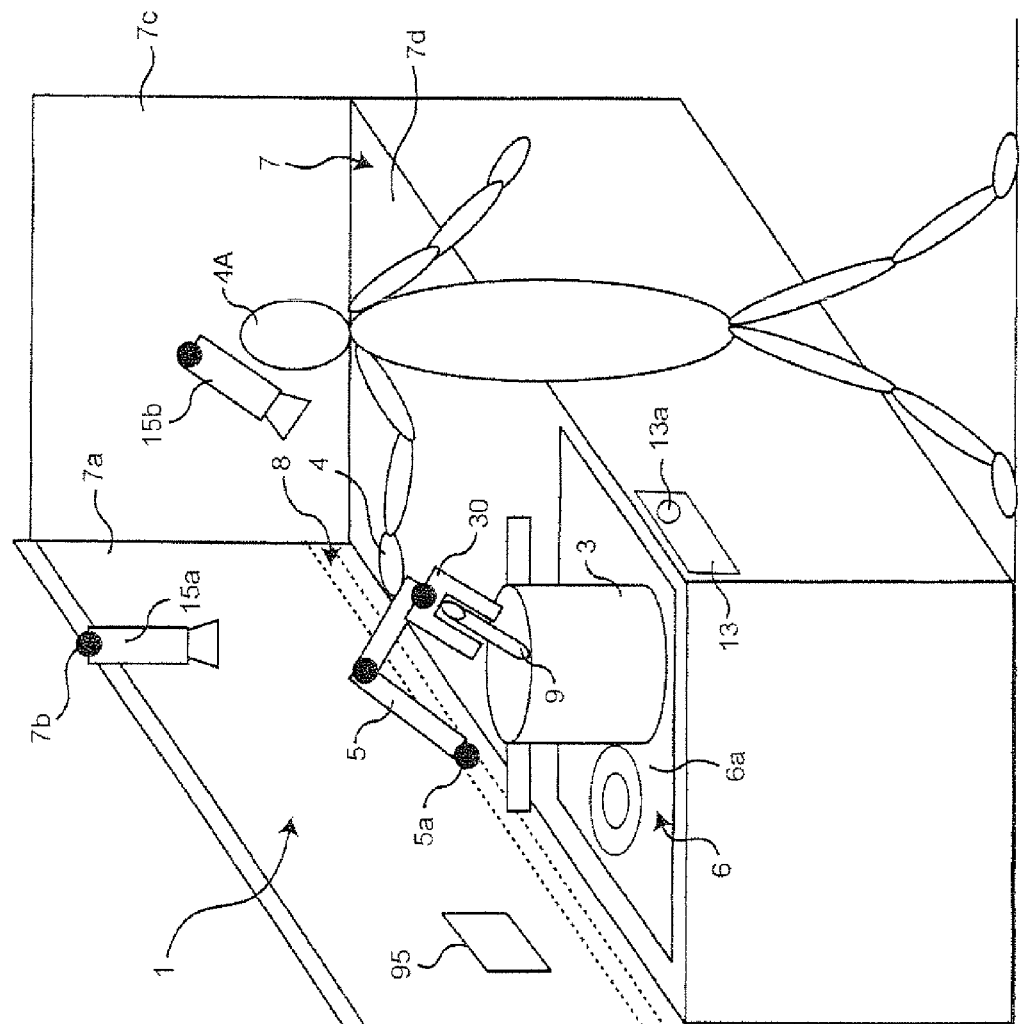
FIG. 1A is a view showing an overview of the structure of a robot including a robot arm and a control apparatus therefor according to a first embodiment of the present invention.

In the following, with reference to the drawings, a detailed description will be given of embodiments of the present invention.

In the following, before proceeding with the detailed description of the embodiments of the present invention with reference to the drawings, various aspects of the present invention will be described.

According to a first aspect of the present invention, there is provided a control apparatus for a robot arm controlling a motion of the robot arm, comprising:

a motion information acquiring unit that acquires motion information, from a motion information database having stored therein as the motion information in a time-oriented manner at least one of a position, an orientation, and a speed of the robot arm as being corresponding to the motion;

a correction motion information acquiring unit that acquires correction motion information corresponding to at least one piece of the motion information included in the motion information acquired by the motion information acquiring unit, when a person corrects the motion of the robot arm by manipulating the robot arm;

an environment information acquiring unit that acquires environment information being information as to an object on which the robot arm acts upon, in accordance with an environmental change reporting manipulation of the person to the robot arm;

a position control unit that controls the robot arm in a position control mode, such that the robot arm is shifted based on the motion information acquired by the motion information acquiring unit;

a motion correction unit that corrects the motion information in accordance with the correction motion information at each time acquired by the correction motion information acquiring unit while the robot arm is shifting in the position control mode under control of the position control unit; and a control rule generating unit that generates a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other, wherein the motion of the robot arm is controlled based on the control rule generated by the control rule generating unit while referring to the environment information acquired by the environment information acquiring unit.

According to a second aspect of the present invention, there is provided a control apparatus for a robot arm controlling a motion of the robot arm, comprising:

a motion information acquiring unit that acquires motion information, from a motion information database having stored therein as the motion information in a time-oriented manner a force that the robot arm applies to an object as being corresponding to the motion;

a correction motion information acquiring unit that acquires correction motion information relating to the motion information acquired by the motion information acquiring unit and as to a force that the robot arm applies, when a person corrects the motion of the robot arm by manipulating the robot arm;

an environment information acquiring unit that acquires environment information being information as to the object on which the robot arm acts upon, in accordance with an environmental change reporting manipulation of the person to the robot arm;

a control unit that controls the robot arm in a force control mode, such that the robot arm exerts a force control over the object with the force set in the motion information acquired by the motion information acquiring unit;

a motion correction unit that corrects the motion information in accordance with the correction motion information at each time acquired by the correction motion information acquiring unit while the control unit is controlling the robot arm in the force control mode; and a control rule generating unit that generates a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other, wherein the motion of the robot arm is controlled based on the control rule generated by the control rule generating unit, while referring to the environment information acquired by the environment information acquiring unit.

According to a third aspect of the present invention, there is provided the control apparatus for a robot arm according to one of the above first and second aspects, wherein the environment information acquiring unit includes a force detecting unit detecting a force of the person applied to the robot arm, and the correction motion information acquiring unit detects a manipulation performed by the person to the robot arm in accordance with the force of the person detected by the force detecting unit and corresponding time of the detection, and acquires the correction motion information as to the force that the robot arm applies when the motion of the robot arm is corrected.

According to a fourth aspect of the present invention, there is provided the control apparatus for a robot arm according to the first aspect, wherein the environment information acquiring unit includes a plurality of image pickup apparatuses capable of capturing an image of the robot arm and an ambient environment in which the motion of the robot arm is performed, and the control rule generating unit determines an environment information type in generating the control rule, based on a plurality of environment information pieces acquired by the plurality of image pickup apparatuses of the environment information acquiring unit, in accordance with the position control mode of the robot arm when the person manipulates the robot arm.

According to a fifth aspect of the present invention, there is provided the control apparatus for a robot arm according to the second aspect, wherein the environment information acquiring unit includes a force detecting unit detecting a force of the person applied to the robot arm, and the control rule generating unit uses the environment information acquired by the force detecting unit in generating the control rule, in accordance with the force control mode of the robot arm when the person manipulates the robot arm.

According to a sixth aspect of the present invention, the control rule generating unit provides the control apparatus for a robot arm according to one of the first to fifth aspects, which determines environment information to be acquired in accordance with the environmental change reporting manipulation to the robot arm by the person.

According to a seventh aspect of the present invention, there is provided the control apparatus for a robot arm according to the sixth aspect, wherein the environment information includes environment information detected and acquired in a plurality of types of detection directions, and the control rule generating unit determines a detection direction of the environment information to be acquired, in accordance with the manipulation of the person to the robot arm.

According to an eighth aspect of the present invention, there is provided the control apparatus for a robot arm according to anyone of the first to seventh aspects, further comprising a motion calculation unit that calculates one motion information piece by referring to the environment information acquired by the environment information acquiring unit, based on a plurality of motion information pieces included in the control rule generated by the control rule generating unit.

According to a ninth aspect of the present invention, there is provided the control apparatus for a robot arm according to any one of the first to seventh aspects, wherein after the correction motion information acquiring unit acquires the correction motion information corresponding to the at least one piece of the motion information included in the motion information acquired by the motion information acquiring unit based on the person correcting the motion of the robot arm by manipulating the robot arm, when the environment information acquired by the environment information acquiring unit is identical to the environment information when the correction manipulation is performed, based on the control rule generated by the control rule generating unit, the motion of the robot arm is controlled so as to be corrected based on the correction motion information acquired by the correction motion information acquiring unit.

According to a tenth aspect of the present invention, there is provided the control apparatus for a robot arm according to the first aspect, wherein the environment information acquiring unit includes a plurality of image pickup apparatuses capable of capturing an image of the robot arm and an ambient environment in which the motion of the robot arm is performed, the robot arm is provided with, at its tip, a hand capable of releasably gripping a task-use jig capable of rotating a screw, the task-use jig being the object, and the motion of the robot arm in performing one of a tightening and a removing task of the screw with the task-use jig gripped by the hand of the robot arm is controlled based on the control rule generated by the control rule generating unit while referring to the environment information acquired by the plurality of image pickup apparatuses.

According to an eleventh aspect of the present invention, there is provided the control apparatus for a robot arm according to the second aspect, wherein the environment information acquiring unit includes a plurality of image pickup apparatuses capable of capturing an image of the robot arm and an ambient environment in which the motion of the robot arm is performed, the robot arm is provided with, at its tip, a hand capable of releasably gripping a flexible circuit board, the flexible circuit board being the object, and the motion of the robot arm in performing a task of attaching the flexible circuit board gripped by the hand of the robot arm to a device is controlled based on the control rule generated by the control rule generating unit while referring to the environment information acquired by the plurality of image pickup apparatuses.

According to a twelfth aspect of the present invention, there is provided a control method for a robot arm controlling a motion of the robot arm, comprising:

acquiring motion information, by a motion information acquiring unit, from a motion information database having stored therein as the motion information in a time-oriented manner at least one of a position, an orientation, and a speed of the robot arm as being corresponding to the motion;

acquiring, by a correction motion information acquiring unit, correction motion information corresponding to at least one piece of the motion information included in the motion information acquired by the motion information acquiring unit, when a person corrects the motion of the robot arm by manipulating the robot arm;

acquiring, by an environment information acquiring unit, environment information being information as to an object on which the robot arm acts upon, in accordance with an environmental change reporting manipulation of the person to the robot arm;

controlling, by a position control unit, the robot arm in a position control mode, such that the robot arm is shifted based on the motion information acquired by the motion information acquiring unit;

correcting, by a motion correction unit, the motion information in accordance with the correction motion information at each time acquired by the correction motion information acquiring unit while the robot arm is shifting in the position control mode under control of the position control unit;

generating, by a control rule generating unit, a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other; and controlling the motion of the robot arm based on the control rule generated by the control rule generating unit while referring to the environment information acquired by the environment information acquiring unit.

According to a thirteenth aspect of the present invention, there is provided a robot, comprising the robot arm, and the control apparatus for a robot arm according to any one of the first to eleventh aspects for controlling the robot arm.

According to a fourteenth aspect of the present invention, there is provided a control program for a robot arm for controlling a motion of the robot arm, for executing the steps of:

acquiring, by a motion information acquiring unit, motion information, from a motion information database having stored therein as the motion information in a time-oriented manner at least one of a position, an orientation, and a speed of the robot arm as being corresponding to the motion;

acquiring, by a correction motion information acquiring unit, correction motion information corresponding to at least one piece of the motion information included in the motion information acquired by the motion information acquiring unit, when a person corrects the motion of the robot arm by manipulating the robot arm;

acquiring, by an environment information acquiring unit, environment information being information as to an object on which the robot arm acts upon, in accordance with an environmental change reporting manipulation of the person to the robot arm;

controlling, by a position control unit, the robot arm in a position control mode, such that the robot arm is shifted based on the motion information acquired by the motion information acquiring unit;

correcting, by a motion correction unit, the motion information in accordance with the correction motion information at each time acquired by the correction motion information acquiring unit while the robot arm is shifting in the position control mode under control of the position control unit;

generating, by a control rule generating unit, a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other; and controlling the motion of the robot arm based on the control rule generated by the control rule generating unit while referring to the environment information acquired by the environment information acquiring unit.

According to a fifteenth aspect of the present invention, there is provided a robot arm control-purpose integrated electronic circuit for controlling a motion of a robot arm, comprising:

acquiring, by a motion information acquiring unit, motion information, from a motion information database having stored therein as the motion information in a time-oriented manner at least one of a position, an orientation, and a speed of the robot arm as being corresponding to the motion;

acquiring, by a correction motion information acquiring unit, correction motion information corresponding to at least one piece of the motion information included in the motion information acquired by the motion information acquiring unit, when a person corrects the motion of the robot arm by manipulating the robot arm;

acquiring, by an environment information acquiring unit, environment information being information as to an object on which the robot arm acts upon, in accordance with an environmental change reporting manipulation of the person to the robot arm;

controlling, by a position control unit, the robot arm in a position control mode, such that the robot arm is shifted based on the motion information acquired by the motion information acquiring unit;

correcting, by a motion correction unit, the motion information in accordance with the correction motion information at each time acquired by the correction motion information acquiring unit while the robot arm is shifting in the position control mode under control of the position control unit;

generating, by a control rule generating unit, a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other; and controlling the motion of the robot arm based on the control rule generated by the control rule generating unit while referring to the environment information acquired by the environment information acquiring unit.

In the following, with reference to the drawings, a detailed description will be given of the embodiments of the present invention.

FIRST EMBODIMENT

A description will be given of the structure of a robot 1 including a robot arm and a control apparatus therefor according to a first embodiment of the present invention.

Figure 1B:
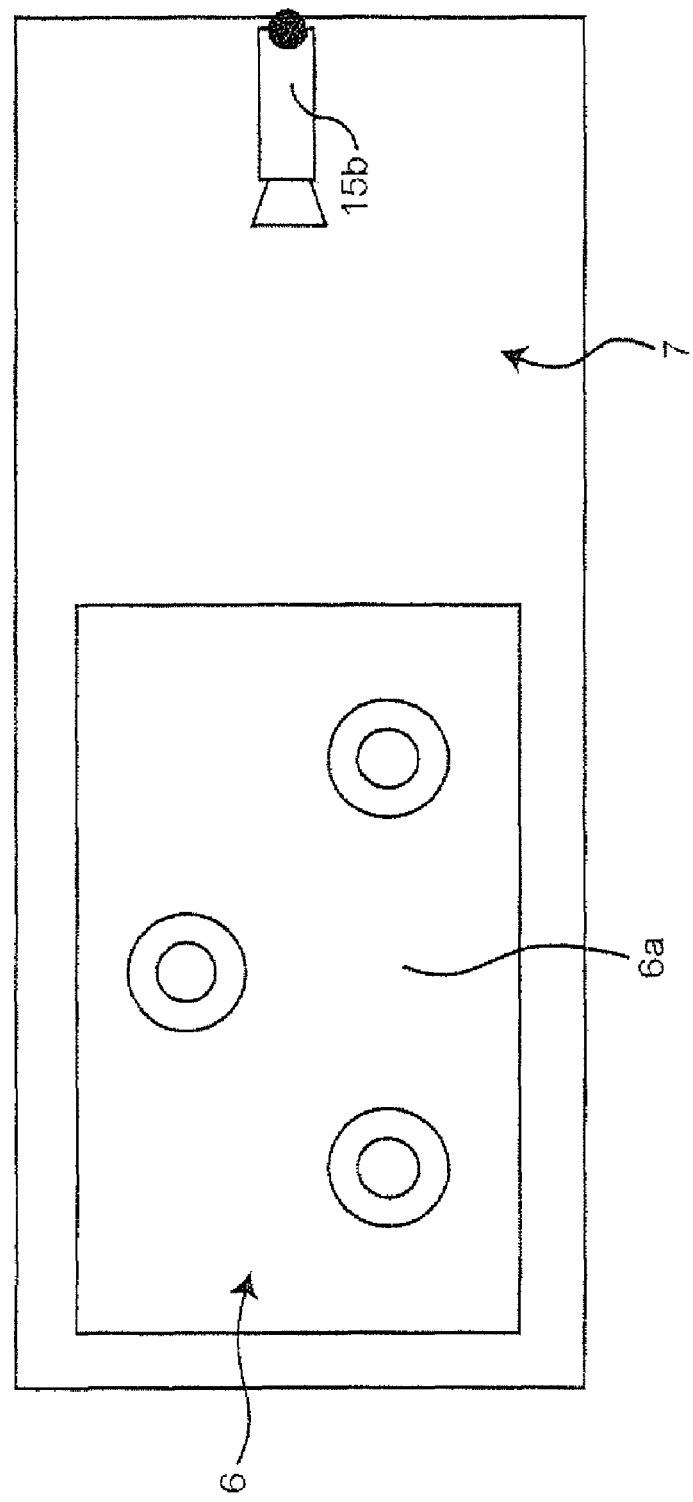
FIG. 1B is a view showing an overview of the robot according to the first embodiment of the present invention and its ambient environment.

FIG. 1A shows an overview of the robot 1 including a robot arm 5 and a control apparatus 70 that controls the drive motion of the robot arm 5, according to the first embodiment of the present invention. FIG. 1B is a top view of a workbench 7 shown in FIG. 1A at which the robot arm 5 performs a task, and FIG. 1C is a front view of the workbench 7 and a pot 3 shown in FIG. 1A.

(Apparatus Structure)

As shown in FIG. 1A, the robot arm 5 of the robot 1 is installed on a wall surface 7a of the workbench 7 such as a household kitchen or a table, for example. A base end 5a of the robot arm 5 is shiftably supported by a rail 8 fixed to the wall surface 7a, such that the robot arm 5 can shift on the rail 8 along therewith in a lateral direction (e.g., in the horizontal direction) by a force of a hand 4 of a person 4A. The fixation position of the base end of the robot arm 5 is not limited to the wall surface 7a of the workbench 7, and it may be installed at the ceiling or the like.

First and second image pickup apparatuses 15a and 15b such as cameras each being one example of an environment information acquiring unit 19, the description of which will be given later, are capable of capturing an image of the robot arm 5 and the ambient environment where motions of the robot arm 5 are performed, so as to acquire environment information. In the first embodiment, as shown in FIG. 1C, the first image pickup apparatus 15a is installed at the ceiling 7b pointing downward, so as to be capable of capturing the entire image of the workbench 7 from the ceiling 7b; as shown in FIGS. 1B and 1C, the second image pickup apparatus 15b is installed at a side surface 7c of the workbench 7 in parallel to a top surface 7d of the workbench 7, so as to be capable of capturing an image in the lateral direction around the top surface of the workbench 7.

A console 13 for instructing manipulation of the robot 1 functions as one example of a data input IF 26, and is disposed at a front side surface of a cooking appliance 6 such as an IH cooking heater or a gas stove. The console 13 is provided with a manipulation button 13a or a voice input device for accepting any manipulation instruction of the user.

A hand 30 is provided at the tip of the robot arm 5, and the hand 30 releasably grips a task-use jig 9 (e.g., a cooking utensil such as a ladle; a wipe-cleaning mop or the like; or an electric screwdriver tool 72 or the like). As the hand 30, a known removable attaching mechanism such as a mechanical chuck can be used.

A display unit 95 as one example of display means is, e.g., a display apparatus installed in the workbench 7, and the display unit 95 displays on itself the motions or the like of the robot, the description of which will be given later. That is, the display unit 95 displays on itself required information as necessary, so as to aid in smooth execution of various motions of the present invention.

It is to be noted that, though the rail 8 is disposed on the wall surface 7a of the workbench 7, when applied to an island kitchen having no wall surface, it can be installed at a place suitable for performing tasks, such as the ceiling surface or the side surface of the top board 6a of the island kitchen.

Further, though the console 13 as one example of the data input IF 26 is fixed to the side surface of the cooking appliance 6, the console 13 may be replaced by a remote controller with which teleoperation can be performed.

Figure 19A:
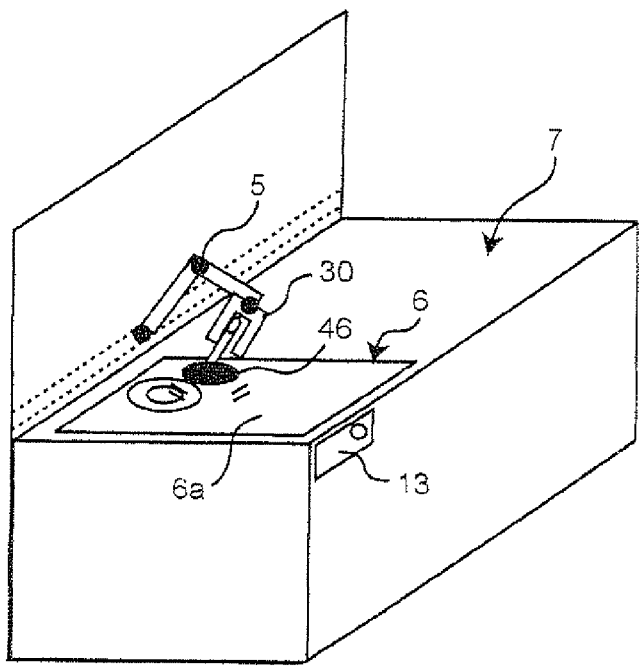
FIG. 19A is a view showing a motion state of the control apparatus for the robot arm according to the second embodiment of the present invention.
Figure 19B:
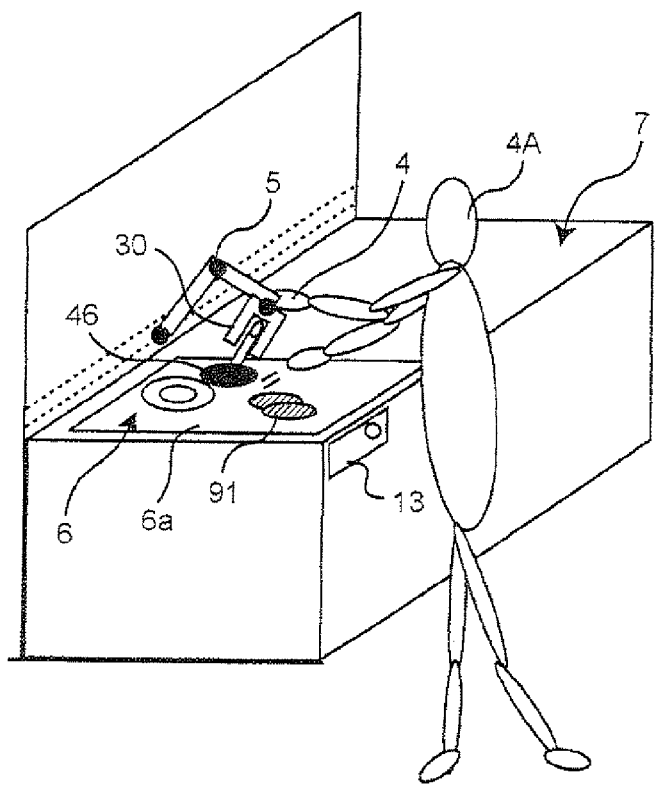
FIG. 19B is a view showing a motion of the control apparatus for the robot arm and a manipulation state of a person according to the second embodiment of the present invention.

The robot 1 uses the robot arm 5 to perform a task which is performed by the robot arm 5 and the person 4A in cooperation with each other, such as a task of stirring ingredients in the pot 3, a task of wiping off a contamination 91 in the kitchen (i.e., a wipe-cleaning task performed at the contaminated portion 91 shown in FIG. 19B and others) at home, for example.

In the following, first, as one example, a brief description will be given of a motion in a case where a stirring task is performed by the robot arm 5, with reference to FIG. 1A.

First, the person 4A directly grips the robot arm 5 of the robot 1, and the person 4A applies a force to the robot arm 5 with the hand 4. Then, by the force applied by the person 4A to the robot arm 5, the robot arm 5 shifts along the rail 8, whereby the robot arm 5 is guided to the vicinity of the cooking tool 3 such as a pot.

Next, the person 4A attaches with the hand 4 the cooking utensil 9 such as a ladle for performing the stirring task, as an example of the task-use jig 9, to the hand 30 at the tip of the robot arm 5.

Next, when the person 4A inputs with the hand 4 a motion start instruction via the console 13 to the robot arm 5, the robot arm 5 actuates, to start the previously selected task, that is, the stirring task.

When the robot arm 5 is stirring inside the pot 3 with the ladle 9, the person 4A checks the state of ingredients being stirred. Then, the person 4A directly grips the robot arm 5 and applies a force to the robot arm 5 in the direction toward which a correction is desired, to thereby correct the motion of the robot arm 5.

When cooking is done, the person 4A shifts the robot arm 5 from the inside of the pot 3 as one example of a cooking tool to the outside of the pot 3, to proceed to the next task.

Figure 2:
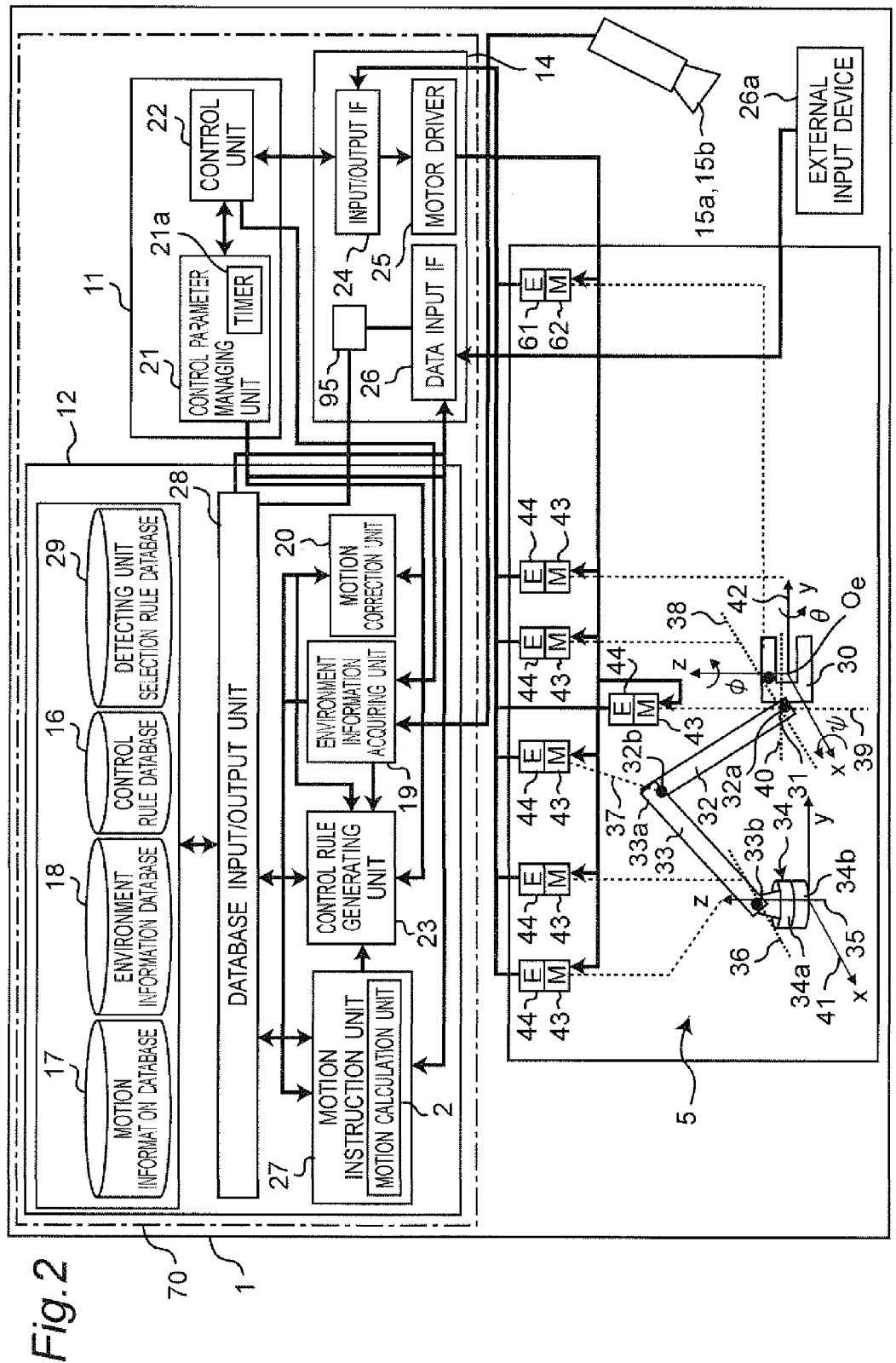
FIG. 2 is a view showing a detailed structure of the control apparatus structuring the robot and that of the robot arm being a control object according to the first embodiment of the present invention.

Next, the robot 1 according to the first embodiment is detailed. FIG. 2 shows the detailed structure of the robot arm 5 and that of the control apparatus 70 for the robot arm 5. As shown in FIG. 2, the control apparatus 70 for the robot arm 5 includes a control apparatus body unit 11, a motion generating device 12 generating motions of the robot arm 5, and a peripheral apparatus 14.

<<Robot Arm>>

As an example, the robot arm 5 according to the first embodiment is a multi-joint robot arm structured with a multi-link manipulator having six degrees of freedom. The robot arm 5 includes the hand 30, a fore-arm link 32 having at its tip 32a a wrist portion 31 to which the hand 30 is attached, an upper-arm link 33 having its tip 33a rotatably coupled to a base end 32b of the fore-arm link 32, and a base portion 34 to which a base end 33b of the upper-arm link 33 is rotatably coupled and supported thereon. Though the base portion 34 is coupled to the shiftable rail 8, the base portion 34 may be fixed at a constant position. The wrist portion 31 has three rotation axes relating to a fourth joint portion 38, a fifth joint portion 39, and a sixth joint portion 40, such that the relative orientation (direction) of the hand 30 to the fore-arm link 32 can be changed. That is, in FIG. 2, the fourth joint portion 38 makes it possible to change the relative orientation about the lateral axis ($\psi$) of the hand 30 to the wrist portion 31. The fifth joint portion 39 makes it possible to change the relative orientation about the longitudinal axis ($\Phi$) of the hand 30 to the wrist portion 31, the longitudinal axis ($\Phi$) being perpendicular to the lateral axis of the fourth joint portion 38. The sixth joint portion 40 makes it possible to change the relative orientation about the lateral axis (θ) of the hand 30 to the wrist portion 31, the lateral axis (θ) being perpendicular to the lateral axis (ψ) of the fourth joint portion 38 and to the longitudinal axis (φ) of the fifth joint portion 39. The other end of the fore-arm link 32 is allowed to rotate about a third joint portion 37 relative to the tip of the upper-arm link 33, that is, about the lateral axis parallel to the lateral axis of the fourth joint portion 38. The other end of the upper-arm link 33 is allowed to rotate about a second joint portion 36 relative to the base portion 34, that is, about the lateral axis parallel to the lateral axis of the fourth joint portion 38. Further, a top-side movable portion 34a of the base portion 34 is allowed to rotate about a first joint portion 35 relative to a bottom-side fixed portion 34b of the base portion 34, that is, about the longitudinal axis parallel to the longitudinal axis of the fifth joint portion 39.

As a result, the robot arm 5 is allowed to rotate about each of the six axes in total, to structure the multi-link manipulator having six degrees of freedom.

Each of the joint portions (specifically, the first joint portion 35 to the sixth joint portion 40) structuring the rotation portions of the respective axes includes, as one example, a rotary driver apparatus such as a motor 43, and an encoder 44 detecting a rotation phase angle (i.e., a joint angle) of the rotary shaft of the motor 43.

The motors 43 according to the first embodiment are disposed inside respective joint portions of the robot arm 5. Each of the motors 43 is included in one of the two link members (e.g., a rotation-side member and a support-side member supporting the rotation-side member) structuring each of the joint portions, and the drive motion of each motor 43 is controlled by a motor driver 25 installed in the one link member. The description of the motor driver 25 will be given later. The rotary shaft of the motor 43 installed at the vicinity of the joint portion of the one link member of each of the joint portions is coupled to the vicinity portion of the joint portion of the other link member to cause the rotary shaft to rotate in the forward and reverse directions, whereby the other link member is allowed to rotate relative to the one link member about each of axes respectively relating to the first joint portion 35 to the sixth joint portion 40. Further, each of the encoders 44 is installed at the one link member for detecting a rotation phase angle (i.e., a joint angle) of the rotary shaft of the motor 43 (each of the encoders 44 is actually disposed inside the one link member of each joint portion of the robot arm 5).

Reference numeral 41 denotes an absolute coordinate system whose relative positional relationship to the bottom-side fixed portion 34b of the base portion 34 is fixed, and reference numeral 42 denotes a hand coordinate system whose relative positional relationship to the hand 30 is fixed. The origin position $O_e$ (x, y, z) of the hand coordinate system 42 viewed from the absolute coordinate system 41 is defined as the hand position of the robot arm 5 (i.e., the position of the hand 30); (φ, θ, ψ) which is an expression of the orientation of the hand coordinate system 42 viewed from the absolute coordinate system 41 using a roll angle, a pitch angle, and a yaw angle is defined as the hand orientation of the robot arm 5; and the hand position and orientation vector is defined as the vector r=[x, y, z, φ, θ, ψ]$^T$.

FIG. 3 shows the coordinate system of the robot arm 5 according to the first embodiment of the present invention.

Figure 3A:
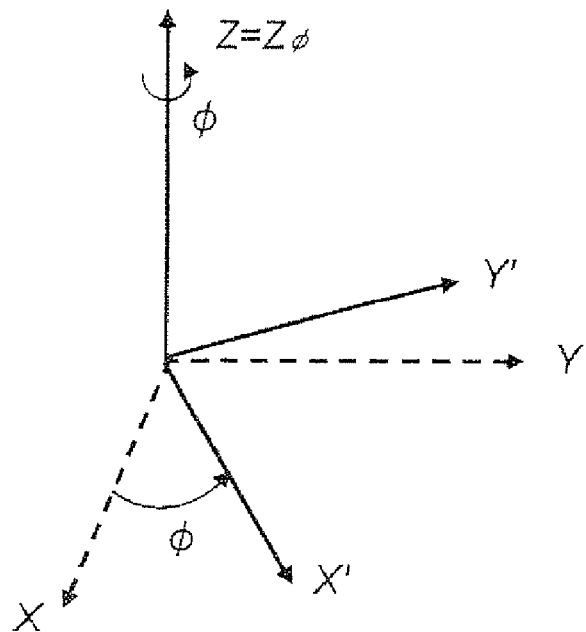
FIG. 3A is a view relating to a coordinate system according to the first embodiment of the present invention.

In the first embodiment, what is discussed is a coordinate system in which the coordinate system is rotated by an angle φ using Z-axis of an absolute coordinate system 35 as the rotation axis (see FIG. 3A). It is assumed that the coordinate axes here are [X', Y', Z].

Figure 3B:
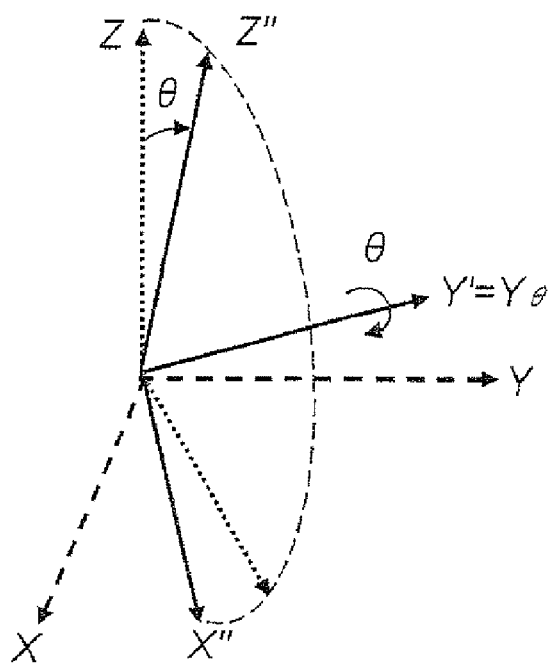
FIG. 3B is a view relating to a coordinate system according to the first embodiment of the present invention.

Next, this coordinate system is rotated by an angle θ using Y' as the rotation axis (see FIG. 3B). It is assumed that the coordinate axes here are [X", Y', Z"].

Figure 3C:
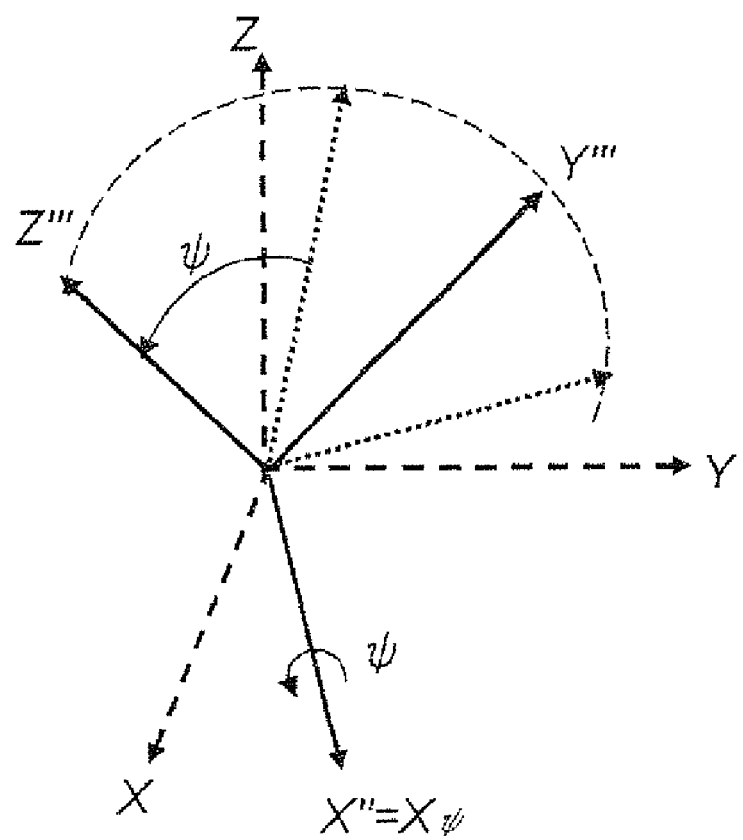
FIG. 3C is a view relating to a coordinate system according to the first embodiment of the present invention.

Finally, this coordinate system is rotated about X"-axis by an angle ψ using X"-axis as the rotation axis (see FIG. 3C). It is assumed that the coordinate axes here are [X", Y'", Z'"]. It is assumed that the orientation of the coordinate system here is represented by the roll angle φ, the pitch angle θ, and the yaw angle ψ, and hence the orientation vector here is (φ, θ, ψ). It is assumed that, in a case where a coordinate system of orientation (φ, θ, ψ) having its origin position translated to the origin position $O_e$ (x, y, z) of the hand coordinate system 42 agrees with the hand coordinate system 42, the orientation vector of the hand coordinate system 42 is (φ, θ, ψ).

In a case where the hand position and orientation of the robot arm 5 is to be controlled, the hand position and orientation vector r is caused to follow a hand position and orientation desired vector $r_d$ generated by a desired trajectory generating unit 55, the description of which will be given later.

The robot arm 5 has its drive motion controlled in the following manner, by the control apparatus for the robot arm, which includes the motion generating device 12, the description of which will be given later, the control apparatus body unit 11, and the peripheral apparatus 14.

The joint angle information pieces output from the encoders 44 at the respective joint portions of the robot arm 5, the description of which will be given later, are acquired by the control apparatus body unit 11 via a counter board of the input/output IF (interface) 24. Based on the acquired joint angle information pieces, the control apparatus body unit 11 calculates the control instruction values for rotary motions of the joint portions. The control instruction values calculated by the control apparatus body unit 11 are provided to the motor driver 25 for controlling the drive motion of the joint portions of the robot arm 5, via a D/A board of the input/output IF 24. According to the control instruction values sent from the motor driver 25, the motors 43 of respective joint portions of the robot arm 5 are driven to rotate in the forward and reverse directions independently of one another.

Further, the hand 30 includes a hand open/close drive-purpose motor 62 as one example of a hand driver apparatus whose drive motion is controlled by the motor driver 25 and an encoder 61 detecting a rotation phase angle of the rotary shaft of the hand open/close drive-purpose motor 62.

The information as to angle of rotation of the rotary shaft of the motor 62 detected by the encoder 61 is acquired by the control apparatus body unit 11 via the counter board of the input/output IF 24. Based on the information as to angle of rotation acquired by the control apparatus body unit 11, the hand control unit 54 (shown in FIG. 4) of the control unit 22 of the control apparatus body unit 11 calculates the control instruction values for the open and close motions of the hand 30. The calculated control instruction values are provided to the motor driver 25 that also performs the open and close drive motions of the hand 30, via the D/A board of the input/output IF 24. In accordance with the control instruction values sent from the motor driver 25, the rotary drive motion of the motor 62 is controlled, whereby the hand open/close drive-purpose rotary shaft of the motor 62 rotates in the forward and reverse directions to open and close the hand 30. For example, the forward rotation of the rotary shaft of the motor 62 makes it possible to open the hand 30 such that the task-use jig 9 (e.g., a ladle, a mop or the like) can be attached by the person 4A with the hand 4; the reverse rotation of the rotary shaft of the motor 62 makes it possible to close the hand 30 such that the task-use jig 9 (e.g., a ladle, a mop or the like) attached to the hand 30 can be fixed.

The control apparatus body unit 11, the motion generating device 12, and the peripheral apparatus 14 are each structured with a general personal computer, as one example.

<<Peripheral Apparatus 14>>

The peripheral apparatus 14 includes the data input IF (interface) 26, the input/output IF (interface) 24, and the motor driver 25.

The input/output IF 24 includes elements connected to an expansion slot such as a PCI bus of a personal computer, for example, a D/A board, an A/D board, and a counter board. The input/output IF 24 acquires the joint angle information pieces output from the encoders 44 at the respective joint portions of the robot arm 5, and the joint angle information piece output from the encoder 61 of the hand 30, and provides the acquired information to the control unit 22. On the other hand, the input/output IF 24 receives control information such as a control signal from the control unit 22, and provides the motor driver 25 with control information such as the control instruction values. The motor driver 25 provides the motor 43 at each of the joint portions of the robot arm 5 and the motor 62 of the hand 30 with control information such as the control instruction values.

The data input IF (interface) 26 is an interface for the person 4A to input or change task information (e.g., task IDs), motion correction manipulation instruction information, an environmental change reporting manipulation instruction, or a motion correcting manipulation instruction based on joint angular velocity information of the robot arm 5, or motion information, via the data input IF 26 and the database input/output unit 28 through the use of an external input device 26a such as a keyboard, a mouse or a microphone. Hence, the data input IF 26 is connected to the external input device 26a, the database input/output unit 28, a motion instruction unit 27 (a motion calculation unit 2), a force detecting unit 53 of the control unit 22 and a control parameter managing unit 21, and the display unit 95.

Further, the data input IF 26 may be configured to receive control motion start and end instructions from the person 4A to the motion instruction unit 27 through the use of an input apparatus such as a button 13a of the console 13 shown in FIG. 1A as one example of the data input IF 26. The button 13a may be implemented as, for example, a toggle switch, such that a single button functions to receive the control motion start and the control motion end; alternatively, the button may separately be implemented as a control motion start button and a control motion end button. It is an interface for entering instructions to the robot 1 such as the control motion start and the control motion end through the use of input apparatuses such as keyboard, a mouse, or a microphone instead of the button.

<<Motion Generating Device 12>>

The motion generating device 12 is structured by a motion information database 17, an environment information database 18, a control rule database 16, a detecting unit selection rule database 29, the motion instruction unit 27 (the motion calculation unit 2), a motion correction unit 20, a control rule generating unit 23, the environment information acquiring unit 19, and the database input/output unit 28.

Between the motion correction unit 20 and the control parameter managing unit 21, the hand position and orientation of the robot arm 5, the information as to a force applied by the person 4A, the motion instructions and the like are exchanged. The control parameter managing unit 21 provides the motion correction unit 20 with the hand position and orientation of the robot arm 5, the information as to a force applied by the person 4A and the like. It is to be noted that the control modes in the motion generating device 12 (i.e., (i) a position control mode, (ii) an impedance control mode, (iii) a hybrid impedance control mode, and (v) a force hybrid impedance control mode) will be detailed later in connection with the control parameter managing unit 21 of the control apparatus body unit 11.

—Motion Information Database—

The motion information database 17 stores therein information as to motions of the robot arm 5 (hereinafter, referred to as the motion information) such as the hand position and orientation of the robot arm 5 at a certain time. The motion information may previously be set, or may be stored as being input by the database input/output unit 28 via the control rule generating unit 23 into the motion information database 17.

FIG. 5A (and each of FIGS. 5B and 5C) shows motion information being the data in the motion information database 17.

FIG. 6 shows information of flags in the motion information database 17.

FIG. 7 shows information as to correction parameter flags in the motion information database 17. Specific example of the motion information will be shown in the following, with reference to FIG. 5A.

(1) The column "motion ID" of the motion information stored in the motion information database 17 shows motion ID numbers for identifying individual motions of the robot arm 5 for causing the robot arm 5 to execute a task. (2) The column "key motion ID" of the motion information shows key motion ID numbers for identifying individual motions (key motions) (commands) in a control program for controlling the motions of the robot arm 5.

(3) The column "position orientation" of the motion information shows information as to the hand position and orientation of the robot arm 5 in one motion. It is to be noted that, in the first embodiment, coordinates of hand position and orientation are expressed by metric (m) unit system, as one example.

(4) The column "force" of the motion information shows information as to a force applied to an object corresponding to a task-target when the robot arm 5 performs a task (i.e., a task-target object, e.g., the task-use jigs 9, 46, and 72 or a flexible circuit board 74). It is to be noted that, in the first embodiment, it is expressed by Newton (N) unit.

(5) The column "flag" of the motion information shows information as to flags indicative of whether any piece of information among parameters of hand position and orientation of the robot arm 5 and force is valid or not.

(6) The column "hand" of the motion information shows information representing a hand open/closed state indicative of whether the hand 30 is open or closed.

(7) The column "time" of the motion information shows information as to time for executing key motions of the robot arm 5. It is to be noted that, in the first embodiment, it is expressed by second (sec) unit.

(8) The column "correction parameter flag" of the motion information shows information as to to-be-corrected parameter types, in making a correction of the motion information in the motion information database 17 using the motion correction unit 20, the description of which will be given later.

As used herein, the "task" refers to a task such as a stirring task or a wipe-cleaning task, for example, that is executed by the robot arm 5 according to a certain procedure.

Further, the "motion" refers to the motion of the robot arm 5 for causing the robot arm 5 to execute the "task" such as a stirring task or a wipe-cleaning task, for example. Execution of at least one "motion" causes the robot arm 5 to execute the "task".

Further, the "key motion" refers to a command (instruction) for causing the robot arm 5 to perform a certain "motion" at a certain time in a control program for controlling the motions of the robot arm 5. By structuring the "motion" with a plurality of "key motions" (commands) and exerting control such that the control apparatus executes the plurality of "key motions" (commands) in a time-oriented manner, the "motion" of the robot arm 5 can be achieved.

The "position orientation" of the motion information database 17 shown in FIG. 5A, that is, information as to the hand position and orientation of the robot arm represents the aforementioned hand position and orientation of the robot arm 5, and is expressed as (x, y, z, $\phi$, $\theta$, $\psi$) based on the origin position $O_e$ and orientation.

The information as to force indicates information as to a force applied to an object corresponding to a task-target when the robot arm 5 performs a task (task-target object), and the x-, y-, z-, $\phi$-, $\theta$-, and $\psi$-direction components of force is represented as ($f_x$, $f_y$, $f_z$, $f_\phi$, $f_\theta$, $f_\psi$). For example, when $f_z$=5 [N], it represents that a task is performed by applying a force of 5 [N] in the z-axis direction. Specifically, it is used in such a situation where a wipe-cleaning task is performed relative to the top board 6a of an IH cooking heater 6 or the like and a force is applied to the surface of the top board 6a so as to be scrubbed.

The information as to "flag" of the motion information database 17 shown in FIG. 5A is the values indicative of whether any piece of information among those as to the hand position and orientation of the robot arm 5 and the force based on the motion information indicated by respective "key motion IDs" is valid or not. Specifically, FIG. 6 reflects the information represented by numerical values of 32 bits in FIG. 5A, in which respective bit numbers are associated with the parameters of position and orientation and force. In FIG. 6, respective bits each assume "1" in a case where respective values of hand position and orientation and the force are valid; and assume "0" when the hand position and orientation and the force values are invalid. For example, the 0th bit assumes "1" when the x-coordinate value of the hand position of the robot arm 5 is valid, and assumes "0" when invalid. Further, the 1st bit assumes "1" when the y-coordinate value of the hand position of the robot arm 5 is valid; and assumes "0" when invalid. Still further, the 2nd bit assumes "1" when the z-coordinate value of the hand position of the robot arm 5 is valid; and assumes "0" when invalid. In succession thereto, the 3rd, 4th, and 5th bits indicate the validity of orientation $\phi$, $\theta$, $\psi$ (that is, they each assume "1" when valid, and "0" when invalid). Still further, the 6th to 11th bits respectively indicate whether the respective force components are valid or invalid (that is, they each assume "1" when valid, and "0" when invalid). It is to be noted that, extra pieces of information as to flags (32 bits) are prepared for future expansion. In the present example, the 12th to 31st bits are unused, and therefore these bits assume "0". However, variables with which only 12 bits can be stored may be employed. FIG. 6 shows key motion flags of "key motion ID" "1" in the motion information database 17 shown in FIG. 5A. The 0th and 1st bits, 3rd to 5th bits, and 8th bit each assume "1", and hence it is indicated that, among the hand position and orientation information pieces of the motion information, the x, y, $\phi$, $\theta$, $\psi$ information pieces and the $f_z$ information only out of force information pieces are valid. As a result, among the motion information, the 2nd bit, 6th and 7th bits, and 9th to 11th bits each assume "0". Therefore, whatever values are stored for the z, $f_x$, $f_y$, $f_\phi$, $f_\theta$, $f_\psi$ values, they are invalid.

The information as to "hand" shown in FIG. 5A is the flag indicative of the state of open and close of the hand 30 during a motion. When the hand 30 is open, it is shown "0"; when the hand 30 is closed, it is shown "1".

The information as to "time" in the motion information database 17 shown in FIG. 5A is the time for executing the key motions of the robot arm 5. That is, it is indicated that the robot arm 5 performs the motion stored by the "key motion ID" by taking the time that is stored as the corresponding information as to "time". The "time" is not the absolute time point, but it represents the relative time from the previous motion. That is, it represents a time period until the hand 30 of the robot arm 5 shifts to "position orientation" indicated by the "key motion ID", or until when the "force" indicated by the "key motion ID" is reached.

The information as to "correction parameter flag" of the motion information database 17 in FIG. 5A is information representing which parameter is to be corrected by the motion correction unit 20, the description of which will be given later. Specifically, it is represented by numerical values of 32 bits shown in FIG. 7. In FIG. 7, respective bits each assume "1" in a case where respective values of hand position and orientation and the force are correctable; and assume "0" when respective values of hand position and orientation and the force are uncorrectable. For example, the 0th bit assumes "1" when the x-coordinate value of the hand position can be corrected, and assumes "0" when the x-coordinate value of the hand position is uncorrectable. Further, the 1st bit assumes "1" when the y-coordinate value of the hand position is correctable, and assumes "0" when the y-coordinate value of the hand position is uncorrectable. Still further, the 2nd bit assumes "1" when z-coordinate value of the hand position is correctable, and assumes "0" when the z-coordinate value of the hand position is uncorrectable. In succession thereto, the 3rd, 4th, and 5th bits indicate the correction allowance of orientation $\phi$, $\theta$, $\psi$ (that is, they each assume "1" when correctable and "0" when uncorrectable). Still further, the 6th to 11th bits respectively indicate the correction allowance of respective components of force (that is, they each assume "1" when correctable, and "0" when uncorrectable). It is to be noted that, extra pieces of information as to flags (32 bits) are prepared for future expansion. In the present example, the 12th to 31st bits are unused, and therefore these bits assume "0". However, variables with which only 12 bits can be stored may be employed.

The information in the motion information database 17 is previously set so as to form a database. However, inputs and updates of the hand position orientation of the robot arm 5 and force may be executed as teaching through the use of the robot arm 5, the description of which is given in the following.

Figure 8:
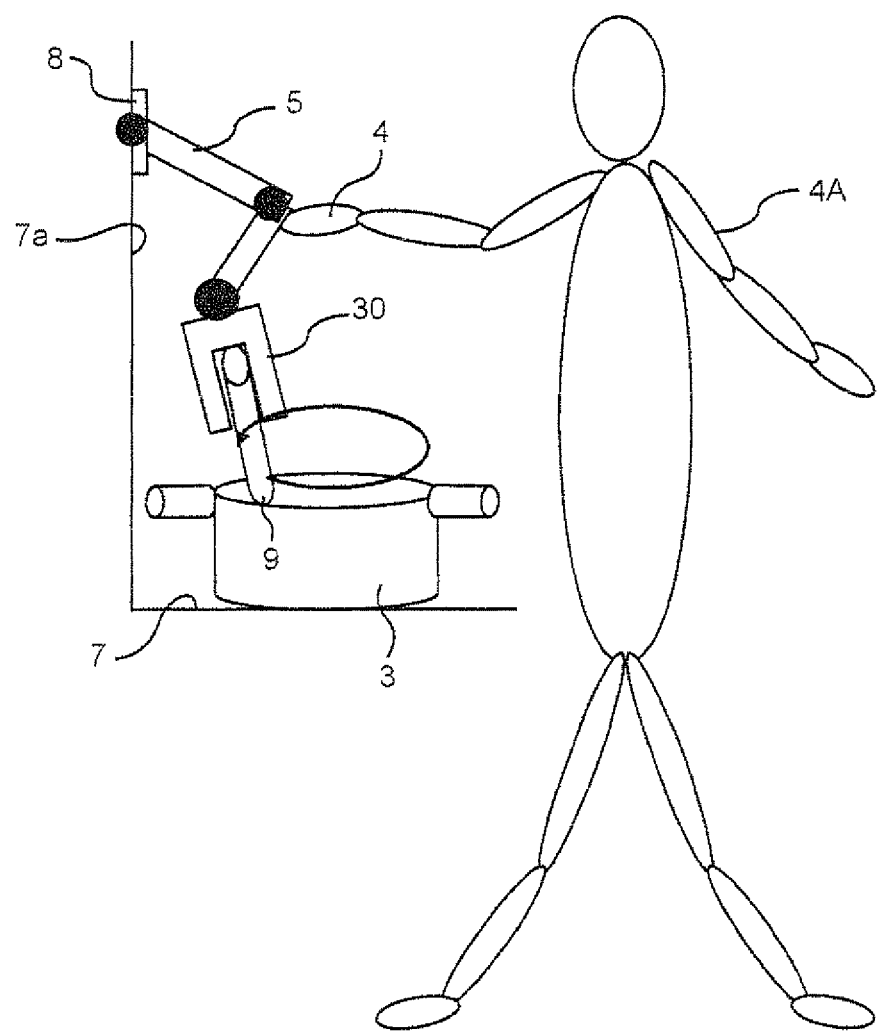
FIG. 8 is a view showing a motion of the control apparatus for the robot arm and a manipulation state of a person according to the first embodiment of the present invention.

FIG. 8 shows a state of teaching by the person 4A through the use of the robot arm 5 according to the first embodiment of the present invention.

The information as to the hand position orientation of the robot arm 5 and time is created in the following manner. For example, as shown in FIG. 8, the person 4A directly grips the robot arm 5 with the hand 4, and shifts the robot arm 5 in the impedance control mode, the description of which will be given later. At this time, the database input/output unit 28 acquires the information as to the hand position and orientation of the robot arm 5 every certain time period (e.g., every 0.2 msec) via the control unit 22 and the control parameter managing unit 21. The database input/output unit 28 stores the acquired information as to the hand position and orientation of the robot arm 5 together with the time in the motion information database 17. In this manner, the information as to the hand position orientation of the robot arm 5 and time can be created in the motion information database 17.

Further, the force information of the motion information database 17 is created by inputting the value of a force desired to be applied in the motion information database 17, through the use of the data input IF 26 and via the database input/output unit 28.

It is to be noted that, in the present embodiment, the pieces of information as to the hand position orientation of the robot arm 5 and time are successively created. However, the information as to position and orientation and the information as to time can individually be input by the person 4A through the use of the external input device 26a such as a keyboard, a mouse, a microphone or the like.

—Environment Information Database—

The environment information database 18 stores therein information as to position and state of an object around the robot arm 5 when the robot arm 5 operates, and information as to position and state of an object which is attributed to the person 4A and the robot arm 5 directly acting on the ambient environment (hereinafter, such information pieces are referred to as the environment information). The environment information is acquired by the environment information acquiring unit 19, the description of which will be given later. Then, from the environment information acquiring unit 19 via the database input/output unit 28, the environment information is stored in the environment information database 18.

Next, the environment information database 18 will be detailed.

FIG. 9A shows the environment information being the data in the environment information database 18.

FIG. 9B shows information of flags in the environment information database 18.

(1) The column "environment ID" of the environment information stored in the environment information database 18 shows environment ID numbers for identifying individual environment information pieces.

(2) The column "image ID" of the environment information shows image ID numbers identifying images picked up by the first and second image pickup apparatuses 15a and 15b functioning as one example of the environment information acquiring unit 19. In this example, file names are used.

(3) The column "image pickup apparatus ID" of the environment information shows ID numbers identifying which one of two image pickup apparatuses 15a and 15b was used to capture images. In this example, "1" is shown when captured by the first image pickup apparatus 15a, and "2" is shown when captured by the second image pickup apparatus 15b.

(4) The column "force" of the environment information shows information as to a force detected by the force detecting unit 53 (force information).

The information as to force represents the information as to a force detected by the force detecting unit 53 of the robot arm 5, and the components of a force in x-, y-, z-, φ-, θ-, and ψ-directions are expressed as $(f_x, f_y, f_z, f_\phi, f_\theta, f_\psi)$.

(5) The column "flag" of the environment information shows information as to flags indicative of whether any piece of information among parameters of force and image of the environment information is valid or not.

The information as to "flag" of the environment information database 18 shown in FIG. 9A is the values indicative of whether any piece of information among those as to image and force of the environment information indicated by respective "environment IDs" is valid or not. Specifically, it is represented by numerical values of 32 bits shown in FIG. 9B. In FIG. 9B, respective bits each assume "1" in a case where respective values of image and force are valid; and assume "0" when the respective values of image and force are invalid. In the first embodiment, the 0th to 5th bits indicate force information, and the 6th bit indicates image information. For example, the 0th bit assumes "1" when the x-coordinate value of force is valid, and assumes "0" when invalid. Further, the 1st bit assumes "1" when the y-coordinate value of force is valid; and assumes "0" when invalid. Further, the 2nd bit assumes "1" when the z-coordinate value of force is valid; and assumes "0" when invalid. In succession thereto, the 3rd, 4th, and 5th bits indicate the validity of force φ, θ, ψ. That is, they each assume "1" when valid, and assume "0" when invalid. Still further, the 6th bit indicates whether the image captured by the first or second image pickup apparatus 15a or 15b is valid or invalid (that is, it assumes "1" when valid, and assumes "0" when invalid).

It is to be noted that, extra pieces of information as to flags (32 bits) are prepared for future expansion. In the present example, the 7th to 31st bits are unused, and therefore these bits each assume "0". However, variables with which only 6 bits can be stored may be employed. In FIG. 9B, the 0th to 5th bits each assume "0", and the 6th bit assumes "1". Therefore, it is indicated that only the image information of the environment information is valid.

—Control Rule Database—

The control rule database 16 stores therein information as to control rules of the robot arm 5 when the robot arm 5 actuates (hereinafter, referred to as the control rule information). The control rule information is generated by the control rule generating unit 23, the description of which will be given later. The database input/output unit 28 allows the control rule generating unit 23 and the control rule database 16 to exchange the generated information or information required for such generation. Further, the database input/output unit 28 allows the control rule generating unit 23 and other databases 18, 17, and 29 to exchange the information and the like required for such generation.

Next, the control rule database 16 will be detailed with reference to FIGS. 10A and 10B.

Figure 10B:
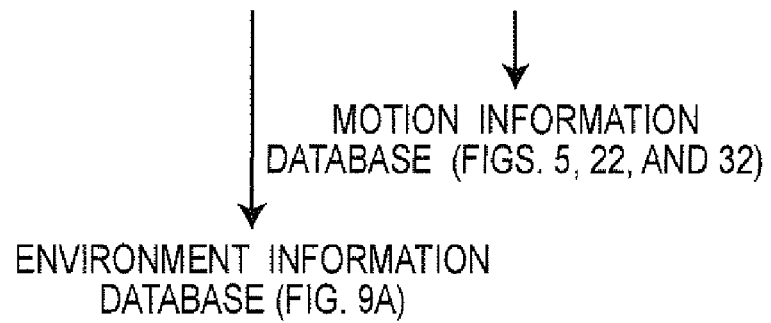
FIG. 10B is a view describing a list of control rules in the control rule database of the control apparatus.

FIGS. 10A and 10B are each one example of the control rules in the control rule database 16.

(1) The column "task ID" of the control rules stored in the control rule database 16 shows task ID numbers for identifying task information pieces.

(2) The column "environment ID" of the control rules shows environment ID numbers identifying individual environment information pieces, and it permits reference to the values of the environment IDs in the environment information database 18. When reference to the values of environment IDs in the environment information database 18 is not permitted, it is stored as "−1".

(3) The column "motion ID" of the control rules shows motion ID numbers identifying the motions of the robot arm 5 included in any task, and it permits reference to the motion IDs in the motion information database 17.

(4) The column "progress information" of the control rules indicates whether or not prescribed motions of the robot arm 5 are in motion. The database input/output unit 28 stores "1" when in motion and "0" when not, in the control rule database 16. Specifically, when a task is started by the motion instruction unit 27, the database input/output unit 28 stores "1" for any motion presently being operated (executed) by the robot arm 5 in the control rule database 16, and the database input/output unit 28 stores "0" for any motion not presently being operated (executed) in the control rule database 16.

—Detecting Unit Selection Rule Database—

The detecting unit selection rule database 29 stores therein rules for selecting the to-be-preferentially-acquired environment information type (i.e., the detecting unit selection rules) out of a plurality of environment information pieces, in accordance with the control mode of the robot arm 5, in acquiring the environment information upon manipulation of the robot arm 5. The detecting unit selection rule database 29 is previously prepared in the robot 1, and through the database input/output unit 28, the information of the detecting unit selection rules is input and output.

Next, with reference to FIGS. 11A and 11B, the detecting unit selection rule database 29 will be detailed.

FIG. 11A shows the detecting unit selection rules in the detecting unit selection rule database 29.

FIG. 11B shows the information as to environment information types of the detecting unit selection rules in the detecting unit selection rule database 29.

(1) The column "control mode" of the detecting unit selection rules stored in the detecting unit selection rule database 29 shows information as to control modes of the robot arm 5. This is specifically described later in connection with the control parameter managing unit 21 of the control apparatus body unit 11.

(2) The column "environment information type ID" of the shows identification IDs for identifying the environment information types of the detecting unit selection rules. The identification IDs of the environment information are IDs for identifying the type of any environment information acquired by the environment information acquiring unit 19 being a detecting unit, e.g., various sensors (e.g., force detecting unit 53) installed in the robot arm 5, or various sensors (e.g., first or second image pickup apparatus 15a or 15b) of the robot 1. The "environment information type IDs" in FIG. 11A are defined in FIG. 11B. Specifically, as the detecting unit selection rules, in a case where the "environment information type ID" is "1" as shown in FIG. 11B, it represents an image captured by the first or second image pickup apparatus 15a or 15b as one example of the detecting unit, and in a case where the "environment information type ID" is "2", it represents a force detected by the force detecting unit 53 as another example of the detecting unit.

—Database Input/Output Unit—

The database input/output unit 28 allows data to be exchanged among a group of databases (the motion information database 17, the environment information database 18, the control rule database 16, and the detecting unit selection rule database 29), the motion instruction unit 27, the control rule generating unit 23, the environment information acquiring unit 19, and the motion correction unit 20. Hence, the database input/output unit 28 is capable of functioning as one example of a motion information acquiring unit and a correction motion information acquiring unit. That is, the database input/output unit 28 is capable of functioning as a motion information acquiring unit that acquires motion information from the motion information database 17 which stores therein at least one of the position and orientation and speed of the robot arm 5 as being corresponding to a motion of the robot arm 5 as motion information in a time-oriented manner, or as a motion information acquiring unit that acquires the motion information from the motion information database 17 which stores therein any force that the robot arm 5 applies to the task-target objects 9, 46, 72, and 74 as being corresponding to a motion of the robot arm 5 as motion information in a time-oriented manner. Also, the database input/output unit 28 is capable of functioning as a correction motion information acquiring unit that acquires correction motion information corresponding to at least one piece of the motion information among the motion information pieces acquired by the motion information acquiring unit, when the person 4A manipulates the robot arm 5 to correct the motion of the robot arm 5, or as a correction motion information acquiring unit that acquires correction motion information relating to the motion information acquired by the motion information acquiring unit and relating to the force that the robot arm 5 applies, when the person 4A manipulates the robot arm 5 to correct the motion of the robot arm 5.

It goes without saying that the database input/output unit 28 may be divided into a motion information acquiring unit that inputs and outputs the motion information, a correction motion information acquiring unit that inputs and outputs the correction motion information, and another information acquiring unit that inputs and outputs other information.

—Environment Information Acquiring Unit—

The environment information acquiring unit 19 acquires environment information being information as to the task-target objects 9, 46, 72, and 74 on which the robot arm 5 acts, that is, information as to the position and state of an object around the robot arm 5 when the robot arm 5 operates, and information as to the position and state of an object attributed to the person 4A and the robot arm 5 directly acting on the ambient environment. Specifically, the image captured by the first or second image pickup apparatus 15a or 15b and the information as to a force detected by the force detecting unit 53 are acquired, and the image acquired by the first or second image pickup apparatus 15a or 15b and the information as to a force detected by the force detecting unit 53 are output from the environment information acquiring unit 19 to the control rule generating unit 23 and the motion instruction unit 27. Hence, the first and second image pickup apparatuses 15a and 15b and the force detecting unit 53 each function as one example of the environment information acquiring unit —Motion Instruction Unit—

The motion instruction unit 27 receives from the data input IF 26a motion start instruction of a task of a "task ID" specified by the person 4A via the data input IF 26. Upon receipt of the motion start instruction of the task of the specified "task ID", the motion instruction unit 27 refers the specified "task ID" in the control rule database 16 via the database input/output unit 28, and instructs the control parameter managing unit 21 to start the task of that "task ID".

In the following, a description will be given of the function of the motion instruction unit 27.

The person 4A selects a task desired to be executed by the robot arm 5 out of tasks relating to the "task IDs" in the tasks in the control rule database 16 via the data input IF 26 while using display images which show tasks and the like displayed on the display unit 95, and inputs the selected task information in the motion instruction unit 27 to specify the same.

The motion instruction unit 27 refers to the control rule database 16 via the database input/output unit 28, and executes the motion of the "motion ID" corresponding to the specified "task ID". As used herein, execution of the "motion ID" means that the motion instruction unit 27 refers to the motion information database 17 via the database input/output unit 28, and sets a control mode according to the flags (i.e., flags indicative of whether valid or invalid) based on the corresponding key motion (specifically, position information, orientation information, time information, and force information) instructs the control parameter managing unit 21 such that the robot arm 5 operates accordingly.

When the motion instruction unit 27 refers to the control rule database 16 via the database input/output unit 28, in a case where the motion instruction unit 27 determines that environment information pieces of a plurality of "environment IDs" exist in a task relating to one "task ID", or in a case where the motion instruction unit 27 determines that motions of a plurality of "motion IDs" exist in a task relating to one "task ID", such environment information pieces or motions are executed from top to bottom in order of alignment in the control rule database 16.

Here, when the "environment ID" assumes a value of "−1", it means that no reference is made to the value of the "environment ID" in the environment information database 18. Hence, irrespective of the ambient environment in which the robot arm 5 operates, the motion instruction unit 27 refers via the database input/output unit 28 to the motion information database 17 for the motion of the "motion ID" which is identical to the ID described by the "motion ID".

In the following, a description will be given of a case where the person 4A selects "task ID" "1" via the data input IF 26, and of a case where the person 4A selects "task ID" "2".

(The Case where "Task ID" "1" is Selected)

Specifically, in the case where the task having "task ID" "1" in FIG. 10A is selected, and when the "environment ID" of the task having "task ID" "1" assumes the value of "−1", then the motion here is "motion ID" "1". Accordingly, the motion instruction unit 27 refers to the "motion ID" in the motion information database 17 via the database input/output unit 28 so as to cause the robot arm 5 to execute the motion, irrespective of the environment. In this example, because "motion ID" "1" is stored in the control rule database 16, the motion instruction unit 27 refers to, via the database input/output unit 28, key motions (commands) corresponding to "key motion IDs" "1", "2", "3", "4", "5", "6", "7", and "8" corresponding to the motion of "motion ID" "1" in the motion information database 17 in FIG. 5A in order.

In the case of the key motion (command) corresponding to "key motion ID" "1" in the motion information database 17, "flag" shows "1" for each of the 0th, 1st, 3rd, 4th, 5th, and 8th bits. Therefore, it is shown that values x, y, φ, θ, ψ of the hand position of the robot arm 5 and the z-coordinate value of force are valid. Hence, the motion instruction unit 27 instructs via the database input/output unit 28 the control parameter managing unit 21 to cause motions in the position control mode as to the x-, y-, φ-, θ-, and ψ-axes, and to cause motions in the force control mode as to the z-axis (equivalent to the instruction of the force hybrid impedance control). Similarly, in cases where the key motions (commands) correspond to "key motion IDs" "2" to "8", the motion instruction unit 27 instructs via the database input/output unit 28 the control parameter managing unit 21 to cause motions in the force hybrid impedance control mode.

(The Case where "Task ID" "2" is Selected)

Similarly, when the task having "task ID" "2" in FIG. 10A is selected, the "environment ID" of the task having "task ID" "2" assumes the value of "−1", and the motion here is "motion ID" "2". Accordingly, the motion instruction unit 27 refers to the "motion ID" in the motion information database 17 via the database input/output unit 28 so as to cause the robot arm 5 to execute the motion, irrespective of the environment. In this example, because "motion ID" "2" is stored in the control rule database 16, the motion instruction unit 27 refers to, via the database input/output unit 28, key motions (commands) corresponding to "key motion IDs" "10", "11", "12", "13", "14", "15", "16", and "17" corresponding to the motion of "motion ID" "2" in the motion information database 17 in FIG. 5A in order.

Here, in the case of the key motion (command) corresponding to "key motion ID" "10", "flag" shows "1" for each of the 0th to 5th bits. Therefore, the motion instruction unit 27 instructs via the database input/output unit 28 the control parameter managing unit 21 to cause motions in the position control mode as to all the x-, y-, z-, φ-, θ-, and ψ-axes.

When the motion is executed in response to the input from the input from the external input device 26a, the motion instruction unit 27 sets, via the database input/output unit 28, "1" to "progress information" of "motion ID" which is in-motion in the control rule database 16, and stores, via the database input/output unit 28, information that the "progress information" of the "motion ID" which is in-motion is "1" in the control rule database 16. The motion instruction unit 27 sets "0" to "progress information" of the other "motion IDs", and stores, via the database input/output unit 28, information that the "progress information" of the other "motion IDs" is "0" in the control rule database 16.

Here, a description will be given of a specific task example.

Figure 12:
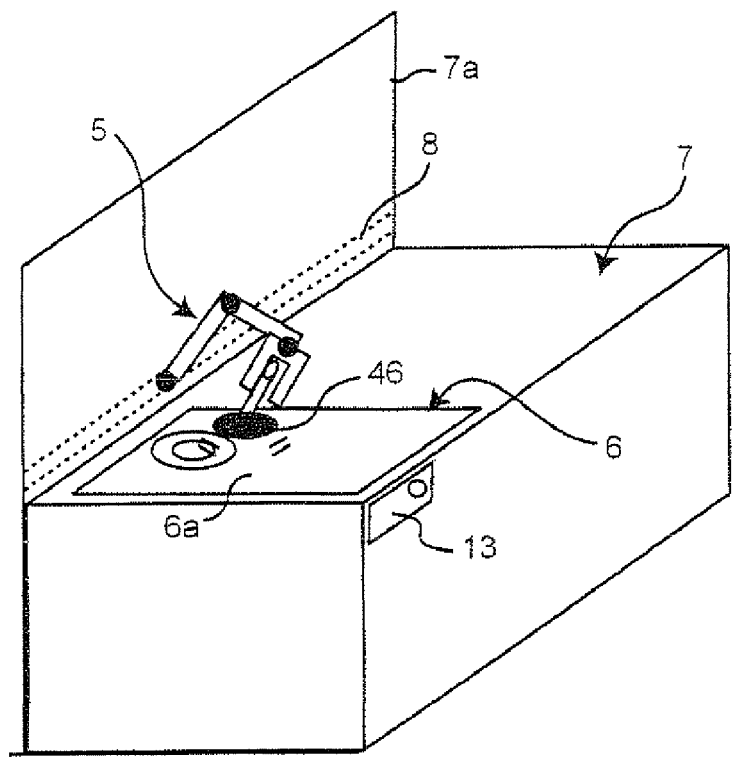
FIG. 12 is a view showing a motion state of the control apparatus for the robot arm according to the first embodiment of the present invention.

When the person 4A uses the data input IF 26 to select the task having "task ID" "1" out of the tasks in the control rule database 16, the motion instruction unit 27 instructs, via the database input/output unit 28, the control parameter managing unit 21 to perform the task governing the z-axis direction in the force control mode and the other axes directions in the position control mode. As a result, the control parameter managing unit 21 commands, as will be described later, the control unit 22 such that the robot arm 5 operates in accordance with the control mode. Under the control exerted by the control unit 22, as shown in FIG. 12, the robot arm 5 starts a wipe-cleaning task of the top board 6a of the cooking appliance 6 such as the IH cooking heater.

Figure 13A:
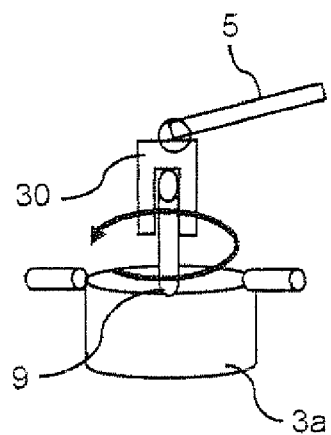
FIG. 13A is a view showing a motion state of the control apparatus for the robot arm according to the first embodiment of the present invention.

When the person 4A uses the data input IF 26 to select the task having "task ID" "2" out of the tasks in the control rule database 16, the motion instruction unit 27 instructs, via the database input/output unit 28, the control parameter managing unit 21 to perform a stirring motion in the position control mode. As a result, the control parameter managing unit 21 commands, as will be described later, the control unit 22 such that the robot arm 5 operates in accordance with the control mode. Under the control exerted by the control unit 22, as shown in FIG. 13A, the robot arm 5 starts the stirring motion.

On the other hand, in a case where the task having "task ID" "1" in FIG. 10A is selected and where the "environment ID" of the task having "task ID" "1" does not assume the value of "−1", the motion instruction unit 27 refers, via the database input/output unit 28, to the environment information database 18 for any environment information bearing the same "environment ID" as the ID stored by the "environment ID". Only when the motion instruction unit 27 determines that the environment information (specifically, image information and force information) bearing the "environment ID" identical to the "environment ID", which environment information is verified to be valid based on the flags contained therein, agrees with the environment information acquired by the environment information acquiring unit 19, the description of which will be given later, the motion of the "motion ID" is executed by the motion instruction unit 27. A detailed description thereof will be given later in connection with the control rule generating unit 23.

Further, when the selected "task ID" contains a plurality of "environment IDs" and "motion IDs", the motion calculation unit 2 of the motion instruction unit 27 calculates eventual to-be-executed motion information, based on flags of respective "environment IDs" and respective "motion IDs" (as used herein, what are meant by the flags are flags found as being stored when the motion instruction unit 27 refers to, via the database input/output unit 28, the motion information database 17 for the "motion ID"). A detailed description of the motion calculation unit 2 will be given later in connection with the control rule generating unit 23.

—Motion Correction Unit—

While the robot arm 5 is controlled in the force control mode by the control apparatus body unit 11, or while the robot arm 5 is shifting in the position control mode by the control exerted by the position control unit 59 of the control unit 22, the motion correction unit 20 can correct motion information pieces in accordance with the correction motion information pieces at respective times acquired by the database input/output unit 28 as one example of the correction motion information acquiring unit. That is, the motion correction unit 20 receives, while the robot arm 5 is operating under control, a motion correcting manipulation start instruction from the data input IF 26 via the motion instruction unit 27. The motion correction unit 20 switches, based on the correction parameter flags of the motion information database 18 via the database input/output unit 28, the control parameter of the robot arm 5, so as to operate the robot arm 5 with the corrected motion (correcting motion), and by the person 4A applying a force to the robot arm 5, the control rules of the robot arm 5 in the control rule database 16 are corrected via the database input/output unit 28.

Here, the control motion of the robot arm 5 means that the motion is performed in one of the following modes: (i) the position control mode; (iii) the force control mode; and (v) the force hybrid impedance control mode being any combination of the foregoing modes for each direction, the description of each of which will be given later.

Further, the correcting motion for the robot arm 5 is a motion of correcting the motion of the robot arm 5 by a force being applied to the robot arm 5 by the person 4A, and means that the motion is performed in one of the following modes: (ii) the impedance control mode; (vi) the high-rigidity position control mode; and (v) the force hybrid impedance control mode being any combination of the foregoing modes set for each direction, the description of each of which will be given later.

In the following, a description will be given of a motion correction.

Via the data input IF 26, the person 4A selects a task desired to be executed by the robot arm 5 out of the tasks relating to the "task IDs" in the control rule database 16, and causes the motion to be executed by the motion instruction unit 27.

Here, when the task having "task ID" "2" in FIG. 10A is selected, the motion instruction unit 27 instructs the control parameter managing unit 21 to perform a stirring motion in the position control mode. Hence, as shown in FIG. 13A, the robot arm 5 starts the stirring motion. Here, in a case where the task is the one having "task ID" "2", the "environment ID" assumes the value of "−1" (see FIG. 10A). Therefore, irrespective of the environment information in which the robot arm 5 operates, the motion is operated as stored by the "motion ID" (specifically, operated in the motion having "motion ID" "2").

Next, when the person 4A instructs, from the data input IF 26 via the motion instruction unit 27, the motion correction unit 20 about a motion correcting manipulation start, the motion correction unit 20 proceeds to process the motion correction.

FIG. 13 is a view describing the correcting motion of the robot arm 5 according to the first embodiment of the present invention.

Figure 13B:
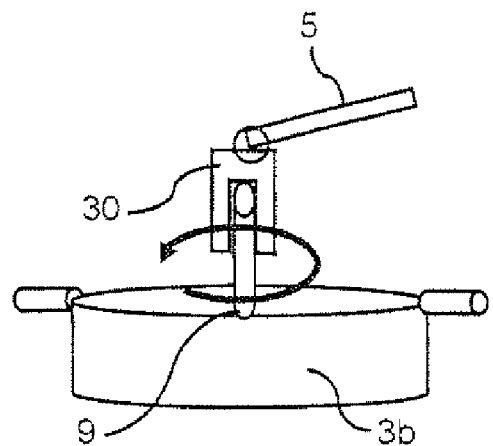
FIG. 13B is a view showing a motion state of the control apparatus for the robot arm according to the first embodiment of the present invention.
Figure 13C:
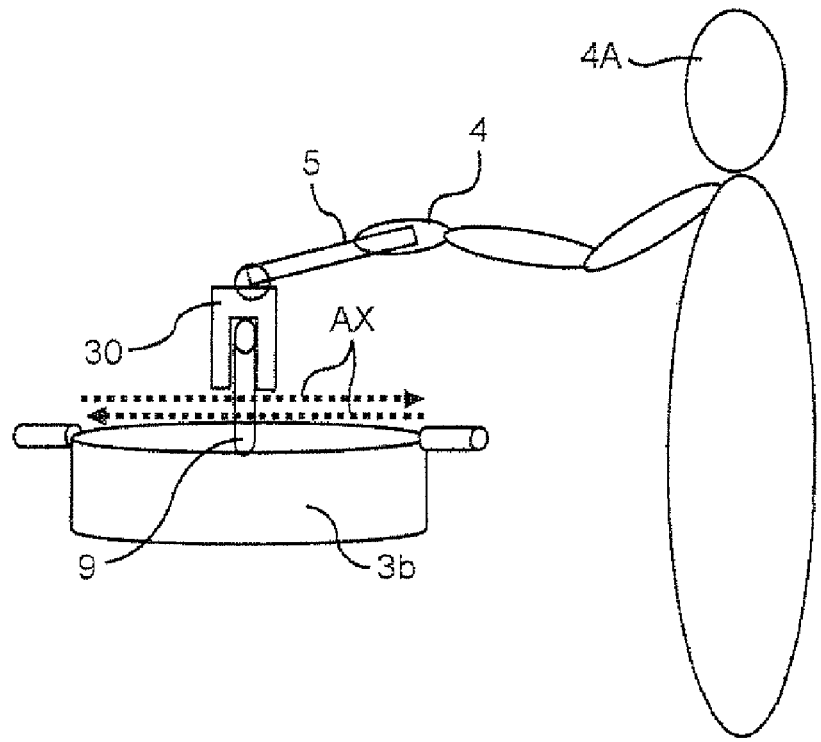
FIG. 13D is a view showing a motion of the control apparatus for the robot arm and a manipulation state of a person according to the first embodiment of the present invention.
FIG. 13E is a view showing a motion state of the control apparatus for the robot arm according to the first embodiment of the present invention.
Figure 13D:
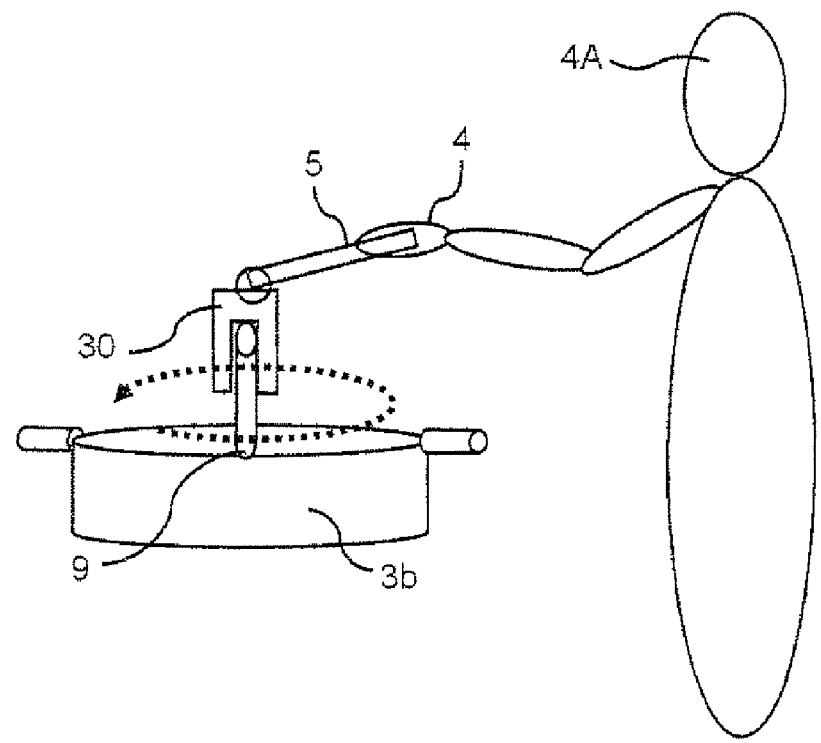
Figure 13E:
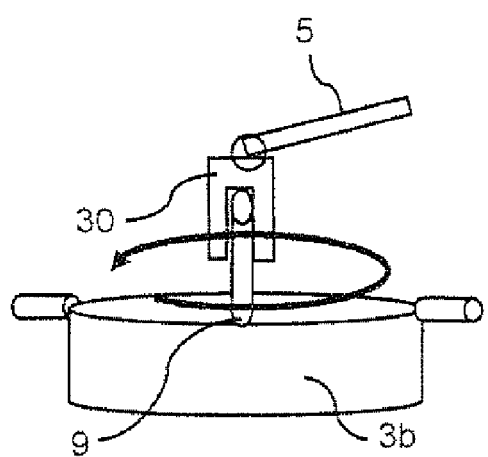

In the first embodiment, a description will be given of a case where the robot arm 5 holding a ladle 9 with the hand 30 stops stirring in a pot 3a shown in FIG. 13A, and performs a stirring motion in a pot 3b whose diameter is greater than that of the pot 3a, as shown in FIG. 13E. Here, unless a motion correction is executed, because the task having "task ID" "2" has the "environment ID" assuming the value of "−1", the motion described by the "motion ID" is performed, irrespective of the size of the pot. Therefore, even when the pot 3a is replaced by the pot 3b having a greater diameter, stirring of a small diameter is performed as shown in FIG. 13B. Accordingly, there arises a problem that the ingredients in the pot 3b are not blended well.

Then, the person 4A checks the size of the pot 3b, and in order to stir with the ladle 9 with a great motion so as to conform with the diameter of the pot 3b as shown in FIG. 13E, and corrects the stirring motion of the robot arm 5.

To this end, the person 4A performs the following two input manipulations.

The first input manipulation is a manipulation of reporting a change in the task environment (hereinafter, referred to as the environmental change reporting manipulation). In the first embodiment, the manipulation is a manipulation for reporting to the robot arm 5 that the pot 3a being the target of the stirring motion is changed to the pot 3b with a greater diameter.

The second input manipulation is a manipulation for correcting the actual motion of the robot arm 5 (hereinafter, referred to as the motion correcting manipulation.

In the first embodiment, at the time point where the environmental change reporting manipulation is started, which is the manipulation for correcting the motion such that the stirring motion of a great motion is performed as shown in FIG. 13E, the stirring motion of the robot arm 5 stops. Subsequently, the environmental change reporting manipulation ends, and the stirring motion of the robot arm 5 is resumed. The person 4A performs the motion correcting manipulation while the robot arm 5 is performing the stirring motion.

Via the data input IF 26, the person 4A inputs an environmental change reporting manipulation start instruction to the motion instruction unit 27. When the environmental change reporting manipulation start instruction is input to the motion instruction unit 27, the motion instruction unit 27 stops the motion of the robot arm 5. Then, at the time point where the environmental change reporting manipulation by the person 4A has finished, subsequently, the person 4A inputs a motion correcting manipulation start instruction to the motion instruction unit 27 via the data input IF 26. When the motion instruction unit 27 receives the motion correcting manipulation start instruction via the data input IF 26, the motion instruction unit 27 determines that the environmental change reporting manipulation has finished, and resumes the motion of the robot arm 5 to start a motion correcting manipulation. At this time, the person 4A performs the motion correcting manipulation to the motion of the robot arm 5.

When the motion instruction unit 27 receives, via the data input IF 26, the environmental change reporting manipulation instruction or the motion correcting manipulation instruction, it provides the motion correction unit 20 and the control rule generating unit 23, the description of which will be given later, with their respective environmental change reporting manipulation start information or the motion correcting manipulation start information.

Figure 30A:
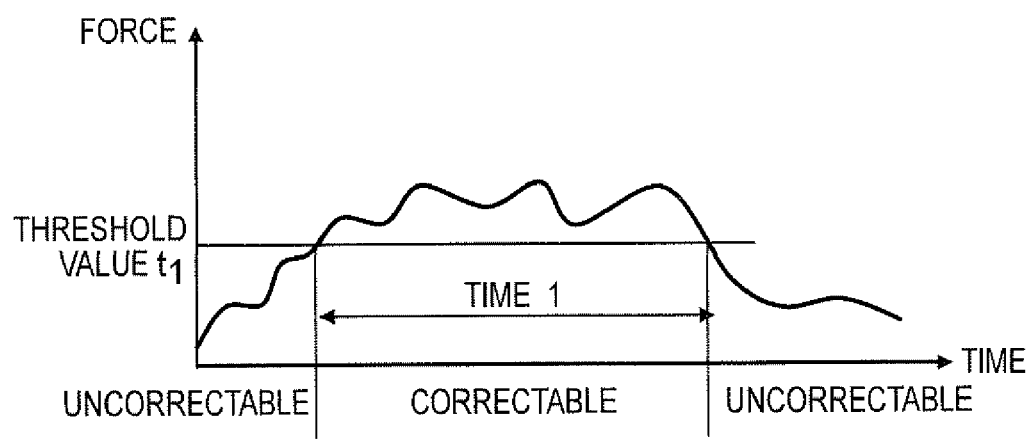
FIG. 30A is a graph showing the relationship between a force applied by a person and the corresponding time according to the first embodiment.
Figure 30B:
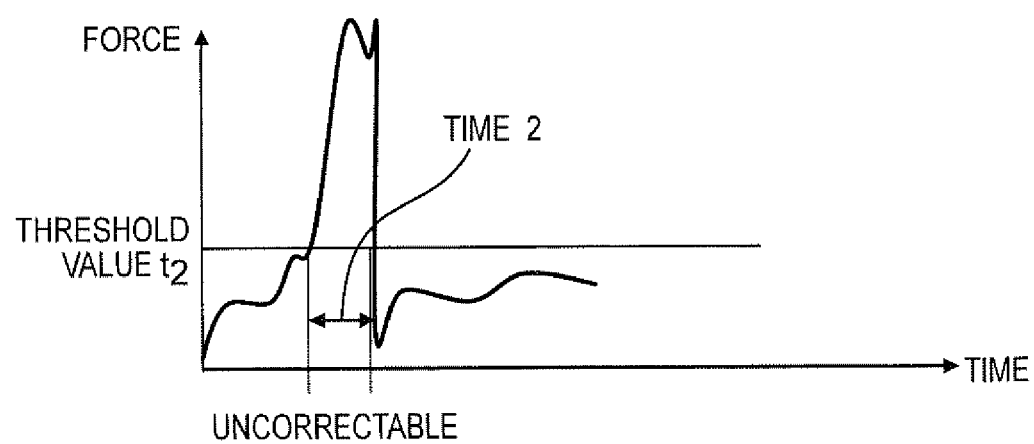
FIG. 30B is a graph showing the relationship between a force applied by a person and the corresponding time according to the first embodiment.

The specific manipulation instruction is as follows. While the robot arm 5 is executing the stirring motion in the position control mode, the person 4A grips the robot arm 5 with the hand 4 to apply a force toward which a correction of the robot arm 5 is desired. At this time, as shown in FIG. 30A, when the force that the person 4A applies to the robot arm 5 (i.e., the force detected by the force detecting unit 53, the description of which will be given later) is equal to or more than a certain threshold value (i.e., a value $t_1$ in FIG. 30A) and such a state continues for a period equal to or more than a certain time period (i.e., a time "time 1" in FIG. 30A) (i.e., in a case where a time detected by a timer 21a of the control parameter managing unit 21 continues for a period equal to or more than the certain time period, the description of which will be given later), the motion instruction unit 27 determines that the environmental change reporting manipulation start instruction is input. Conversely, as shown in FIG. 30B, when the force that the person 4A applies to the robot arm 5 is less than the certain threshold value (i.e., a value $t_2$ in FIG. 30B), or, even when it is equal to or more than the certain threshold value (i.e., the value $t_2$ in FIG. 30B) but such a state continues for a period (i.e., a time "time 2" in FIG. 30B) less than the certain time period (i.e., the time "time 1" in FIG. 30A), the motion instruction unit 27 determines that the environmental change reporting manipulation start instruction is not input. When the motion instruction unit 27 determines that the environmental change reporting manipulation start instruction by the person 4A is input, the motion instruction unit 27 provides the environmental change reporting manipulation start information to the motion correction unit 20.

When the motion instruction unit 27 determines that the environmental change reporting manipulation start instruction is input, the motion instruction unit 27 stops the stirring motion. This stop of the stirring motion allows the person 4A to recognize that the robot 1 has determined that the environmental change reporting manipulation has started. It is to be noted that, as will be described later, information as to a force detected by the force detecting unit 53 is input to the control parameter managing unit 21, and this information as to the force and information as to the time detected by the timer 21a are input from the control parameter managing unit 21 to the motion instruction unit 27, whereby the motion instruction unit 27 can make such determination as described above.

Next, after the person 4A has performed the environmental change reporting manipulation, when the motion instruction unit 27 determines that the force that the person 4A applies to the robot arm 5 becomes smaller than the threshold value (i.e., the value $t_1$ in FIG. 30A), the motion instruction unit 27 determines that the environmental change reporting manipulation has finished, and the motion instruction unit 27 resumes the stirring motion in the position control mode. This resumption of the stirring motion allows the person 4A to recognize that the robot 1 has determined that the environmental change reporting manipulation has finished.

Next, as described above, after the person 4A come to know that the robot 1 has determined that the environmental change reporting manipulation has finished, the person 4A grips the robot arm 5 with the hand 4, and applies a force to the robot arm 5 in the direction toward which the motion of the robot arm 5 is desired to be corrected. As shown in FIG. 30A, when the motion instruction unit 27 determines that the force applied to the robot arm 5 is equal to or more than the certain threshold value (value $t_1$ in FIG. 30A), and that such a state continues for a period equal to or more than the certain time period (time "time 1" in FIG. 30A), the motion instruction unit 27 determines that the person 4A inputs the motion correcting manipulation start instruction. Conversely, as shown in FIG. 30B, when the force that the person 4A applies to the robot arm 5 is less than the certain threshold value (value $t_2$ in FIG. 30B), or even it is equal to or more than the certain threshold value (value $t_2$ in FIG. 30B), when such a state continues for a period (time "time 2" in FIG. 30B) less than the certain time period (time "time 1" in FIG. 30A), the motion instruction unit 27 determines that the motion correcting manipulation start instruction is not input. When the motion instruction unit 27 determines that the person 4A inputs the motion correcting manipulation start instruction, the motion instruction unit 27 provides the motion correcting manipulation start information to the motion correction unit 20. It is to be noted that, when the motion correcting manipulation is not started after a lapse of a certain time period, the environmental change reporting manipulation is considered invalid, and the stirring motion is resumed.

When the motion instruction unit 27 determines that the motion correcting manipulation start instruction is input, the speed of the stirring motion of the robot arm 5 is reduced (e.g., to be half as fast as the speed in the normal stirring motion before the start of the motion correcting manipulation) based on the instruction from the motion instruction unit 27. This reduction in speed allows the person 4A to recognize that the robot 1 has determined that the motion correcting manipulation start instruction has been input. Further, because the speed of the stirring motion becomes slow, it becomes easier for the person 4A to correct the motion of the robot arm 5 which is in motion. While the person 4A is correcting the motion of the robot arm 5, information as to that correcting motion is, as will be described later, acquired by the motion correction unit 20. After the person 4A has corrected the motion of the robot arm 5, when the motion instruction unit 27 determines that the force that the person 4A applies becomes smaller than the threshold value (value $t_1$ in FIG. 30A): the motion instruction unit 27 ends the motion correcting manipulation; the motion instruction unit 27 recovers the speed of the robot arm 5 before the correction; and the motion instruction unit 27 and the motion correction unit 20 execute the corrected motion. When the motion instruction unit 27 determines that the motion correcting manipulation has finished, an instruction from the motion instruction unit 27 increases the speed of the stirring motion of the robot arm 5 (e.g., to be twice as fast as the speed in the stirring motion under the motion correcting manipulation), which allows the person 4A to recognize that the robot 1 has determined that the motion correcting manipulation has finished.

It is to be noted that, in the present example, the motion instruction unit 27 automatically determines and automatically switches the start and end of the environmental change reporting manipulation and those of the motion correcting manipulation based on the force applied by the person 4A. However, start and end of the environmental change reporting manipulation and those of the motion correcting manipulation may manually be changed, based on use of the data input IF 26 such as the person 4A pressing any button. Further, the person 4A is allowed to recognize which manipulation is performed, based on stop or reduction in the speed of the motion of the robot arm 5 caused by the respective manipulations. However, for example, such notice as to which one of the manipulations, i.e., the environmental change reporting manipulation and the motion correcting manipulation, is performed, may be displayed on a monitor or the like as one example of the display unit 95 installed on the wall surface 7a or the like of the workbench 7.

On the other hand, when the motion correction unit 20 receives the environmental change reporting manipulation start information from the motion instruction unit 27, in order to acquire information as to the environmental change reporting manipulation input from the person 4A via the robot arm 5, as to the "motion ID" of the correction-desired "task ID", the motion correction unit 20 sets a control mode in accordance with the flags of the "motion ID" in the motion information database 17, and instructs the control parameter managing unit 21 to operate accordingly.

Specifically, a description will be given of the key motions (commands) having "key motion IDs" "10" to "17" in the motion information database 18, which corresponds to the motion having "motion ID" "2" of the task having "task ID" "2" in FIG. 10A. In FIG. 5A, the flags of the "key motion IDs" show "1" only for the 0th to 5th bits, and show "0" for the others. Therefore, for the motions of the robot arm 5, data is valid only for the x-, y-, z-, φ-, θ-, and ψ-axes. Accordingly, it becomes possible to subject the x-, y-, z-, φ-, θ-, and ψ-axes of the robot arm 5 to the motion correcting manipulation through the use of a force applied by the person 4A. Then, the motion correction unit 20 instructs the control parameter managing unit 21 to operate, for the x-, y-, z-, φ-, θ-, and ψ-axes of the robot arm 5, from the position control mode to the impedance control mode (i.e., the mode in which the robot arm 5 is shifted in the direction toward which the force of the person 4A is detected). Because the position control mode is switched to the impedance control mode, in a state where no force of the person 4A is applied, the robot arm 5 stops; upon application of a force of the person 4A, the robot arm 5 can be shifted in the direction toward which the person 4A applies the force.

Next, after the environmental change reporting manipulation has started, as shown in FIG. 13C, the person 4A performs a manipulation of reporting to the robot arm 5 that the pot 3a is replaced by the pot 3b having a greater diameter (i.e., the environmental change reporting manipulation). Specifically, as shown in FIG. 13C, when the person 4A directly grips the hand 30 of the robot arm 5 or the fore-arm link 32 in the vicinity of the hand 30 with the hand 4, to apply a force in parallel (i.e., along the x-y plane) to the pot bottom surface of the pot 3b, the impedance control mode allows the force of the person 4A to be sensed by the force detecting unit 53, and the robot arm 5 is shifted in the direction toward which the person 4A applies the force to the robot arm 5 (i.e., in the arrow AX direction). In this example, the manipulation of shifting the robot arm 5 in this arrow AX direction by the person 4A is the environmental change reporting manipulation.

Subsequently, after the environmental change reporting manipulation, in order for the motion correction unit 20 to acquire information of the correcting motion of shifting made by the person 4A by applying the force, the motion correction unit 20 acquires the hand position of the robot arm 5 from the control parameter managing unit 21, and the motion correction unit 20 outputs the acquired position to the control rule generating unit 23, the description of which will be given later.

Next, the motion correction unit 20 receives a motion correcting manipulation start instruction from the data input IF 26 via the motion instruction unit 27, the motion correction unit 20 sets a control mode in accordance with the correction parameter flags in the motion information database 17, and instructs the control parameter managing unit 21 to operate accordingly. Specifically, a description will be given of key motions (commands) having "key motion IDs" "10" to "17" in the motion information database 18 corresponding to the motion of "motion ID" "2" of the task having "task ID" "2" in FIG. 10A. In FIG. 5A, the correction parameter flags of each of the "key motion IDs" show "1" only for the 0th, 1st, and 2nd bits, and show "0" for the others. Therefore, for the motions of the robot arm 5, a correction can be made only for the x-, y-, and z-axes. Accordingly, it becomes possible to subject the x-, y-, and z-axes of the robot arm 5 to a correction through the use of the force applied by the person 4A. Then, the motion correction unit 20 instructs the control parameter managing unit 21 to operate, for the x-, y-, and z-axes of the robot arm 5, from the position control mode to the hybrid impedance control mode (i.e., the mode in which, while the robot arm 5 is shifted in the position control mode, the robot arm 5 is shifted under the impedance control toward the direction in which the force of the person 4A is sensed).

Then, as shown in FIG. 13D, when the person 4A directly grips the robot arm 5 to apply a force in a direction along the bottom surface of the pot 3b so as to stir by a greater motion so as to conform to the diameter of the pot 3b, the robot arm 5 executes, as described above, the hybrid impedance control mode. As a result, the robot arm 5 executes: (1) shifting in the position control mode; and (2) shifting in the impedance control mode, in the direction toward which the force is applied by the person 4A, which is the x-axis direction, the y-axis direction, or the x- and the y-axis directions. Because the person 4A desires to make a correction such that stirring is achieved with a greater circular motion on the x-y plane in the pot 3b, than that performed in the pot 3a, the person 4A shifts, as shown in FIG. 13D, the robot arm 5 in parallel to the pot bottom surface by applying a force to the robot arm 5. In order for the motion correction unit 20 to acquire the motion of the robot arm 5 shifted by the person 4A applying the force, the motion correction unit 20 acquires the hand position and time as information as to the motion correcting manipulation of the robot arm 5 from the control parameter managing unit 21 every certain time period (e.g., every 0.2 second), and the motion correction unit 20 outputs the acquired hand position and time to the control rule generating unit 23, the description of which will be given later. The hand position of the robot arm 5 is acquired from the control parameter managing unit 21 via the encoder 44. Further, the time information is acquired by the timer 21a included in the control parameter managing unit 21. Still further, because the control parameter managing unit 21 also receives the information as to a force detected by the force detecting unit 53, the information as to a force detected by the force detecting unit 53 and the time information by the timer 21a are provided from the control parameter managing unit 21 to the motion instruction unit 37, whereby, for example, the determination as to start and end of the environmental change reporting manipulation and as to those of the motion correcting manipulation for the correcting motion can be made as described above.

It is to be noted that, the information as to time is the relative time, in which the time point where the person 4A selects a task and issues a start instruction via the data input IF 26 to the motion instruction unit 27 is regarded as 0.

—Control Rule Generating Unit—

The control rule generating unit 23 associates the motion information corrected by the motion correction unit 20 and the environment information acquired by the environment information acquiring unit 19, to thereby achieve generation of a control rule for the robot arm 5 to operate automatically. That is, while the control motion of the robot arm 5 is being exerted, the description of which control motion will be given later, the control rule generating unit 23 receives a motion correcting manipulation start instruction from the data input IF 26 via the motion instruction unit 27, similarly to the motion correction unit 20. The control rule generating unit 23 generates a control rule based on the motion information corrected by the motion correction unit 20 and the environment information acquired by the environment information acquiring unit 19, and stores the generated control rule in the control rule database 16. Here, the control motion of the robot arm 5 is one of: (ii) the impedance control mode; (i) the position control mode; (iv) the force control mode; and (v) the force hybrid control mode being any combination of the foregoing modes set for each direction.

The control rule generating unit 23 receives, from the motion correction unit 20, the hand position and time of the robot arm 5 generated by the environmental change reporting manipulation of the person 4A in response to the environmental change reporting manipulation start instruction. Further, the control rule generating unit 23 receives, via the database input/output unit 28, the environment information acquired by the environment information acquiring unit 19 by the environmental change reporting manipulation. That is, the environment information is acquired by the environment Information acquiring unit 19 in accordance with the environmental change reporting manipulation of the person to the robot arm 5, and is provided to the control rule generating unit 23 via the database input/output unit 28. Further, the control rule generating unit 23 acquires information as to a control mode of the robot arm 5 by referring to the motion information database 17 via the database input/output unit 28 for an "motion ID" which is in motion at the start of the environmental change reporting manipulation, and based on the information as to flags of the "key motion ID" of that "motion ID".

As a specific example, via the database input/output unit 28, the control rule generating unit 23 refers to the motion information database 18 for the key motions having "key motion IDs" "10" to "17" of the motion having "motion ID" "2" which is in motion for the task having "task ID" "2" in FIG. 10A. In FIG. 5A, the flags of each of the "key motion IDs" show "1" only for the 0th to 5th bits, and show "0" for the others. Therefore, the motion instruction unit 27 can determine that data is valid only for the x-, y-, z-, φ-, θ-, and ψ-axes in the motions of the robot arm 5. Accordingly, the impedance control mode is set such that the x-, y-, z-, φ-, θ-, and ψ-axes of the robot arm 5 can be corrected by a force applied by the person 4A.

The control rule generating unit 23 selects an environment information type for generating a control rule out of a plurality of environment information pieces, based on: (1) the control mode for the shifting direction of the robot arm 5; and (2) the information in the detecting unit selection rule database 29, both (1) and (2) being at the timing of the environmental change reporting manipulation. Specifically, at the timing of starting the environmental change reporting manipulation of the task having "task ID" "2" in FIG. 10A, as shown in FIG. 13C, the environmental change reporting manipulation is performed as to the x-axis direction and the y-axis direction. Because x- and y-axes are subjected to a correction in the impedance control mode, with reference to FIG. 11A showing one example of the detecting unit selection rules in the detecting unit selection rule database 29, when the "control mode" is "impedance control mode", the "environment information type ID" is "1"; and with reference to FIG. 11B, when the "environment information type ID" is "1", "image" is selected by the control rule generating unit 23. Further, in FIG. 13C, because the environmental change reporting manipulation is performed in the x-axis direction and the y-axis direction, the environment information acquiring unit 19 acquires an image by the first image pickup apparatus 15a, which is capable of capturing an image of the x-y plane, based on the direction of the environmental change reporting manipulation, and the control rule generating unit 23 selects the image. Thus, the image from the first image pickup apparatus 15a is acquired by the control rule generating unit 23. It is to be noted that, when there are a plurality of first image pickup apparatuses 15a that can capture the x-y plane, the control rule generating unit 23 selects, out of such a plurality of first image pickup apparatuses 15a, the first image pickup apparatus 15a that has captured the image exhibiting the greatest difference before and after the environmental change reporting manipulation.

Figure 14:
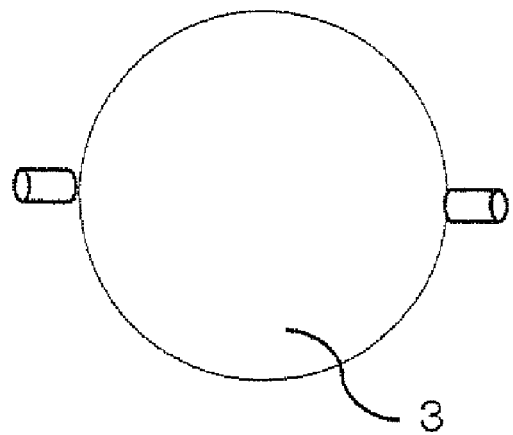
FIG. 14 is a view showing an exemplary image of the environment information according to the first embodiment of the present invention.

FIG. 14 shows the image acquired by the first image pickup apparatus 15a from above the pot 3.

The image acquired through the first image pickup apparatus 15a by the control rule generating unit 23 is stored in the environment information database 18 via the database input/output unit 28.

It is to be noted that, because the environmental change reporting manipulation is performed in the x-y plane in this example, the image of the first image pickup apparatus 15a is selected by the control rule generating unit 23. However, when the environmental change reporting manipulation is performed in the y-z plane and the x-z plane, the image of the second image pickup apparatus 15b is selected by the control rule generating unit 23. The control rule generating unit 23 stores the image selected by the control rule generating unit 23 in the environment information database 18, via the database input/output unit 28. Further, as a variation, as shown in FIGS. 36C and 36D, in a case where a report of a change in the x-y plane environment (reporting a change in the opening dimension of the pot 3) is followed by a report of change in the y-z plane and x-z plane environment (reporting a change in the depth dimension of the pot 3), the control rule generating unit 23 selects images of both the first image pickup apparatus 15a and the second image pickup apparatus 15b.

In the foregoing example, when the environmental change reporting manipulation is performed in the x-y plane, specifically, as the "environment ID" in FIG. 9A shows "10", the control rule generating unit 23 allots "10" to the new "environment ID", and the control rule generating unit 23 stores the file name (in this example, "image 3") of the selected image in the "image ID" of that "environment ID", in the environment information database 18. Further, because the flag is for the image only, the control rule generating unit 23 stores "1" only for the 6th bit, and "0" for the other bits in the environment information database 18.

Figure 36A:
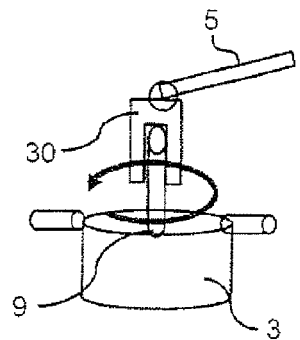
FIG. 36A is a view showing a motion state of the control apparatus for the robot arm according to the first embodiment of the present invention.
Figure 36B:
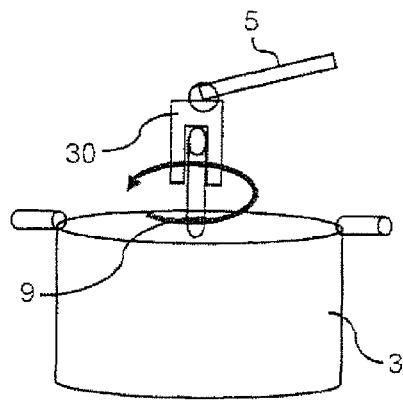
FIG. 36B is a view showing a motion state of the control apparatus for the robot arm according to the first embodiment of the present invention.
Figure 36C:
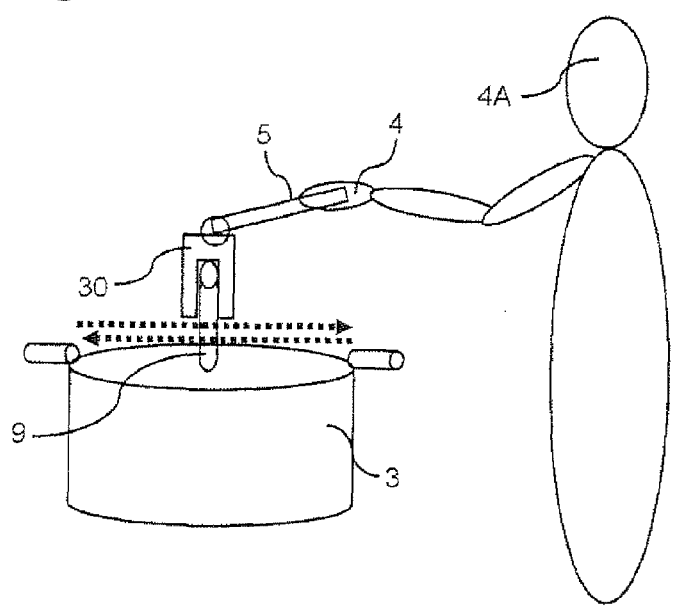
FIG. 36C is a view showing a motion state of the control apparatus for the robot arm according to the first embodiment of the present invention.
Figure 36D:
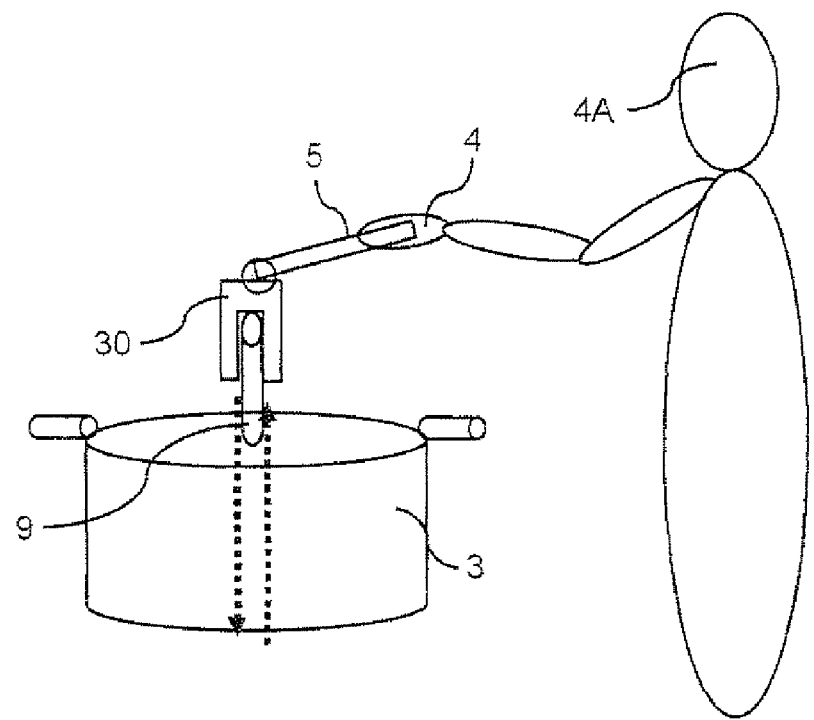
FIG. 36D is a view showing a motion state of the control apparatus for the robot arm according to the first embodiment of the present invention.

It is to be noted that, in the variation, as shown in FIGS. 36C and 36D, in a case where a change in x-y plane environment report is followed by a report of a change in the y-z plane and x-z plane environment, as shown in the environment information of "environment ID" "33", the control rule generating unit 23 may store a plurality of images (in this example "image 8" and "image 9") in the environment information database 18.

Next, upon receipt of a motion correcting manipulation start instruction, the control rule generating unit 23 acquires, from the control parameter managing unit 21, the motion information of the robot arm 5 (i.e., the hand position and time of the robot arm 5), which has been corrected by shifting the robot arm 5 by the person 4A applying a force to the robot arm 5. The control rule generating unit 23 stores the acquired motion information in the motion information database 17 via the database input/output unit 28.

Specifically, as shown in FIG. 5B, the control rule generating unit 23 newly allots a motion ID in the motion information database 17 in FIG. 5B (in this example, "3"), and further, allots "20" to "31" as the "key motion IDs" as many as the number of the acquired hand positions, and stores the motion information pieces corrected by the motion correction unit 20 (hand information, time) by the respective "key motion IDs" in the motion information database 17.

As to the time of the motion information, the relative time in which the time point at which the person 4A selects a task and issues a start instruction is regarded as 0 is input by the control rule generating unit 23 in the motion information database 17. Therefore, in the time data column in the motion information database 17, the control rule generating unit 23 stores, as the added first key motion (in this example, "20"), a value obtained by subtracting from the time of each of all the motions, in the motion information database 17.

As to the flag data column, among the components of the motion information for which the flags before the motion correcting manipulation show "1", the control rule generating unit 23 compares the position orientation and the force values of the key motion before correction against those after correction, for each component, and stored in the motion information database 17 in the following manner: only those components determined by the control rule generating unit 23 to have a difference equal to or more than a threshold value, the flags of such components show "1" in FIG. 6; while the flags of such components determined to be less than the threshold value to show "0".

It is to be noted that, as to the foregoing compared "key motion" before and after motion correcting manipulations, the control rule generating unit 23 compares only the very first key motion of each "motion ID" before motion correcting manipulation against that after motion correcting manipulation.

Specifically, key motion flags of the motion having "key motion ID" "10" for the motion before correction having "motion ID" "2" show "1" for the 0th to 5th bits, and show "0" for the other bits. Therefore, the control rule generating unit 23 performs a comparison as to the position orientation components only, between the position orientation and the force values of the motion before correction and those after correction.

Here, the control rule generating unit 23 regards the "key motion ID" before correction is the key motion "10", and the "key motion ID" after correction is key motion "20".

The key motion having "key motion ID" "10" and the key motion having "key motion ID" "20" share the same z-, $\phi$-, $\theta$-, and $\psi$-components and have differences as to the x-coordinate, and the y-coordinate, which are (0.2, 0.2), respectively, among their position orientation components (x, y, z, $\phi$, $\theta$, $\psi$). Provided that the threshold value of each of the aforementioned differences is 0.1, the control rule generating unit 23 determines that only the x-component and the y-component are each equal to or more than the threshold value. Accordingly, the control rule generating unit 23 stores that the flags show "1" for the 0th and 1st bits, and show "0" for the others, in the motion information database 17.

The correction parameter flags store values of the motions before correction (in this example, "10" to "17").

Figure 36E:
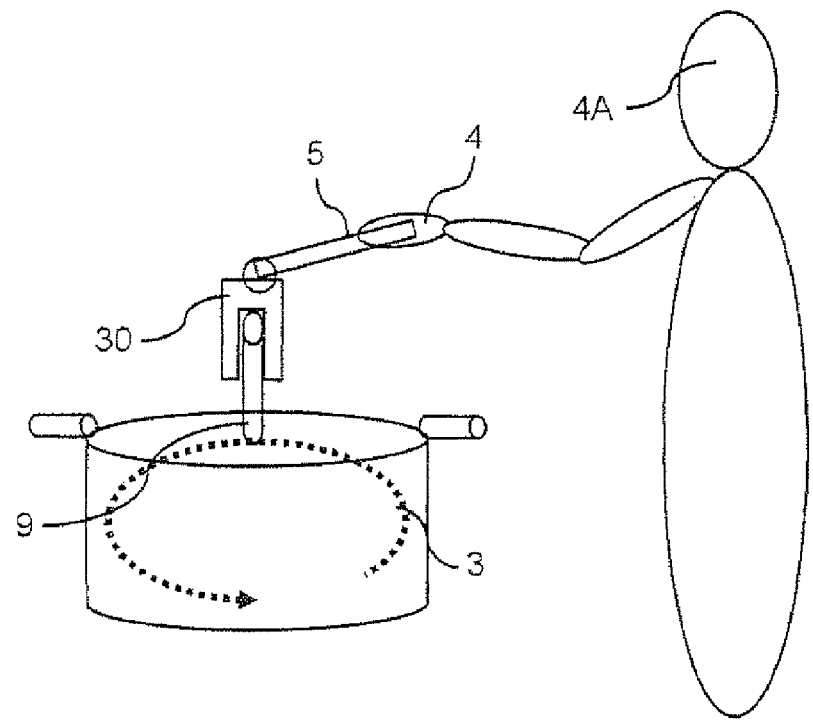
FIG. 36E is a view showing a motion state of the control apparatus for the robot arm according to the first embodiment of the present invention.
Figure 36F:
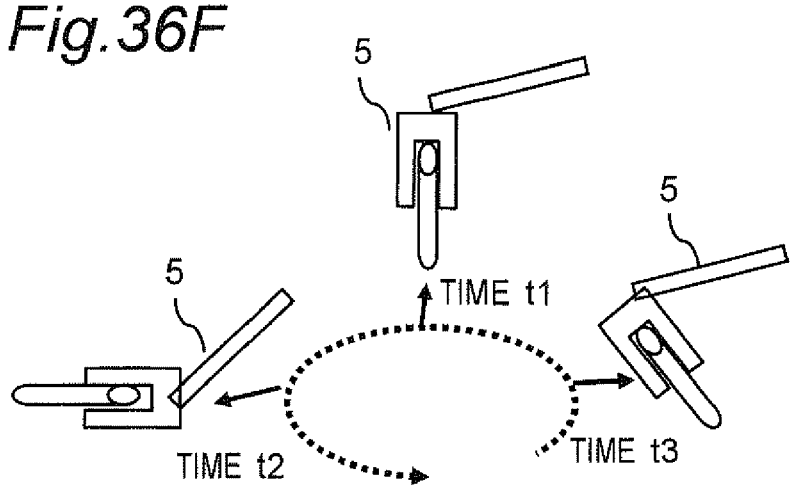
FIG. 36F is a view showing a motion state of the control apparatus for the robot arm according to the first embodiment of the present invention.
Figure 36G:
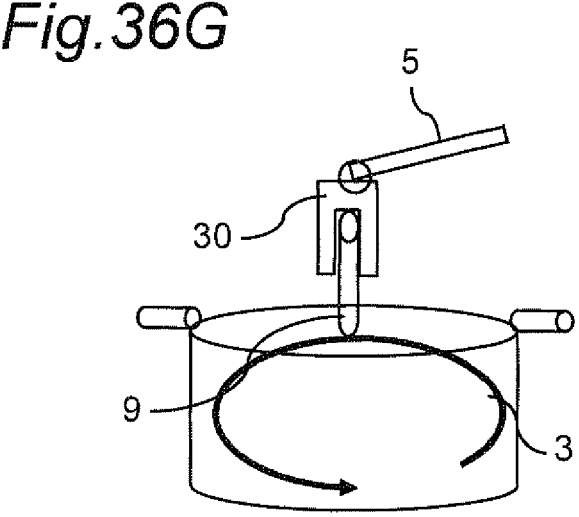
FIG. 36G is a view showing a motion state of the control apparatus for the robot arm according to the first embodiment of the present invention.

It is to be noted that, as shown in FIG. 36E, in a case where a correction is made as a motion to stir from the side surface of the pot toward the bottom surface of the pot, the correction may be made such that, as shown in FIG. 36F, the orientation components of the robot arm 5 vary as time advances as time $t_1$, time $t_2$, and time $t_3$.

Next, the control rule generating unit 23 generates a new control rule and stores in the control rule database 16, based on the acquired environment information and the corrected motion by the motion correcting manipulation of the motion correction unit 20.

Specifically, because the motion is corrected while the task having "task ID" "2" in the control rule database 16 is in motion, the control rule generating unit 23 adds one row to the task having "task ID" "2", and has the control rule database 16 additionally store therein the motion having "motion ID" "3" which is newly added by the correcting manipulation.

Next, the control rule generating unit 23 stores the environment ID of the environment information selected by the control rule generating unit 23 in the control rule database 16.

As has been described in the foregoing, the person 4A performing the environmental change reporting manipulation and the motion correcting manipulation to cause the control rule generating unit 23 to generate a new control rule and to store the generated rule in the control rule database 16 eliminates the necessity of previously preparing a motion taken into consideration of the size of the pot. Instead, the person 4A simply manipulating the robot arm 5 on site to report a change in the environment and to correct the motion of the robot arm 5 makes it possible to store the manipulation and the correcting motion in the control rule database 16. Thus, the robot arm 5 is allowed to autonomously operate when the similar environment is varied, based on the information in the control rule database 16 (in other words, based on the control rule generated by the control rule generating unit 23, while referring to the environment information acquired by the environment information acquiring unit 19).

—Motion Instruction Unit (Motion Calculation Unit)—

In this example, as shown in FIG. 10B, for the task having "task ID" "2", a plurality of "motion IDs" ("2" and "3") are stored in the control rule database 16. Accordingly, the function of the motion instruction unit 27 in such a case will be described in the following.

In FIG. 10B, among the tasks each having "task ID" "2", the motion having "motion ID" "2" represents the motion information for performing the motion shown in FIG. 13A, and the motion having "motion ID" "3" represents motion information for performing the motion shown in FIG. 13E.

The person 4A places the pot 3b shown in FIG. 13E on the workbench 7, and the person 4A instructs, via the data input IF 26, the motion instruction unit 27 to start the task having "task ID" "2". Upon receipt of the instruction to start the task of the specified "task ID", the motion instruction unit 27 refers to the control rule database 16 for the specified "task ID" via the database input/output unit 28, and instructs the control parameter managing unit 21 to start the task having that "task ID".

When there are a plurality of motions, the motion instruction unit 27 selects the motion information to be operated in accordance with the "environment ID". Specifically, only when the motion instruction unit 27 determines that the environment information found by referring to the environment information database 18 via the database input/output unit 28 for "environment ID" of each of the "motion IDs" stored in the control rule database agrees with the "environment ID" of the motion being operated by the robot arm 5, the motion instruction unit 27 instructs the control parameter managing unit 21 to execute the motion having the "motion ID".

Specifically, in FIG. 10B, there are the task having "task ID" "2" associated with the motion having "motion ID" "2" and that associated with the motion having "motion ID" "3". Because the motion having "motion ID" "2" is associated with the "environment ID" which assumes a value of "-1", the robot arm 5 operates irrespective of the ambient environment of the robot arm 5. Therefore, it is selected by the motion instruction unit 27 as the motion to be executed.

Next, the motion having "motion ID" "3" is associated with the environment information of "environment ID" "10", which does not assume the value of "-1". Therefore, the motion instruction unit 27 refers to the environment information database 18 for the environment information having "environment ID" "10", via the database input/output unit 28. In FIG. 9A, the flags of the environment information having "environment ID" "10" show "1" only for the 6th bit, and "0" for the others. Therefore, the motion instruction unit 27 can determine that the image is valid. Accordingly, based on the image ID, the motion instruction unit 27 acquires image information stored in the environment information database 18, via the database input/output unit 28.

Next, the motion instruction unit 27 acquires image information at present from the environment information acquiring unit 19. Then, the motion instruction unit 27 compares the two acquired images against each other based on image matching. When the motion instruction unit 27 determines that the two images agree with each other, the motion instruction unit 27 selects the motion stored by "motion ID" "3" as the motion to be executed.

When there are a plurality of motions selected by the motion instruction unit 27 (in this example, the motion having "motion ID" "2" and the motion having "motion ID" "3"), the motion calculation unit 2 of the motion instruction unit 27 calculates the motions of the selected plurality of motions in the stored order in the control rule database 16 to obtain an eventual motion to be executed in accordance with the flags of respective motion information pieces.

In this example, the motion having "motion ID" "2" and the motion having "motion ID" "3" are selected by the motion instruction unit 27, and under the "motion ID" in the control rule database 16 in FIG. 10B, they are stored in order of the motion "2" and the motion "3". Accordingly, with reference to FIG. 5C, because flags of the motion information of the motions having "motion ID" "2" show "1" for the 0th to 5th bits, the motion instruction unit 27 acquires the position orientation information $(x, y, z, \phi, \theta, \psi)$ from the motion information of the motion having "motion ID" "2". Next, because the flags of the motions having "motion ID" "3" show "1" only for the 0th and 1st bits, in the position orientation information $(x, y, z, \phi, \theta, \psi)$ of the motion having "motion ID" "2", only the $(x, y)$ components are replaced by the values of the motion having "motion ID" "3", and calculated by the motion instruction unit 27. For example, the position orientation of the key motion having "key motion ID" "10" is $(0.1, 0.1, 0.4, 0, 0, 0)$, and the position orientation of the key motion having "key motion ID" "20" which is associated with the motion having "motion ID" 3 is $(0.3, 0.3, 0.4, 0, 0, 0)$. Therefore, the motion instruction unit 27 replaces just the x-component and the y-component included in $(0.1, 0.1, 0.4, 0, 0, 0)$ of the position orientation of the key motion having "key motion ID" "10" by the position orientation $(0.3, 0.3, 0.4, 0, 0, 0)$ of the key motion having "key motion" "20", whereby the eventual position orientation $(0.3, 0.3, 0.4, 0, 0, 0)$ is provided. Similarly, the motion instruction unit 27 replaces the x-component and the y-component of the key motion having "key motion ID" "11" by those of the key motion having "key motion ID" "21". In succession thereto, until the end of the "key motion ID" is reached, the motion instruction unit 27 calculates in order.

As to the flags, the motion instruction unit 27 allots "1" to respective bits of the motions having "motion ID" "2" and "motion ID" "3" after calculation, in a case where the bits of either one of the motions having "motion. ID" "2" and "motion ID" "3" assume "1"; and allots "0" in a case where both the bits assume "0". However, only one of the components of the position and those of the force may assume "1" (because actuation can occur exclusively in the position control mode or in the force control mode). Therefore, when both the components of the position and those of the force assume "1", the force is prioritized. Hence, the flags of the motions having "motion ID" "2" show "1" for the 0th to 5th bits; whereas the motions having "motion ID" "3" shows "1" for the 0th and 1st bits and, accordingly, the 0th to 5th bits assume "1". The motion parameter flags for the motions having "motion ID" "2" and those for the motions having "motion ID" "3" both show "1" for the 0th, 1st, and 2nd bits, and hence the motion parameter flags after calculation also show "1" for the 0th, 1st, and 2nd bits, and "0" for the others.

The motion instruction unit 27 switches the control mode in accordance with the flags of the motion information after calculation, and the motion instruction unit 27 outputs the motion information to the control parameter managing unit 21. Thus, it becomes possible for the control unit 22 to execute the calculated motions.

(Control Apparatus Body Unit 11)

The control apparatus body unit 11 includes the control parameter managing unit 21 and the control unit 22. Between the control unit 22 and the control parameter managing unit 21, information as to the hand position or force of the robot arm 5 and the like are exchanged. The control apparatus body unit 11 is capable of functioning as a force control unit that controls the robot arm 5 in the force control mode, such that the robot arm 5 exerts a force control to a task-target object with a force set in the motion information acquired by the database input/output unit 28 being one example of the motion information acquiring unit.

—Control Parameter Managing Unit—

Based on the instruction from the motion correction unit 20 or the motion instruction unit 27, the control parameter managing unit 21 instructs the control unit 22 such that the robot arm 5 operates according to the set control mode, to thereby cause the robot arm 5 to operate under control of the control unit 22. Further, the control parameter managing unit 21 acquires information as to the hand position or force of the robot arm 5 and the like from the control unit 22 and outputs the acquired information to the motion correction unit 20.

The control parameter managing unit 21 will be detailed.

Based on the instruction from the motion correction unit 20 or the motion instruction unit 27, the control parameter managing unit 21 outputs a setting signal for switching the control mode of the robot arm 5.

Each of the control modes is determined by the motion correction unit 20 or the motion instruction unit 27 based on the flags of the motion information database, and a setting signal for switching any control mode is output to the control parameter managing unit 21.

The control mode is one of the following control method modes: (i) the position control mode, (ii) the impedance control mode, (iii) the hybrid impedance control mode, (iv) the force control mode, (v) the force hybrid impedance control mode, and (vi) the high-rigidity position control mode.

Further, the control parameter managing unit 21 carries out setting of mechanical impedance set values in the following modes: (iii) the impedance control mode; (iv) the hybrid impedance control mode; and (v) the force hybrid impedance control mode. Still further, the control parameter managing unit 21 carries out setting of a hand position orientation desired correction output $r_{d\Delta}$ output from an impedance calculation unit 51, the description of which will be given later, and setting of the motion information to the desired trajectory generating unit 55.

—Switching Motion of Control Mode—

A description will be given of each of the control modes.

(i) Position Control Mode

The position control mode is a mode in which the robot arm 5 actuates based on information as to the hand position and orientation and time of the desired trajectory generating unit 55, the description of which will be given later.

The position control mode is a mode of controlling the motion of the robot arm 5 such that the robot arm 5 does not shift even when the robot arm 5 is applied with a force by a person 4A. It is a mode used in a case where the robot arm 5 operates for performing a task such as a stirring task or a wipe-cleaning task, for example. However, in a case where the robot arm 5 is of a flexible structure, due to its mechanically flexible mechanism, in some cases, the robot arm 5 may slightly shift by a force applied by the person 4A to the robot arm 5, even when the position control mode is set. In contrast thereto, the high-rigidity position control mode, the description of which will be given later, is a mode for exerting control such that the robot arm 5 is never moved by a force applied by the person 4A to the robot arm 5.

(ii) Impedance Control Mode

The impedance control mode is a mode of controlling the motion of the robot arm 5 such that the robot arm 5 actuates in accordance with a force applied by the person 4A or the like to the robot arm 5 (specifically, a force detected by the force detecting unit 53). For example, as shown in FIG. 8, it is a mode used in a case where the person 4A directly holds the robot arm 5 with the hand 4, to teach the hand position orientation of the robot arm 5.

(iii) Hybrid Impedance Control Mode

The hybrid impedance control mode is a mode of controlling the motion of the robot arm 5 such that, while the robot arm 5 is operating in the position control mode, the robot arm 5 actuates in accordance with a force detected by the force detecting unit 53. For example, as shown in FIG. 13A, it is a mode used in a case where the person 4A desires, while the robot arm 5 is performing a stirring task in the position control mode, to correct the motion of the robot arm 5 to stir the portion on the bottom side in the pot 3a. Exertion of the hybrid impedance control mode allows, as shown in FIG. 13D, the person 4A to grip the robot arm 5 to apply a force in a direction along the bottom surface of the pot 3b, so as to achieve a corrected motion of stirring with a great length in the horizontal direction.

(iv) Force Control Mode

Figure 15:
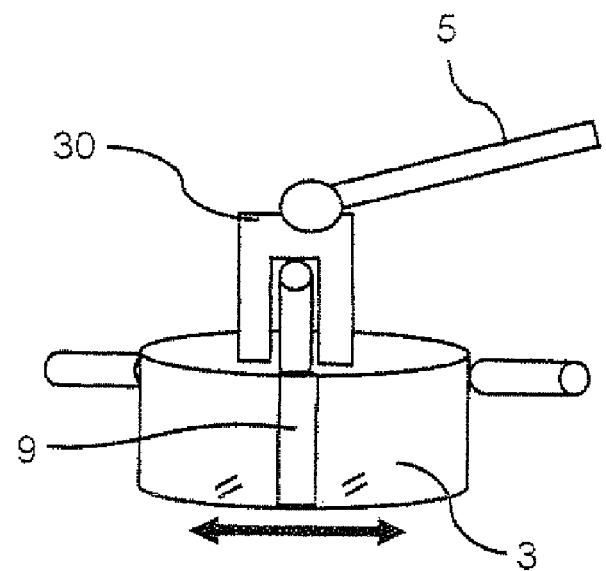
FIG. 15 is a view showing a motion state of the control apparatus for the robot arm according to the first embodiment of the present invention.

The force control mode is a mode of controlling the motion of the robot arm 5 to perform, with a force set by the motion correction unit 20 to control parameter managing unit 21, a stirring motion, a wipe-cleaning motion, a screw-rotating motion or the like, while pressing a task-target object (task-use jig, such as a ladle 9, a wipe-cleaning mop or a sponge 46, an electric screwdriver tool 72, or a flexible circuit board 74) against a task-target surface (e.g., the bottom of a pot, a cleaning-target surface, or a task-target surface when mounting a screw 73 to a screw hole 71a of a tool 71) through the use of the robot arm 5. FIG. 12 shows the robot that performs a wipe-cleaning motion in a kitchen according to the first embodiment. For example, it is a control mode used in a direction toward which the control should be exerted, as shown in FIG. 12, in a case where a wipe-cleaning is to be performed by applying a force to the surface of the top board 6a of a IH cooking heater 6 or the like, or as shown in FIG. 15, in a case where a stirring task is to be performed by applying a force with a ladle 9 at the bottom portion of the pot 3.

(v) Force Hybrid Impedance Control Mode

The force hybrid impedance control mode is a mode of switching (iii) the hybrid impedance control mode, (ii) the impedance control mode, and (i) the position control mode, for each of the six-axis directions (x-, y-, z-, φ-, θ-, and ψ-axis directions) of the robot arm 5, and of controlling in (iii) the force control mode in which a motion is performed with a specified force acted. It is to be noted that the force control mode and the impedance control mode are in a mutually exclusive relationship and, therefore, the impedance control mode cannot be set to the direction to which the force control mode is set.

The force hybrid impedance control mode is, for example as shown in FIG. 12, a mode used in a case where a wipe-cleaning is performed while the task-use jig 9, e.g., a wipe-cleaning mop held by the hand 30 at the tip of the robot arm 5, is being shifted in parallel to and in a circular manner relative to a cleaning surface such as the top board 6a of the IH cooking heater 6 or the like, with a specified force being applied vertically downward to the cleaning surface. Specifically, to the respective six axes of (x, y, z, φ, θ, ψ), the following control modes are set. That is, it is a force hybrid impedance control mode in which, the (x, y) components operate in the hybrid impedance control mode, the (φ, θ, ψ) components operating in the impedance control mode, and the z-axis component operating in the force control mode. By setting the hybrid impedance control mode to the direction parallel to the cleaning surface in this manner, while a motion is performed in the position control mode, the robot arm 5 can be shifted in accordance with a force applied to the robot arm 5 by the person 4A or the like. Further, by placing the (φ, θ, ψ) components in the impedance control mode, it becomes possible to change the orientation of the robot arm 5, while the robot arm 5 is in a motion stopped state, in accordance with a force applied to the robot arm 5 from the person 4A or the like. Still further, by placing the z-axis component in the force control mode, it becomes possible to cause the robot arm 5 to operate while the wipe-cleaning mop is being pressed against the cleaning surface with a specified force. Alternatively, the force hybrid impedance control mode may be a control mode that permits motion by placing the z-axis component out of the six axes of (x, y, z, φ, θ, ψ) in the force control mode, and placing the other axes in the position control mode. In this case, even when unintended force such as a bump is given to the robot arm 5, the position control components will not erroneously be shifted.

(vi) High-Rigidity Position Control Mode

The high-rigidity position control mode is a control mode with further rigidity added to the position control mode during a motion of the robot arm 5. Specifically, it is achieved by increasing the gain in a positional error compensation unit 56, the description of which will be given later. In the high-rigidity position control mode, even when the person 4A applies a force to the robot arm 5, the person 4A cannot easily shift the robot arm 5, and the robot arm 5 is not influenced by a drag from the contact surface. Therefore, the force that the person 4A applies to the robot arm 5 can correctly be detected.

When the robot arm 5 operates, these control modes (i) to (vi) are appropriately set to each of the directions and orientations of the robot arm 5.

Further, while the robot arm 5 is performing a motion in (iii) the hybrid impedance control mode or in (v) the force hybrid impedance mode, the control parameter managing unit 21 changes the mechanical impedance set values or the hand position orientation desired correction output $r_{dA}$ output from the impedance calculation unit 51 in accordance with the corrected parameter.

The setting parameters of the mechanical impedance set values include inertia M, viscosity D, and rigidity K. The setting of the respective parameters of the mechanical impedance set values are carried out based on the following evaluation equations, by using correction values.

$$M = KM \times (\text{a correction value}) \qquad \text{equation (3)}$$

$$D = KD \times (\text{a correction value}) \qquad \text{equation (4)}$$

$$K = KK \times (\text{a correction value}) \qquad \text{equation (5)}$$

In the foregoing equations (3) to (5), KM, KID, and KK are gains, each of which is a certain constant value.

The control parameter managing unit 21 outputs the inertia M, the viscosity ID, and the rigidity K, which are the mechanical impedance parameters calculated based on the equations (3) to (5), respectively, to the control unit 22.

According to the equations (3) to (5), if the position and orientation components other than those of x-axis and y-axis of the robot arm 5 easily move, then it becomes difficult execute the correction work of a motion of the robot arm 5. Therefore, the control parameter managing unit 21 sets the correction values of high values only for the position and orientation components other than those of x-axis and y-axis of the robot arm 5 (for example, about ten times as high as the correction values), such that the viscosity D and the rigidity K of the robot arm 5 of high values are set. As a result, resistance or rigidity is generated in the motion of the robot arm 5, and it becomes not easy for the robot arm 5 to move as to the position and orientation components other than those of x-axis and y-axis. This setting is applicable in a case where, for example, as shown in FIG. 13D, the person 4A desires to make a correction, such that the stirring motion is performed with a greater diameter conforming to the size of the pot 3b, using the ladle 9 gripped by the hand 30 of the robot arm 5.

Alternatively, another method is to null by the control parameter managing unit 21 the values other than those of x-axis and y-axis in the components of the hand position orientation desired correction output $r_{dA}$ output from the impedance calculation unit 51. This makes it impossible for the robot arm 5 to be shifted by a force of the person 4A other than as to x-axis and y-axis, and therefore any erroneous manipulation can be prevented.

The control parameter managing unit 21 must output, to the motion correction unit 20, the hand position and orientation of the robot arm 5 and information as to the force applied to the robot arm 5 by the person 4A (information as to the force of the person 4A acting on the robot arms). Accordingly, when the control parameter managing unit 21 receives the information as to the hand position and force of the robot arm from the control unit 22, the control parameter managing unit 21 outputs the received information to the motion correction unit 20. Further, the control parameter managing unit 21 outputs, to the control unit 22, motion information as to position and orientation and time and the like, which the control parameter managing unit 21 has received from the motion correction unit 20 and the motion instruction unit 27.

—Control Unit—

Figure 4:
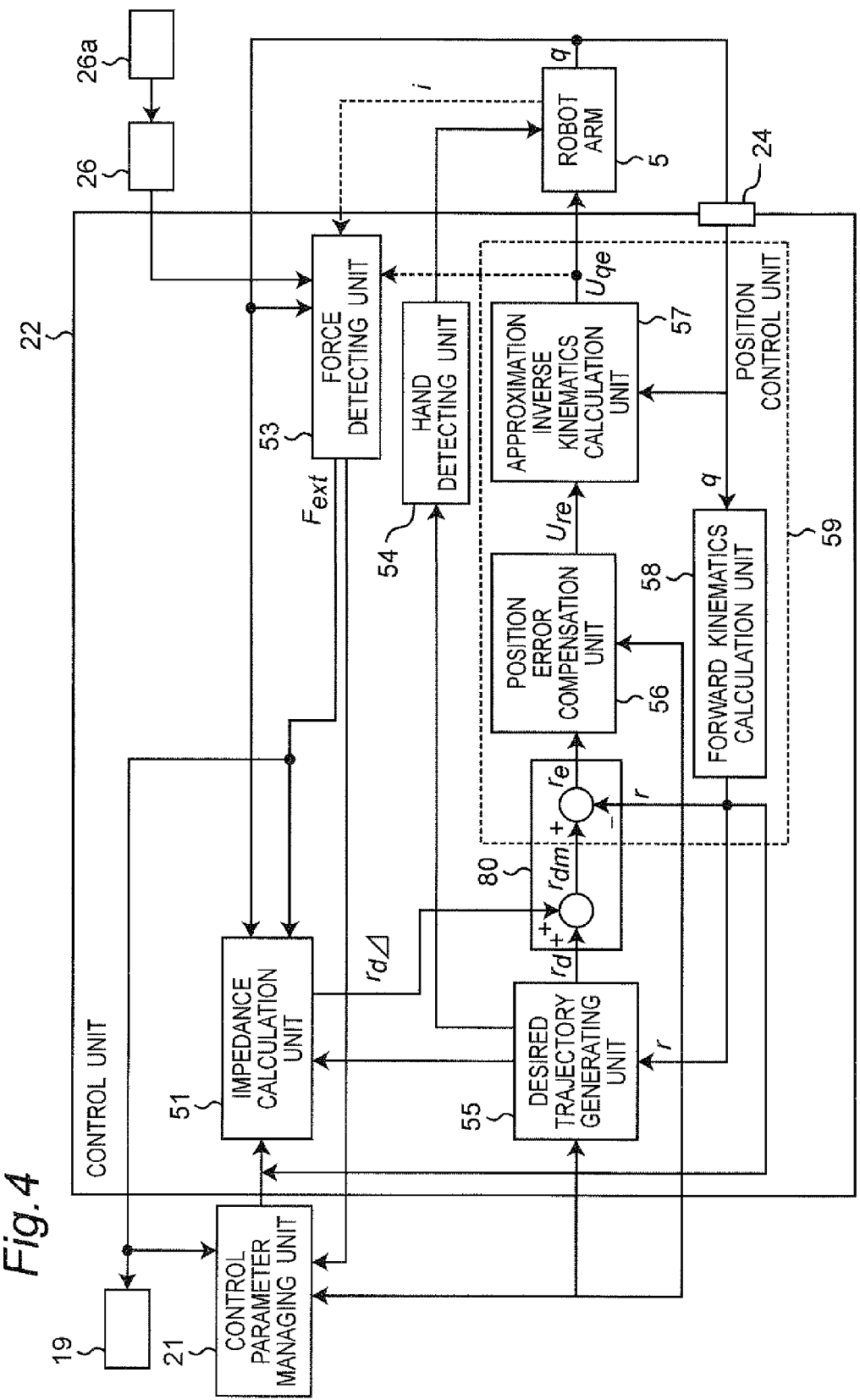
FIG. 4 is a block diagram showing the structure of a control unit of the control apparatus according to the first embodiment of the present invention.

Next, a detailed description will be given of the control unit 22 with reference to FIG. 4. FIG. 4 shows the detail of the control unit 22 of the control apparatus 70 of the robot arm according to the first embodiment. The control unit 22 includes a desired trajectory generating unit 55, the hand control unit 54, the force detecting unit 53 as one example of force detecting means, the impedance calculation unit 51, the position control unit 59, and a positional error calculation unit 80. The position control unit 59 includes a positional error compensation unit 56, an approximation inverse kinematical calculation unit 57, and a forward kinematical calculation unit 58, and is capable of controlling the robot arm 5 in the position control mode such that the robot arm 5 shifts based on the motion information acquired by the database input/output unit 28 as one example of a motion information acquiring unit. Though the force detecting unit 53 is shown as part of the control unit 22 in FIG. 4, it can separately be structured from the control unit 22.

The control unit 22 operates in a control mode set by the control parameter managing unit 21, and in accordance with the control mode, controls such that mechanical impedance value of the robot arm 5 assumes the mechanical impedance set value of the robot arm 5 having been set based on the setting values being the inertia M, the viscosity D, and the rigidity K.

Though the control unit 22 exchanges signals such as control signals between the robot arm 5 via the input/output IF 24, this is schematically represented in FIG. 4 as exchange of data signals between the control unit 22 and the robot arm 5.

The present value vector $q=[q_1, q_2, q_3, q_4, q_5, q_6]^T$ of joint angles (joint angle vector) measured by the encoders 44 of respective joint axes provided at the joint portions of the robot arm 5 is acquired by the control unit 22 via the input/output IF 24. Here, $q_1, q_2, q_3, q_4, q_5, q_6$ are the joint angles of the first joint portion 35, the second joint portion 36, the third joint portion 37, the fourth joint portion 38, the fifth joint portion 39, and the sixth joint portion 40, respectively.

The desired trajectory generating unit 55 generates the hand position and orientation desired vector $r_d$ which is the target of the robot arm 5, based on the motion information (specifically, the hand position and orientation of the robot arm 5 and the time) received from the control parameter managing unit 21. The desired trajectory generating unit 55 outputs the generated hand position and orientation desired vector $r_d$ to the positional error calculation unit 80.

Specifically, the desired trajectory generating unit 55 generates the hand position and orientation desired vector $r_d$ and a force desired vector $f_d$ each of which is the motion desire based on the control mode setting signal and the motion information, based on the control parameter managing unit 21, such that the robot arm 5 is operated in each of the control modes.

Specifically, as the desired motion of the robot arm 5, information as to position and orientation ($r_{d0}, r_{d1}, r_{d2}, \ldots$) and information as to force ($f_{d0}, f_{d1}, f_{d2}, \ldots$) at each point of time ($t=0, t=t_1, t=t_2, \ldots$) are provided from the motion instruction unit 27 in accordance with the desired task.

The desired trajectory generating unit 55 interpolates the trajectories between each of the points using polynomial interpolation, to generate the hand position and orientation desired vector $r_d$ and the force desired vector $f_d$.

The desired trajectory generating unit 55 generates the hand position and orientation desired vector $r_d$ being the motion desire, such that the robot arm 5 is operated in (i) the position control mode, (iii) the impedance control, (iv) the hybrid impedance control mode, (v) the force hybrid impedance control mode, or (vi) the high-rigidity position control mode.

The desired trajectory generating unit 55 outputs the hand position and orientation desired vector $r_d$ and the force desired vector $f_d$ for achieving the generated desired motion of the robot arm 5 and flags indicative of which parameter is valid for each of the directions, to the positional error calculation unit 80.

The desired trajectory generating unit 55 issues an open/close instruction of the hand 30 based on a "hand" open/close flag included in the motion information to the hand control unit 54, the description of which will be given later.

Based on the open/close flag received from the desired trajectory generating unit 55, the hand control unit 54 instructs the hand open/close drive-purpose motor 62 of the robot arm 5 via the input/output IF 24, such that the hand open/close drive-purpose motor 62 drives to open and close the hand 30.

The force detecting unit 53 functions as one example of the force detecting means, and detects an external force $F_{ext}$ applied to the robot arm 5 by any contact between the person 4A or the like and the robot arm 5. The force detecting unit 53 outputs the detected information as to force to the impedance calculation unit 51, the environment information acquiring unit 19, and the control parameter managing unit 21 (to the motion instruction unit 27 via the control parameter managing unit 21). It is to be noted that, in a case where a task is performed with an object (e.g., the task-use jig 9) having a mass m being gripped or attached to the hand-tip (the hand 30) of the robot arm 5, the force detecting unit 53 previously subtracts mg from $F_{ext}$ detected by the force detecting unit 53, where g is the gravitational acceleration. The value of the mass m of the gripped object (e.g., the task-use jig 9) can be input by the person 4A from the external input device 26a via the data input IF 26 to the force detecting unit 53, before the object is gripped (e.g., before the task-use jig 9 is attached) (see FIG. 4). Further, it is also possible to: have article information such as the identification number, mass, shape, dimension, and color of the task-target object being the gripped object (e.g., the task-use jigs 9, 46, and 72 or a flexible circuit board 74) stored in an article database (not shown); cause an article recognition apparatus (not shown) to read identification information such as a tag provided to the task-target object; and refer to the information stored in the article database based on the read identification information, to thereby acquire the mass of the corresponding task-target object.

The force detecting unit 53 acquires, via the input/output IF 24, a current value $i=[i_1, i_2, i_3, i_4, i_5, i_6]^T$ of current flowing through each of the motors 43 that respectively drive the joint portions of the robot arm 5, the current value being measured by a current sensor of the motor driver 25. The force detecting unit 53 acquires, via the input/output IF 24, the present value q of each of the joint angles measured by respective encoders 44, and a joint angle error compensation output $u_{qe}$ from the approximation inverse kinematical calculation unit 57, the description of which will be given later. The force detecting unit 53 functions as an observer, and calculates a torque $\tau_{ext}$ which is generated in each of the joint portions by an external force applied to the robot arm 5, based on the current value i, the present value q of each joint angle, and the joint angle error compensation output $u_{qe}$.

Then, the force detecting unit 53 converts the torque to an equivalent hand external force $F_{ext}$ at the hand of the robot arm 5, based on the equation: $F_{ext}=J_v(q)^{-T}\tau_{ext}-[0, 0, mg]^T$, and outputs the equivalent hand external force $F_{ext}$ to the impedance calculation unit 51. Here, $J_v(q)$ is a Jacobian matrix that satisfies the following equation:

$$v=Jv(q)\dot{q}$$

where $v=[v_x, v_y, v_z, \omega_x, \omega_y, \omega_z]^T$; in which $(v_x, v_y, v_z)$ is a translation speed of the hand of the robot arm 5 in the hand coordinate system 42; and $(\omega_x, \omega_y, \omega_z)$ is an angular velocity of the hand of the robot arm 5 in the hand coordinate system 42. Further, m is the mass of the gripped object gripped by the hand 30 (or the task-use jig 9 attached to the hand 30), and g is the gravitational acceleration. Still further, it is also possible to actually have the object gripped by or attached to the hand 30 of the robot arm 3, to calculate the value of mass m of the gripped object (or the task-use jig 9 attached to the hand 30) based on the estimation result of the equivalent hand external force $F_{ext}$ made by the force detecting unit 53 at this time. When no object is gripped, it is calculated using m=0.

The impedance calculation unit 51 receives, from the control parameter managing unit 21, the setting signal and the mechanical impedance set value of the control modes, and controls the mechanical impedance value of the robot arm 5 to assume the mechanical impedance set value. In a case where the impedance calculation unit 51 receives from the control parameter managing unit 21 the setting signal of (i) the position control mode, the impedance calculation unit 51 outputs "0" as the mechanical impedance value to the positional error calculation unit 80. In a case where the impedance calculation unit 51 receives from the control parameter managing unit 21 a setting signal of (iii) the impedance control mode and (iv) the hybrid impedance control mode, the impedance calculation unit 51 calculates the hand position orientation desired correction output $r_{d\Delta}$ for the robot arm 5 to achieve control of the mechanical impedance set value, based on the following equation (6) using: the inertia M, the viscosity D, and the rigidity K each being the mechanical impedance set value set by the control parameter managing unit 21; the present value q of each joint angle measured by the encoder 44; and the external force $F_{ext}$ detected by the force detecting unit 53. The impedance calculation unit 51 outputs the calculated and thus obtained hand position orientation desired correction output $r_{d\Delta}$ to the positional error calculation unit 80.

In a case where the impedance calculation unit 51 receives, from the control parameter managing unit 21, a setting signal of (v) the force hybrid impedance control mode or (ii) the force control mode, when there is any force component specified by the motion control "flag" exists, the impedance calculation unit 51 calculates the hand position orientation desired correction output $r_{d\Delta}$ for the robot arm 5 to achieve control according to the mechanical impedance set value, based on the following equation (10) using: the inertia M, the viscosity D, and the rigidity K being the mechanical impedance set value set by the control parameter managing unit 21; the present value q of each joint angle measured by the encoder 44; the external force $F_{ext}$ detected by the force detecting unit 53; and force $f_d$ output from the desired trajectory generating unit 55. The impedance calculation unit 51 outputs the calculated and thus obtained hand position orientation desired correction output $r_{d\Delta}$ to the positional error calculation unit 80.

The positional error calculation unit 80 adds up the hand position orientation desired correction output $r_{d\Delta}$ output from the impedance calculation unit 51 and the hand position orientation desired vector $r_d$ output from the desired trajectory generating unit 55, to thereby generate a hand position and orientation correction desired vector $r_{dm}$. However, in a situation where, in the hybrid impedance control mode, the motion of the robot arm 5 is to be restrained in accordance with any correction parameter, and where the robot arm 5 is to be allowed to move, e.g., in the z-axis solely, the impedance calculation unit 51 sets 0 to the hand position orientation desired correction output $r_{d\Delta}$ other than the z-component, and outputs such setting to the positional error calculation unit 80.

$$r_{d\Delta} = (s^2\hat{M} + s\hat{D} + \hat{K})^{-1} F_{ext} \qquad \text{equation (6)}$$

where $$\hat{M} = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \qquad \text{equation (7)}$$

-continued $$\hat{D} = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix} \quad \text{equation (8)}$$

$$\hat{K} = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix} \quad \text{equation (9)}$$

and s is the Laplace operator.

$$r_{d\Delta} = (s^2 \hat{M} + s\hat{D} + \hat{K})^{-1} (F_{ext} - f_d) \quad \text{equation (10)}$$

where
$\hat{M}, \hat{D}, \hat{K}$
is calculated by equations (7), (8), and (9).

The positional error calculation unit 80 further obtains an error $r_e$ between the hand position and orientation correction desired vector $r_{dm}$ and the hand position and orientation vector r calculated by the forward kinematical calculation unit 58, the description of which will be given later, and outputs the obtained error $r_e$ to the positional error compensation unit 56.

From the encoder 44 of the joint axis of each of the joint portions of the robot arm 5 to the forward kinematical calculation unit 58, the joint angle vector q being the present value q of each joint angle as measured by the encoder 44 is input via the input/output IF 24. The forward kinematical calculation unit 58 performs geometrical calculation to convert the joint angle vector q of the robot arm 5 to the hand position and orientation vector r. The hand position and orientation vector r calculated by the forward kinematical calculation unit 58 is output to the positional error calculation unit 80, the impedance calculation unit 51, and the desired trajectory generating unit 55.

The positional error compensation unit 56 outputs a position error compensation output $u_{re}$ to the approximation inverse kinematical calculation unit 57, based on the error $r_e$ obtained by the positional error calculation unit 80.

Specifically, the position error compensation output $u_{re}$ is calculated by the following equation:

$$u_{re} = K_P r_e + K_I \int_0^t r_e \, dt' + K_D \frac{dr_e}{dt}$$

where $K_p$ is a proportional gain matrix; $K_I$ is an integral gain matrix; and $K_D$ is a differential gain matrix, each being a diagonal matrix whose diagonal components are constituted by the gain for the components of the hand position vector $r_e = [x, y, z, \phi, \theta, \psi]^T$.

Further, the positional error compensation unit 56 sets each of the proportional gain matrix $K_p$, the integral gain matrix $K_I$, and the differential gain matrix $K_D$ to a preset greater value, when the high-rigidity position control mode is set. As used herein, the high rigidity refers to an enhanced rigidity as compared to the normal position control. Specifically, a greater value as compared to the normal position control mode is set. For example, by setting a value approximately twice as great as that of the normal position control mode, the rigidity can approximately be doubled at a maximum.

In this manner, the high-rigidity position control can be achieved. It is to be noted that, by changing the gain for each component, control can be exerted such that, for example, motions can be performed with high rigidity as to z-axis direction solely, while having the other directions governed by the normal position control.

The approximation inverse kinematical calculation unit 57 performs approximation calculation of inverse kinematics based on approximate equation $u_{out} = J_r(q)^{-1} u_{in}$, using the position error compensation output $u_{re}$ received from the positional error compensation unit 56 and the joint angle vector q measured by the robot arm 5. Here, $J_r(g)$ is a Jacobian matrix that satisfies the following relationship:

$$\dot{r} = J_r(q) \dot{q}$$

where $u_{in}$ is the input to the approximation inverse kinematical calculation unit 57; and $u_{out}$ is the output from the approximation inverse kinematical calculation unit 57. Assuming that the input $u_m$ is a joint angle error $q_e$, a conversion equation from the hand position orientation error $r_e$ to the joint angle error $q_e$, as expressed by $q_e = J_r(q)^{-1} r_e$, is obtained.

Accordingly, when the position error compensation output $u_{re}$ is input from the positional error compensation unit 56 to the approximation inverse kinematical calculation unit 57, as an output of the approximation inverse kinematical calculation unit 57, the approximation inverse kinematical calculation unit 57 outputs the joint angle error compensation output $u_{qe}$ for compensating for the joint angle error $q_e$ to the motor driver 25 of the robot arm 5 via the input/output IF 24.

The joint angle error compensation output $u_{qe}$ is provided to the motor driver 25 of the robot arm 5 via the D/A board of the input/output IF 24 as a voltage command value, whereby the motors 43 rotate respective joint axes in forward and reverse directions, and the robot arm 5 operates.

(Principle of Impedance Control Motion of Robot Arm 5)

In connection with the control unit 22, a description will be given of the principle of the impedance control motion of the robot arm 5 structured as described above.

The basic of the impedance control motion (and that of the hybrid impedance control) is the feedback control (position control) of the hand position orientation error $r_e$ executed by the positional error compensation unit 56, and the portion encircled by a broken line in FIG. 4 indicates the position control unit 59. Use of a PID compensator as the positional error compensation unit 56, for example, causes the position control unit 59 to exert control such that the hand position and orientation error $r_e$ converges to 0, whereby the desired impedance control motion of the robot arm 5 can be achieved.

In (iii) the impedance control mode, (iv) the hybrid impedance control mode, and (v) the force hybrid impedance control mode, the positional error calculation unit 80 performs addition of the hand position orientation desired correction output $r_{d\Delta}$ received from the impedance calculation unit 51 so as to make a correction of the hand position and orientation desired value for the position control unit 59. Accordingly, for the position control unit 59, the hand position and orientation desired value slightly deviates from the original value. This eventually makes it possible to control the mechanical impedance value of the robot arm 5 to assume the appropriately set setting value, and to correct the position control motion of the position control unit 59.

In (ii) the impedance control mode and (iii) the hybrid impedance control mode, the hand position orientation desired correction output $r_{d\Delta}$ is calculated based on the equation (6), and in (v) the force hybrid impedance control mode, it is calculated based on the equation (10). Therefore, the mechanical impedance value being the inertia M, the viscosity D, and the rigidity K of the robot arm 5 can be controlled to assume the setting value.

(Motion Steps of Control Unit 22)

Figure 16:
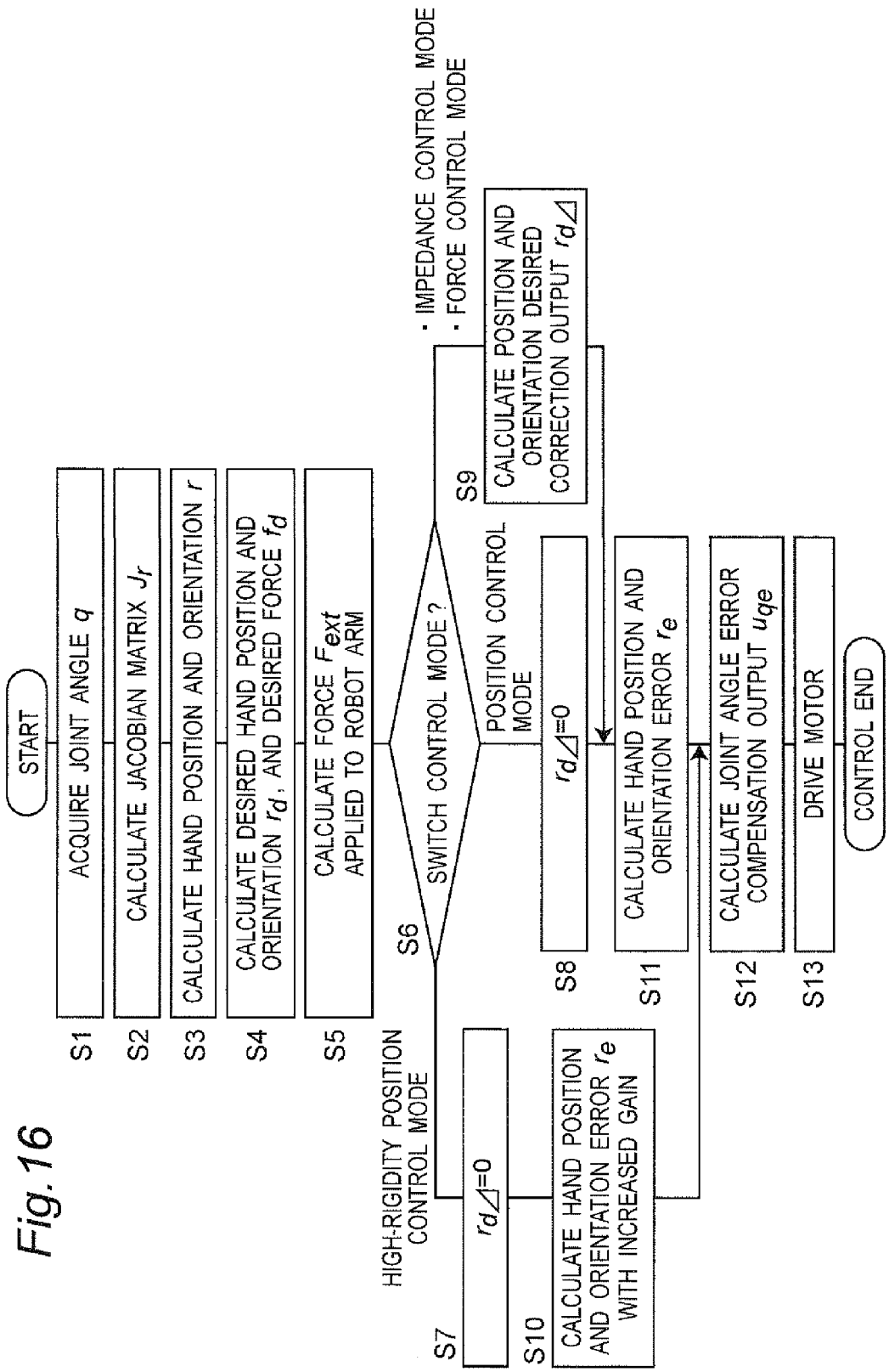
FIG. 16 is a flowchart showing motion steps of the control unit according to the first embodiment of the present invention.

A description will be given of the motion steps of the control unit 22 according to the first embodiment. FIG. 16 is a motion flowchart of the control unit 22 according to the first embodiment.

The joint angle vector q measured by the encoder 44 of each of the joint portions of the robot arm 5 is acquired by the control unit 22 of the control apparatus body unit 11 via the input/output IF 24 (step S1).

Next, based on the joint angle vector q acquired by the control unit 22, the approximation kinematical calculation unit 57 performs calculations such as Jacobian matrix $J_r$ and the like, which is required for performing the kinematical calculation of the robot arm 5 (step S2). Because it is at the start of the control motion, the approximation kinematical calculation unit 57 performs calculation using the value "0" for the position error compensation output $u_{re}$ received from the positional error compensation unit 56.

Next, the forward kinematical calculation unit 58 calculates the present hand position and orientation vector r of the robot arm 5 using the joint angle vector q measured by each of the encoders 44 of the robot arm 5, and outputs the obtained present hand position and orientation vector r to the positional error calculation unit 80, the desired trajectory generating unit 55, and the impedance calculation unit 51 (step S3).

Next, based on the motion information received from the motion instruction unit 27 and the motion correction unit 20 via the control parameter managing unit 21, the desired trajectory calculation unit 55 calculates the hand position and orientation desired vector $r_d$ of the robot arm 5 and the force desired vector $f_d$, and when it is in the impedance control mode, it outputs the hand position of the robot arm 5 as the desired hand position and orientation desired vector $r_d$ and the force desired vector $f_d$ to the positional error calculation unit 80 (step S4).

Next, based on the drive current value i of the motor 43, the joint angle vector q, and the joint angle error compensation output $u_{qe}$, the force detecting unit 53 calculates the equivalent hand external force $F_{ext}$ at the hand of the robot arm 5, and outputs the calculated equivalent hand external force $F_{ext}$ to the impedance calculation unit 51, the environment information acquiring unit 19, and the control parameter managing unit 21 (step S5).

Next, the control parameter managing unit 21 executes switching of the control mode for each of the components (step S6).

In this step S6, as to the control mode for each of the components, when it is (vi) the high-rigidity position control mode, the process proceeds to step S7; when it is (i) the position control mode, the process proceeds to step S8; and when it is (iv) the force control mode, the process proceeds to step S9.

Further, in step S6, when it is (v) the force hybrid impedance control mode or the hybrid impedance control mode, in order for any position component desired to change among those relating to the rotation axes of the robot arm 5 to be changed to (ii) the impedance control mode, the process proceeds to step S9.

Specifically, in the control parameter managing unit 21, when "correction exists" is instructed by the motion correction unit 20 and when any component of the six axes is to be corrected as to the force component by the correction parameter, the component having the force component set thereto has its control mode switched to the high-rigidity position control mode (step S6). Thereafter, the process proceeds to step S7.

Further, in step S6, in the control parameter managing unit 21, when the force hybrid impedance control mode or the hybrid impedance control mode is set, when any position component of the six axes is to be corrected, the position component desired to change has its control mode switched to the impedance control mode. Thereafter, the process proceeds to step S9.

Further, in step S6, when the position control mode is set by the control parameter managing unit 21, the process proceeds to step S8. In step S8, the position control mode is set. Alternatively, in step S6, in the control parameter managing unit 21, when the force control mode is set, the process proceeds to step S9, and the force control mode is set in step S9.

When the high-rigidity position control mode is set by the control parameter managing unit 21, the impedance calculation unit 51 regards the hand position orientation desired correction output $r_{d\Delta}$ as 0 vector (step S7). Thereafter, the process proceeds to step S10.

By adjusting the three gains, namely, the proportional gain, the differential gain and the integral gain each being a diagonal matrix of constants of the positional error compensation unit 56, the control by the positional error compensation unit 56 is exerted such that the position error $r_e$ converges to 0. By increasing the gains to certain greater values, the position control of high rigidity is achieved (step S10). Thereafter, the process proceeds to step S12.

When the position control mode is set by the control parameter managing unit 21, the impedance calculation unit 51 regards the hand position orientation desired correction output $r_{d\Delta}$ as 0 vector (step S8). Thereafter, the process proceeds to step S11.

When the impedance control mode or the force control mode is set by the control parameter managing unit 21, the impedance calculation unit 51 calculates the hand position orientation desired correction output $r_{d\Delta}$ using the inertia M, the viscosity D, and the rigidity K being the mechanical impedance set value set by the control parameter managing unit 21, the joint angle vector q, and the equivalent hand external force $F_{ext}$ applied to the robot arm 5 calculated by the force detecting unit 53, and calculated by the impedance calculation unit 80. Further, based on the correction parameter, any of the components of the hand position orientation desired correction output $r_{d\Delta}$ is set to 0 (step S9). Thereafter, the process proceeds to step S11.

The positional error compensation unit 56 calculates the hand position and orientation error $r_e$, which is the difference between the hand position and orientation correction desired vector $r_{dm}$ being the sum of the hand position and orientation desired vector $r_d$ and the hand position orientation desired correction output $r_{d\Delta}$, and the present hand position and orientation vector r (step S11). Specific example of the positional error compensation unit 56 may be a PID compensator. By adjusting the three gains, namely, the proportional gain, the differential gain and the integral gain each being a diagonal matrix of constants, the control by the positional error compensation unit 56 is exerted such that the position error $r_e$ converges to 0. Thereafter, the process proceeds to step S12.

The approximation inverse kinematical calculation unit 57 calculates such that, by multiplying the inverse matrix of the Jacobian matrix $J_r$ calculated in step S2 by the position error compensation output $u_{re}$, the position error compensation output $u_{re}$ is converted from a value relating to the hand position and orientation error to the joint angle error compensation output $u_{qe}$, which is a value relating to the joint angle error (step S12).

Next, the joint angle error compensation output $u_{qe}$ is provided from the approximation inverse kinematical calculation unit 57 via the input/output IF 24 to the motor driver 25. Based on the joint angle error compensation output $u_{qe}$, the motor driver 25 changes an amount of current flowing through the motor 43 in each of the joint portion of the robot arm 5. The change in the amount of current controls the drive motion of the motor of each of the joint portions of the robot arm 5 (step S13), whereby the robot arm 5 is operated.

By the foregoing steps S1 to S13 being repeatedly executed as a control calculation loop, the control of the motions of the robot arm 5, that is, the motion of controlling the mechanical impedance value of the robot arm 5 so as to assume a prescribed setting value can be achieved.

(Motion for Generating Control Rule in Consideration of Environment Information, and Actual Motion Flow in Consideration of Environment Information)

A description will be given of emotion for generating a control rule in consideration of the environment information and an actual motion flow in consideration of the environment information, in the control apparatus for the robot arm 5.

FIG. 17A is a motion flowchart of the robot arm 5 in the control apparatus for the robot arm 5 according to the first embodiment.

The person 4A selects, through the use of the external input device 26a, a task desired to be executed by the robot arm 5 out of the tasks in the control rule database 16, and inputs, via the data input IF 26, the selection instruction for the "task ID" corresponding to the selected task to the motion instruction unit 27 (step S50).

Next, based on the selection instruction input to the motion instruction unit 27, the motion instruction unit 27 refers to the control rule database 16 via the database input/output unit 28, and identifies the "motion ID" relating to the selected "task ID". Then, the motion instruction unit 27 refers to the motion information database 17 via the database input/output unit 28 based on the specified information of the "motion ID", and sets the motion procedure of the robot arm 5 according to the "motion ID" stored in the motion information database 17 (step S51).

Next, the person 4A inputs a motion start instruction for the selected task to the motion instruction unit 27 through the use of the data input IF 26. Upon receipt of the motion start instruction, the motion instruction unit 27 instructs the control parameter managing unit 21, via the database input/output unit 28, to operate in the set control mode. The control parameter managing unit 21 instructs the control unit 22 such that the robot arm 5 operates in the set control mode, and causes the robot arm 5 to operate under the control of the control unit 22 (step S52).

This concludes the normal control motion flow for the robot arm 5.

(Control Motion Flow for Robot Arm 5 in Consideration of Change in Environment Information)

Next, a description will be given of a control motion flow for the robot arm 5 in consideration of a change in the environment information.

FIG. 17B is a motion flowchart for generating a control rule in consideration of the environment information in the control apparatus for the robot arm 5 according to the first embodiment.

While the robot arm 5 is in motion, the person 4A manipulates the robot arm 5, to input an environmental change reporting manipulation start instruction to the motion instruction unit 27 via the data input IF 26 (step S53). When the environmental change reporting manipulation start instruction is input to the motion instruction unit 27, the motion instruction unit 27 stops the motion of the robot arm 5.

Next, the person 4A grips the robot arm 5, and in order to report a change in the environment to the control apparatus, the person 4A applies a force to the robot arm 5, whereby the motion correction unit 20 acquires the motion information of the environmental change reporting manipulation from the data input IF 26 via the motion instruction unit 27. Specifically, the motion correction unit 20 acquires the information as to the hand position and orientation of the robot arm 5 from the time point when the person 4A starts the correction until the time point when the correction ends, from the data input 26 via the motion instruction unit 27, and outputs the acquired information as the environmental change reporting manipulation to the motion information to the control rule generating unit 23 (step S54).

Next, the environment information acquiring unit 19 acquires information as to the environment on which the robot arm 5 acts or information as to the ambient environment in which the robot arm 5 actuates (i.e., the environment information) (step S55).

Next, when the environmental change reporting manipulation by the person 4A ends, the person 4A outputs, via the data input IF 26, environmental change reporting manipulation end information to the motion instruction unit 27 (step S56). When the environmental change reporting manipulation end information is output to the motion instruction unit 27, output of the environmental change reporting manipulation motion information from the motion instruction unit 27 to the control rule generating unit 23 stops.

Next, while the robot arm 5 is in motion, the person 4A manipulates the robot arm 5 to input, via the data input IF 26, a motion correcting manipulation start instruction to the motion instruction unit 27 (step S57). As one example, even when the environmental change reporting manipulation end information is not received in steps S56 and S57, when the motion instruction unit 27 receives the motion correcting manipulation start instruction from the person 4A via the data input IF 26, the motion instruction unit 27 may determine that the environmental change reporting manipulation ends, and the motion of the robot arm 5 may be resumed for starting the motion correcting manipulation, and the motion correcting manipulation may be started.

Next, while the robot arm 5 is in motion, by the person 4A gripping the robot arm 5 and applying a force to the robot arm 5 toward which the person 4A desires to correct, the motion correction unit 20 acquires correction information from the data input IF 26 via the motion instruction unit 27, and the motion correction unit 20 corrects the motion information. Specifically, the motion correction unit 20 acquires, as the correction information, information as to the hand position and orientation of the robot arm 5 from the time point when the person 4A starts the correction until the time point when the correction ends, every certain time period (e.g., every 0.2 seconds), from the data input IF 26 via the motion instruction unit 27, and the motion correction unit 20 outputs the correction information to the control rule generating unit 23, to thereby correct the motion information (step S58).

Next, when the motion correcting manipulation by the person 4A ends, the motion instruction unit 27 determines the motion correcting manipulation end information via the data input IF 26, the motion instruction unit 27 stops output of the correction information to the control rule generating unit 23 via the motion correction unit 20 (step S59).

Next, based on the motion information corrected by the motion correction unit 20 and the environment information acquired by the environment information acquiring unit 19, the control rule generating unit 23 generates a control rule, and stores the generated control rule in the control rule database 16 via the database input/output unit 28 (step S60).

(Actual Motion Flow in Consideration of Environment Information of Control Apparatus for Robot Arm 5)

Figure 29:
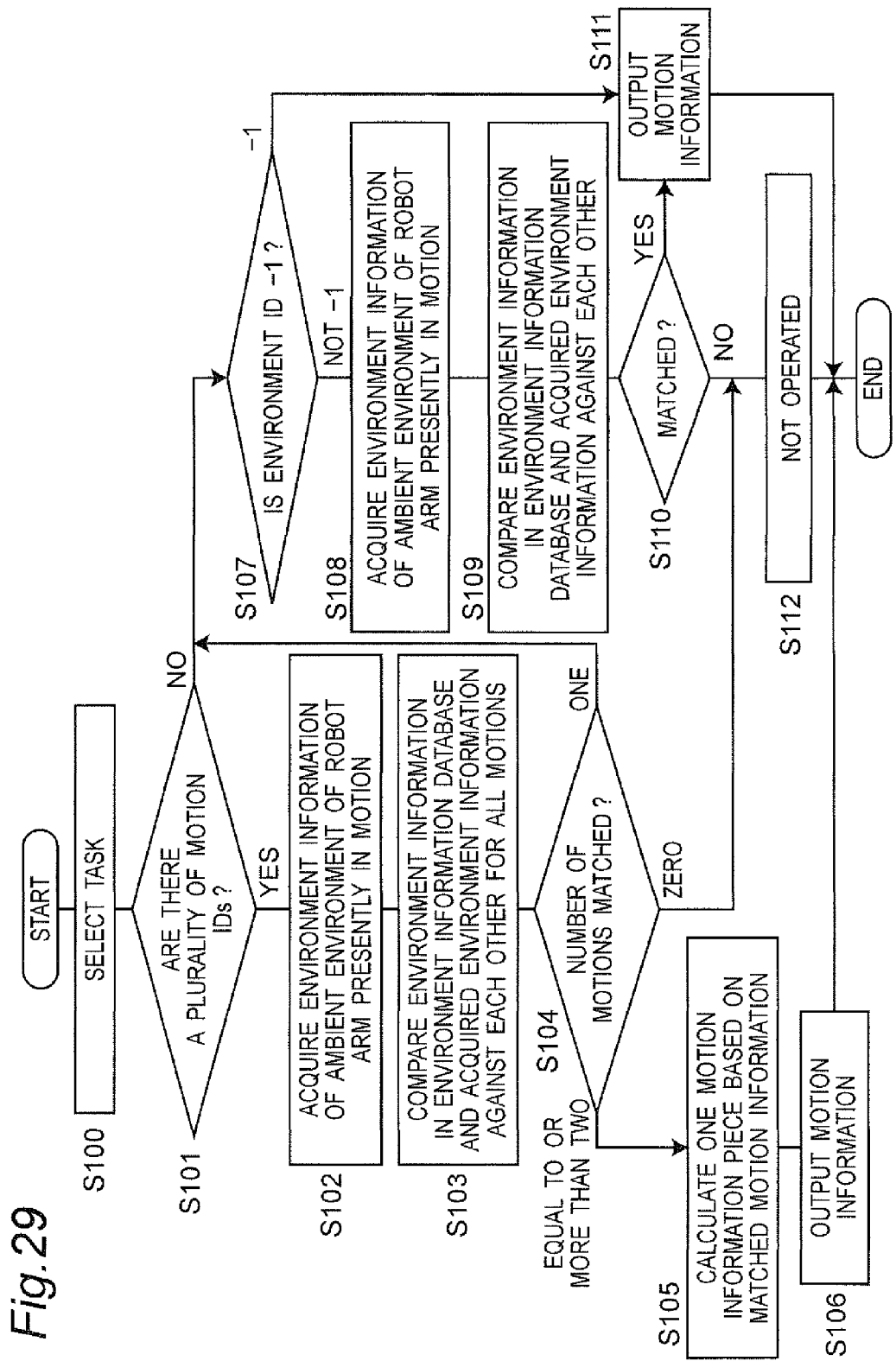
FIG. 29 is a flowchart showing motion steps of the motion instruction unit according to the first embodiment of the present invention.

FIG. 29 is an actual motion flowchart in consideration of the environment information of the control apparatus for the robot arm 5 according to the first embodiment.

The person 4A selects, through the use of the external input device 26a, a task desired to be executed by the robot arm 5 out of the tasks in the control rule database 16, and inputs, via the data input IF 26, the selection instruction for the "task ID" corresponding to the selected task to the motion instruction unit 27 (step S100).

Next, based on the selection instruction input to the motion instruction unit 27, the motion instruction unit 27 refers to the control rule database 16 via the database input/output unit 28, and the motion instruction unit 27 determines whether or not there are a plurality of "motion IDs" exist in the control rule database 16, as being corresponding to the selected "task ID" (step S101). When the motion instruction unit 27 determines that there are a plurality of "motion IDs" exist as being corresponding to the selected "task ID", the process proceeds to step S102. When the motion instruction unit 27 determines that there is one "motion ID" as being corresponding to the selected "task ID", the process proceeds to step S107.

In step S102, the environment information acquiring unit 19 acquires ambient environment information of the robot arm 5 in motion at present. Thereafter, the process proceeds to step S103.

Next, the motion instruction unit 27 compares the environment information acquired in step S102 and the environment information referred to for the "environment ID" corresponding to the "motion IDs" against each other (step S103).

When the motion instruction unit 27 determines that the number of "motion ID" whose environment information matched is one based on the comparison made by the motion instruction unit 27, the process proceeds to step S107. When the motion instruction unit 27 determines that the number of "motion ID" whose environment information matched is zero, the process proceeds to step S112. When the motion instruction unit 27 determines that the number of motion whose environment information matched is equal to or more than two, the process proceeds to step S105.

In step S105, the motion calculation unit 2 of the motion instruction unit 27 calculates one motion information piece based on the matched two or more motions. Thereafter, the process proceeds to step S106.

In step S106, the motion information calculated by the motion calculation unit 2 is output to the control parameter managing unit 21, and the flow ends.

On the other hand, when the motion instruction unit 27 determines that the matched motion is zero in step S104, it is regarded that there is no motion to be operated, and the flow ends, and the robot arm 5 stops operating (step S112).

Further, when the motion instruction unit 27 determines that the matched motion is one in step S104 and when the motion instruction unit 27 determines that the "motion ID" is one in step S101, the motion instruction unit 27 determines whether the "environment ID" of that "motion ID" assumes a value of "−1" (step S7). When the motion instruction unit 27 determines that the "environment ID" of the "motion ID" assumes the value of "−1", the process proceeds to step S111. When the motion instruction unit 27 determines that the "environment ID" of the "motion ID" does not assume the value of "−1", the process proceeds to step S108.

In step S108, the environment information acquiring unit 19 acquires ambient environment information of the robot arm 5 in motion at present. Thereafter, the process proceeds to step S109.

In step S109, the motion instruction unit 27 compares the environment information acquired in step S108 and the environment information referred to for the "environment ID" corresponding to the one "motion ID" against each other.

Next, in step S110, when the motion instruction unit 27 determines that they match as to the environment information in step S109, the motion instruction unit 27 refers to the control rule database 16 to acquire motion information stored by the "motion ID" corresponding to the matched "environment ID", and outputs the acquired motion information to the control parameter managing unit 21. Then, this flow ends (step S111).

In step S110, when the motion instruction unit 27 determines that they did not match as to the environment information, it is regarded that there is no motion to be operated, and this flow ends, and the robot arm 5 stops operating (step S112).

As has been described in the foregoing, through the motion steps S1 to S13 shown in FIG. 16 and steps S50 to S60 shown in FIGS. 17A and 17B, based on the control rule, by the person 4A directly gripping the robot arm 5 to apply a force to the robot arm 5 while the robot arm 5 is in motion, a change in the ambient environment of the robot arm 5 can be reported, and the motion information can be corrected in accordance with the environment.

Further, because the control rule is newly generated, when the same environment is varied next time, by the motion of the motion instruction unit 27 shown in steps S100 to S112 in FIG. 29, it becomes unnecessary for the person 4A to manipulate the motion correction again, but instead, it becomes possible for the robot arm 5 to autonomously operate based on the information in the control rule database 16 (in other words, based on the control rule generated by the control rule generating unit 23, while referring to the environment information acquired by the environment information acquiring unit 19).

SECOND EMBODIMENT

The basic structure of a robot arm 5 and a control apparatus therefor according to a second embodiment of the present invention is similar to that in the first embodiment. Therefore, the description as to the common constituents is not repeated herein, and the difference from the first embodiment solely will be detailed in the following.

As shown in FIG. 19A, a description will be given of an exemplary case where a wipe-cleaning task is performed for a top board 6a of an IH cooking heater 6 through the use of a robot 1 including the robot arm 5 and the robot arm 5 control apparatus. To a hand 30 of the robot arm 5, a sponge 46 as one example of a wipe-cleaning task-use jig being one example of the task-target object is attached.

First, as a comparative example, a description will be given of a case where, being different from the present invention, every time a contamination occurs (when a contaminated portion is found), the person 4A must perform a correction manipulation.

Figure 18A:
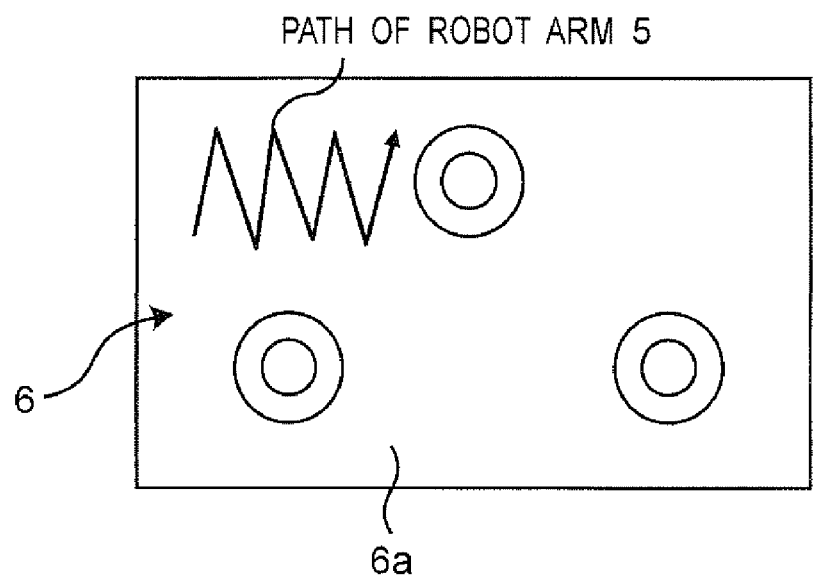
FIG. 18A is a view showing a motion of a control apparatus for a robot arm and a manipulation state of a person according to a second embodiment of the present invention.
Figure 18B:
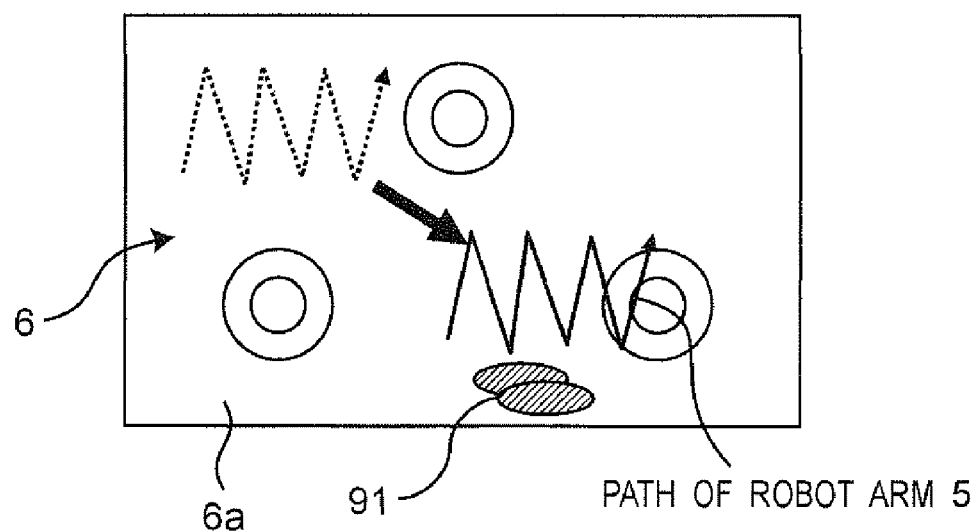
FIG. 18B is a view showing a motion of the control apparatus for the robot arm and a manipulation state of a person according to the second embodiment of the present invention.

Provided that, while the robot arm 5 is performing, for example as shown in FIG. 19A (FIG. 18A is a top view of the top board 6a of the IH cooking heater 6), a wipe-cleaning motion for the top board 6a of the IH cooking heater 6 or the like with the sponge 46, which corresponds to the task having "task ID" "1" in FIG. 10A, the person 4A finds that a contaminated place (contaminated portion) 91 on the top board 6a of the IN cooking heater 6 or the like, which is a place other than the place where the wipe-cleaning motion is being performed. At this time, as shown in FIG. 19B (FIG. 18B is a top view of the IH cooking heater 6), in order to clean the portion around the contamination with the sponge 46, the person 4A grips the robot arm 5 with the hand 4, to shift the sponge 46 at the hand position of the robot arm 5 to the contaminated portion 91.

Next, with respect to the contaminated portion 91, in order to accelerate the shifting speed of the sponge 46 (i.e., the hand 30) in the plane direction of the top board 6a and to scrub harder with the sponge 46 the contaminated surface of the top board 6a, the person 4A grips the robot arm 5 which is in motion, so as to shift the robot arm 5 along the plane direction of the top board 6a while being accelerated, and further applies a force to the robot arm 5 downward toward the contaminated portion 91, from above the IH cooking heater 6.

As a result, while the robot arm 5 accelerates to shift along the plane direction of the IH cooking heater 6, the robot arm 5 further increases the scrubbing force for the IH cooking heater 6, to perform the wipe-cleaning task.

The correction as described above necessitates the person 4A again to perform the correction manipulation when a similar contamination occurs (when a contaminated portion is found) next time, and therefore, it is troublesome.

Accordingly, in the second embodiment, a control rule is generated by the control rule generating unit 23 based on a manipulation by the person 4A and the corresponding environment information. This makes it possible for the robot arm 5 to autonomously perform the wipe-cleaning task when a similar contamination occurs next time, based on the information in the control rule database 16 (in other words, based on the control rule control rule generated by the generating unit 23, while referring to the environment information acquired by the environment information acquiring unit 19).

In the following, the function thereof will be described.

—Motion Instruction Unit—

In the following, a description will be given of the function of the motion instruction unit 27.

The person 4A selects, via the data input IF 26, a task desired to be executed by the robot arm 5 out of the tasks relating to the "task IDs" in the tasks in the control rule database 16, and the motion instruction unit 27 executes the motion. That is, in a case where the person 4A selects via the data input IF 26 the task having "task ID" "1" in FIG. 10A, the motion instruction unit 27 refers to the motion information database 17 via the database input/output unit 28 for the "motion ID" corresponding to the task "1", and sets a control mode according to the flags based on the motion information (specifically, position, orientation, time, and force), and instructs the control parameter managing unit 21 such that the robot arm 5 operates accordingly.

Specifically, in the case where task having "task ID" "1" in FIG. 10A is selected, because the "environment ID" assumes a value of "−1", irrespective of the environment information in which the robot arm 5 operates, the motion instruction unit 27 instructs the control parameter managing unit 21 such that the robot arm 5 operates the motion stored by the "motion ID". In a case of the motion having "motion ID" "1" of the task having "task ID" "1", with reference to the motion information database 17 in FIG. 5A, "flags" shows "1" for the 0th, 1st, 3rd, 4th, and 5th bits, which means, x, y, φ, θ, ψ of the hand of the robot arm 5 are valid. Therefore, the motion instruction unit 27 instructs the control parameter managing unit 21 such that motion is performed in the position control mode as to x, y, φ, θ, ψ; whereas the flags show "1" for the "8th" bit, and therefore the motion instruction unit 27 instructs the control parameter managing unit 21 such that the motion is performed in the force control mode as to the z-axis. Based on the foregoing, as shown in FIG. 19A, the robot arm 5 starts the wipe-cleaning task for the top board 6a of the IH cooking heater 6 or the like.

—Motion Correction Unit—

In the following, a description will be given of the function of the motion correction unit 20.

During a wipe-cleaning motion for the top board 6a of the IH cooking heater 6 or the like, the person 4A recognizes that there is a contaminated place on the top board 6a of the IH cooking heater 6 or the like other than the place at which the wipe-cleaning motion is being performed, and provides the motion instruction unit 27 via the data input IF 26 with a manipulation (an environmental change reporting manipulation) start instruction for informing the robot arm 5 of the contamination state.

First, upon receipt of the environmental change reporting manipulation instruction via the data input IF 26 and the motion instruction unit 27, the motion correction unit 20 sets the control mode in accordance with the flags in the motion information database 17 via the database input/output unit 28, and instructs the control parameter managing unit 21 to operate accordingly. Specifically, referring to the motion information database 17 via the database input/output unit 28 for the motion having "motion ID" "1" being performed for the task having "task ID" "1" in FIG. 10A, the flags of each of the "key motion IDs" show "1" only for the 0th, 1st, 3rd to 5th and 8th bits in FIG. 5A and shows "0" for the others. Therefore, the motion correction unit 20 can recognize that, for the motion of the robot arm 5, data is valid for the x-, y-, φ-, θ-, and ψ-axes in relation to the position orientation and the z-axis only in relation to force.

Accordingly, in order for the x-, y-, φ-, θ-, and ψ-axes to be corrected by a force applied by the person 4A, the motion correction unit 20 instructs the control parameter managing unit 21 such that the x-, y-, φ-, θ-, and ψ-axes are operated as being switched from the position control mode to the impedance control mode (i.e., the mode of shifting in the direction toward which the force of the person 4A is detected). The motion correction unit 20 instructs the control parameter managing unit 21 such that the z-axis is operated in the high-rigidity position control mode at the position of the top board 6a of the IH cooking heater 6 or the like. In the impedance control mode, the robot arm 5 stops when not being applied with a force by the person 4A, whereas it is capable of shifting, when being applied with a force by the person 4A, in that direction. In the high-rigidity position control mode, the force detecting unit 53 can detect a force applied by the person 4A, in such a mode that the robot arm 5 does not easily shifts even when being applied with a force by the person 4A.

Next, as shown in FIG. 19B (FIG. 18B), the person 4A performs a manipulation (i.e., an environmental change reporting manipulation) of informing the robot arm 5 of a contaminated place of the top board 6a of the IH cooking heater 6 or the like. Specifically, the person 4A directly grips the robot arm 5 with the hand 4, and applies a force to the robot arm 5 toward the contaminated portion 91, to shift the robot arm 5 along the x-y plane. Subsequently, while shifting the sponge 46 in the x-axis direction and the y-axis direction on the contaminated portion 91, the person 4A applies a downward force to the robot arm 5 in the z-axis direction.

In order to acquire the motion of shifting the robot arm 5 by applying the force to the robot arm 5 by the person 4A performing the environmental change reporting manipulation, the motion correction unit 20 acquires the hand position and force of the robot arm 5 from the control parameter managing unit 21, and the motion correction unit 20 outputs the acquired information to the control rule generating unit 23, the description of which will be given later.

Next, upon receipt of the motion correcting manipulation start instruction from the data input IF 26 via the motion instruction unit 27, the motion correction unit 20 sets the control mode in accordance with the correction parameter flags in the motion information database 17, and instructs the control parameter managing unit 21 to operate accordingly. Specifically, when the motion correction unit 20 refers to the motion information database 18 via the database input/output unit 28 for the motion having "motion ID" "1" in FIG. 10A being performed for the task having "task ID" "1", the correction parameter flags of each of the "key motion IDs" show "1" only for the 0th, 1st, and 8th bits in FIG. 5A, and show "0" for the others. Therefore, the motion correction unit 20 can recognize that, for the motion of the robot arm 5, the x- and y-axis position components and the z-axis force component are only correctable. When the x- and y-axis position components and the z-axis force component are to be corrected, in order for the x- and y-axis position components and the z-axis force component to be corrected by a force applied by the person 4A, the motion correction unit 20 instructs the control parameter managing unit 21 such that the x- and y-axes are operated in the hybrid impedance control mode, and the z-axis is operated in the high-rigidity position control mode.

Figure 19C:
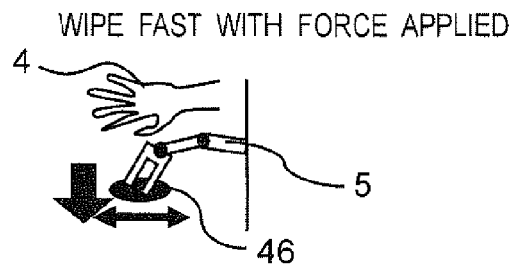
FIG. 19C is a side view showing a motion state of the control apparatus for the robot arm according to the second embodiment of the present invention.
Figure 19D:
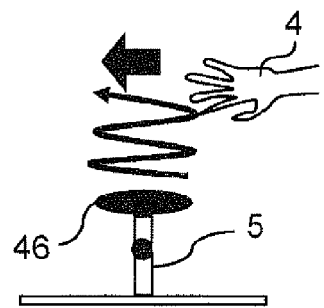
FIG. 19D is a plan view showing a motion state of the control apparatus for the robot arm according to the second embodiment of the present invention.

As shown in FIG. 19C, in order to clean the contaminated portion 91 and the vicinity thereof with the sponge 46 with a greater applied force and at a fast shifting speed, as shown in FIG. 19D (which corresponds to FIG. 19C as viewed from above), the robot arm 5 is directly gripped by the person 4A, and when acceleration is desired, a force is applied to the robot arm 5 by the person 4A in the same direction as the traveling direction of the wipe-cleaning, and when deceleration is desired, a force is applied to the robot arm 5 by the hand 4 of the person 4A in the direction opposite to the cleaning traveling direction. Further, as to the direction toward the contaminated portion 91, the person 4A grips the robot arm 5 and applies a force to the robot arm 5 toward the portion where the contamination is.

Figure 19E:
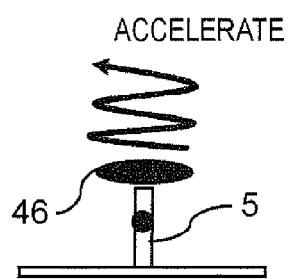
FIG. 19E is a plan view showing a motion state of the control apparatus for the robot arm according to the second embodiment of the present invention.

Placing the x- and y-axes in the hybrid impedance control mode, while the robot arm 5 is shifted in the position control mode, the force detecting unit 53 detects, in the impedance control mode, the force applied to the robot arm 5 by the hand 4 of the person 4A, and shift the robot arm 5 in the direction toward which the force is applied to the robot arm 5 by the hand 4 of the person 4A as to the x- and y-axis directions. Provided that the time it takes to shift from the position ($x_1$, $y_1$) of the robot arm 5 indicated by the motion having "motion ID" "1" being performed for the task having "task ID" "1" in FIG. 10A to the position ($x_2$, $y_2$) of the robot arm 5 of the next "motion ID" is $t_1$, in a case where the speed of the robot arm 5 is changed by a force of the person 4A (see FIG. 19D), that is, in a case where the time it takes to shift from the position ($x_1$, $y_1$) to the position ($x_2$, $y_2$) is changed from $t_1$ to $t_2$, the motion correction unit 20 outputs the value of time $t_2$ to the control parameter managing unit 21. Thus, the correction is made to achieve the motion such as shown in FIG. 19E.

Further, the force detecting unit 53 detects the force applied in the z-axis direction, and the motion correction unit 20 acquires the force at the robot arm 5 and the time from the control parameter managing unit 21, and outputs the acquired information to the control rule generating unit 23, the description of which will be given later. It is to be noted that, the information as to time is the relative time in which the time point at which the person 41 selects a task and issues a start instruction is regarded as 0.

—Control Rule Generating Unit—

Similarly to the first embodiment, while the robot arm 5 is in motion in one of the impedance control mode, the position control mode, the force control mode, and the control mode being the combination of the foregoing modes set for each direction, the description of which will be given later, the control rule generating unit 23 receives, from the data input IF 26 via the motion instruction unit 27, a motion correcting manipulation start instruction, by the information as to position, orientation, force, and time in the motion information database 17 referred to by the "motion ID" in the control rule database 16 via the database input/output unit 28. The control rule generating unit 23 functions to generate a control rule based on the motion information corrected by the motion correction unit 20 and the environment information acquired by the environment information acquiring unit 19, and to store the generated control rule in the control rule database 16 via the database input/output unit 28.

In the following, the functions of the control rule generating unit 23 will be described.

To the control rule generating unit 23, from the data input IF 26 via the motion instruction unit 27, for a task ID which is in motion, in response to an environmental change reporting manipulation start instruction, the motion correction unit 20 inputs a hand position of the robot arm 5 and time which is generated based on an environmental change reporting manipulation from the person 4A. Additionally, the environment information acquiring unit 19 inputs environment information to the control rule generating unit 23 from the timing of start of the environmental change reporting manipulation. Further, the control rule generating unit 23 refers to, via the database input/output unit 28, the motion information database 18 for an "motion ID" which is in motion at the start of the environmental change reporting manipulation, and the control rule generating unit 23 acquires, based on the information as to flags of the "key motion ID" of that "motion ID", the information as to the present control mode of the robot arm 5. Specifically, when the control rule generating unit 23 refers to the motion information database 18 via the database input/output unit 28 for the key motions respectively having "key motion IDs" "1" to "8" for the motion having "motion ID" "1" in FIG. 10A, which is in motion for the task having "task ID" "1", the flags of each of the "key motion IDs" show "1" only for the 0th, 1st, 3rd to 5th, and 8th bits in FIG. 5A, and show "0" for the others. Therefore, the control rule generating unit 23 can recognize that, for the motion of the robot arm 5, data is valid for the x-, y-, $\phi$-, $\theta$-, and $\psi$-axes in relation to the position orientation, and the z-axis only in relation to force. Accordingly, in order for the x-, y-, $\phi$-, $\theta$-, and $\psi$-axes to be corrected by a force applied by the person 4A, the impedance control mode is set thereto.

Figure 20:
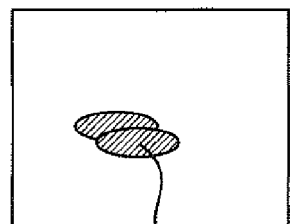
FIG. 20 is a view showing an exemplary image of environment information according to the second embodiment of the present invention.

Based on the control mode of the shifting direction of the robot arm 5 at the time of the environmental change reporting manipulation in relation to the presently performed motion and the detecting unit selection rule database 29, the control rule generating unit 23 selects an environment information type for generating a control rule out of a plurality of environment information pieces. Specifically, at the timing of start of the environmental change reporting manipulation of the task having "task ID" "1" in FIG. 10A, as shown in FIG. 18B, the environmental change reporting manipulation is performed as to the x- and y-axis directions. Because the correction is made having the x- and y-axes placed in the impedance control mode, with reference to FIG. 11A, the environment information type ID is "1", and with reference to FIG. 11B, "image" is identified. Further, because the environmental change reporting manipulation is performed for the x- and y-axis directions in FIG. 18B, the control rule generating unit 23 selects the image by the first image pickup apparatus 15a which is capable of capturing an image of the x-y plane (e.g., the image capturing the contamination shown in FIG. 20). Further, as to the manipulation shown in FIG. 18B, a manipulation of applying a force in the z-axis direction in the high-rigidity position control mode. With reference to FIG. 11A, in the high-rigidity position control mode, the environment information type ID is "2", and with reference to FIG. 11B, "force" is identified. Accordingly, the control rule generating unit 23 selects the force detected by the force detecting unit 53.

The control rule generating unit 23 stores the information pieces of image and force acquired by the control rule generating unit 23 in the environment information database 18 via the database input/output unit 28. Specifically, as represented by the environment information of "environment ID" "11" in FIG. 9A, the control rule generating unit 23 allots "11" to the new "environment ID", and the control rule generating unit 23 stores, via the database input/output unit 28, the file name of the selected image in the "image ID" of that "environment ID" in the environment information database 18 (in this example, the file name is image 4, which corresponds to the image capturing the contaminated portion 91 shown in FIG. 20). Further, the control rule generating unit 23 stores, via the database input/output unit 28, the detected force value in the environment information database 18. It is to be noted that, the control rule generating unit 23 stores every axis in relation to force in the environment information database 18, via the database input/output unit 28. As to force, the friction coefficient varies depending on each contamination (the friction coefficient can be calculated by dividing a force in the traveling direction on the cleaning surface, which is included in an output from the force detecting unit 53 at a wipe-cleaning motion, by a vertical drag of the cleaning surface). For example, in a case where a viscous substance is sticking hard, the friction coefficient becomes great. Accordingly, by allowing the control rule generating unit 23 to store the information as to force in the environment information database 18 via the database input/output unit 28, it becomes possible to change the extent of force exerted for the wipe-cleaning, in accordance with the friction coefficient.

Because the image and all the force values are valid, the flags showing "1" for the 0th to 6th bits are stored by the control rule generating unit 23 in the environment information database 18, via the database input/output unit 28.

Upon receipt of the motion correcting manipulation start instruction, the motion information corrected by the motion correction unit 20 is stored in the motion information database 17 via the database input/output unit 28.

Specifically, as shown in FIG. 5C, the motion correction unit 20 newly allots an "motion ID" in the motion information database 17 (in this example, "4"). Further, the motion correction unit 20 allots "key motion IDs" ("32" to "38"), and stores motion information pieces corrected by the motion correction unit 20 by their respective "key motion IDs". As to time, the motion correction unit 20 inputs the relative time in which the time point at which the person 4A selects a task and issues a start instruction is regarded as 0. Therefore, the value obtained by subtracting the time of the very first key motion (in this example, "20") from the time of each of all the motions is stored in the motion information database 17. As to flags, among the components of the motion formation for which the flags before correction show "1", the motion correction unit 20 compares the position orientation and the force values of the key motion of the "motion ID" before correction against those after correction, for each component. Then, the motion correction unit 20 allows only those components having a resultant difference being equal to or more than a certain threshold value to have the flags showing "1" in FIGS. 6; and "0" for the components being less than the threshold value.

Specifically, the flags of the motion having "motion ID" before correction "1" show "1" for the 0th, 1st, 3rd to 5th, and 8th bits, and show "0" for the others. Therefore, the motion correction unit 20 performs a comparison as to the position orientation (x, y, φ, θ, ψ) and the force z-components only, between the position orientation and the force values of the motion before correction and those of the motion after correction. Between the key motion having "key motion ID" "1" and the key motion having "key motion ID" "4", among the components of position orientation (x, y, φ, θ, ψ), the difference as to the x-component is 0.1 (m), the difference as to the y-component being 0.2 (m), and the remainder components being the same; whereas the difference as to the force z-component is 3 (N). When the threshold value of the difference in position is 0.05 (m) and the threshold value of the difference in force is 0.5 (N), the x- and y-components of position and the z-axis component of force become equal to or more than the respective threshold values. Accordingly, the flags of the "key motion ID" of each motion having "motion ID" "4" show "1" for the 0th, let, and 8th bits, and show "0" for the others.

As to the correction parameter flags, the motion correction unit 20 stores the values of each motion before correction (in this example, "1" to "8") in the motion information database 17.

As has been described in the foregoing, the control rule generating unit 23 generating a new control rule in response to the person 4A performing an environmental change reporting manipulation and a motion correcting manipulation achieves the following: when the person 4A manipulates in accordance with a change in the environment to correct any motion, and then when the similar environment is varied next time, the robot arm 5 can autonomously operate based on the information in the control rule database 16 (in other words, based on the control rule generated by the control rule generating unit 23, while referring to the environment information acquired by the environment information acquiring unit 19).

As has been described in the foregoing, generation of a new control rule makes it possible to perform the task in accordance with the added control rule when the similar environment is varied next time (in this example, in a case where a wipe-cleaning is to be performed with a greater force and at a fast speed when a contamination is hard), based on the information in the control rule database 16 (in other words, based on the control rule generated by the control rule generating unit 23, while referring to the environment information acquired by the environment information acquiring unit 19).

In this example, as shown in FIG. 10B, the motion information database 17 stores therein a plurality of "motion IDs" ("1" and "4") as being corresponding to the task having "task ID" "1". Accordingly, a description will be given of the function (i.e., the motion calculation unit 2) of the motion instruction unit 27 in this case.

The motion having "motion ID" "1" for the task having "task ID" "1" in FIG. 10B indicates motion information for executing the motion shown in FIG. 19A. On the other hand, the motion having "motion ID" "4" for the task having "task ID" "1" indicates motion information for executing the wipe-cleaning motion when the contamination is hard, as shown in FIG. 19B.

The person 4A instructs, via the data input IF 26, to start the task having "task ID" "1" to the motion instruction unit 27.

Upon receipt of the task start instruction of the task bearing the specified "task ID", the motion instruction unit 27 starts, via the database input/output unit 28, the task having the specified "task ID" in the control rule database 16. Here, when the motion instruction unit 27 determines that a plurality of "motion IDs" exist in the "task ID", the motion calculation unit 2 of the motion instruction unit 27 calculates an eventual to-be-executed motion information, based on flags of respective "environment IDs" and respective "motion IDs" (i.e., which are the flags found as being stored when the motion instruction unit 27 refers to, via the database input/output unit 28, the motion information database 17 for the "motion ID").

Specifically, in FIG. 10B, the task having "task ID" "1" includes the motion having "motion ID" "1" and the motion having "motion ID" "4". The motion having "motion ID" "1" has the "environment ID" which assumes a value of "−1" and, therefore, the motion is executed irrespective of the ambient environment of the robot arm 5. Therefore, it is selected by the motion instruction unit 27 as the motion to be executed.

Next, the "environment ID" of the motion having "motion ID" "4" is the environment information "11", which does not assume the value of "−1". Therefore, the motion instruction unit 27 refers to, via the database input/output unit 28, the environment information database 18 for the environment information having "environment ID" "11". The flags of the environment information having "environment ID" "11" in FIG. 9A show "1" for the 1st to 6th bits and, therefore, the motion instruction unit 27 can determine that image and force are valid. Accordingly, the motion instruction unit 27 acquires an image ID (specifically, the image file name) and force from the environment information database 18 via the database input/output unit 28.

Next, the motion instruction unit 27 acquires image information and force information at present from the environment information acquiring unit 19. Then, the motion instruction unit 27 compares the two images, namely, the image information of the acquired image ID and the image information at present, against each other based on image matching. When the motion instruction unit 27 determines that the two images agree with each other, the motion instruction unit 27 selects the motion stored by "motion ID" "3" as the motion to be executed.

When there are a plurality of selected motions (in this example, the motion having "motion ID" "1" and the motion having "motion ID" "4"), the motion instruction unit 27 adds up the plurality of selected motions in the stored order in the control rule database 16, in accordance with the flags of respective motion information pieces, to obtain the motion to be executed.

In this example, the motion having "motion ID" "1" and the motion having "motion ID" "4" are selected by the motion instruction unit 27, and under the "motion. ID" in the control rule database 16 in FIG. 10B, they are stored in order of the motion "1", and then the motion "4". Accordingly, with reference to FIG. 5C, because flags of the motion information of the motions having "motion ID" "1" show "1" for the 0th, 1st, 3rd to 5th and 8th bits, the motion instruction unit 27 acquires motion information of the position orientation information $(x, y, \phi, \theta, \psi)$ and the force z-component from the motion information of the motion having "motion ID" "1".

Next, because the flags of the motions having "motion ID" "4" show "1" only for the 0th, 1st, and 8th bits, the motion instruction unit 27 performs calculation by replacing the x- and y-components of position and the z-axis component of force of the motions having "motion ID" "1" by those of the motions having "motion ID" "4". For example, the position orientation of the key motion having "key motion ID" "1" is (0.1, 0.1, 0, 0, 0, 0) and the force thereof is (0, 0, 5, 0, 0, 0); whereas the position orientation of the motion having "key motion" "32" of the motion having "motion ID" "4" is (0.2, 0.3, 0, 0, 0, 0) and the force thereof is (0, 0, 8, 0, 0, 0). Therefore, the motion instruction unit 27 replaces the position orientation and the force information of the key motion having "key motion" "1" by the positional x- and y-components (0.2, 0.3) and the force z-component 8 (N) of the key motion having "key motion ID" "32", whereby the eventual position orientation (0.2, 0.3, 0, 0, 0, 0) and the force information (0, 0, 8, 0, 0, 0) are provided. Similarly, the motion instruction unit 27 replaces the positional x- and y-components and the force z-component of the key motion having "key motion ID" "2" by the x- and y-components and the force z-component of the key motion having "key motion ID" "33". In succession thereto, until the end of the "key motion ID" is reached, the motion instruction unit 27 calculates in order.

As to the flags of the motion information and the motion information flags, in a case where one of the bits of the motions having "motion ID" "1" and the bits of the motions having "motion ID" "4" assume "1", the flags after calculation show "1"; when the bits of both the motions assume "0", then "0" is shown. However, only one of the components of the position and those of the force may assume "1" (because actuation can occur exclusively in the position control mode or in the force control mode). Therefore, when both the components of the position and those of the force assume "1", the force is prioritized.

Because the flags of the motions having "motion ID" "1" show "1" for the 0th, 1st, 3rd to 5th, and 8th bits, and the flags of the motions having "motion ID" "4" show "1" for the 8th bit, the flags of the calculated motion show "1" for the 0th, let, 3rd to 5th, and 8th bits.

Because the motion parameter flags of the motions having "motion. ID" "1" and the flags of the motions having "motion ID" "4" both show "1" for the 0th, 1st, and 8th bits, the motion parameter flags of the calculated motion show "1" for the 0th, 1st, and 8th bits.

The motion instruction unit 27 switches the control mode in accordance with the flags of the motion information after calculation, and the motion instruction unit 27 outputs the motion information to the control parameter managing unit 21. Thus, it becomes possible for the motion instruction unit 27 to execute the calculated motions.

As has been described in the foregoing, while a wipe-cleaning is performed for a contaminated place, the person 4A directly grips the robot arm 5 and applies a force to the robot arm 5, to thereby report of a change in the ambient environment of the robot arm 5 (i.e., where the contamination is). This makes it possible to correct the motion information in accordance with the color of the contamination or the friction coefficient of the contaminated surface. Further, similarly to the first embodiment, because a control rule is newly generated, when the similar environment is varied next time, as a result of the motion of the motion instruction unit 27 of steps S100 to S112 shown in FIG. 29, the robot arm 5 can autonomously operate based on the information in the control rule database 16 (in other words, based on the control rule generated by the control rule generating unit 23, while referring to the environment information acquired by the environment information acquiring unit 19), without the person 4A performing the motion correction manipulation again.

THIRD EMBODIMENT

The basic structure of a robot arm 5 and a control apparatus therefor according to a third embodiment of the present invention is similar to that in the first embodiment. Therefore, the description as to the common constituents is not repeated herein, and the difference from the first embodiment solely will be detailed in the following.

Figure 21:
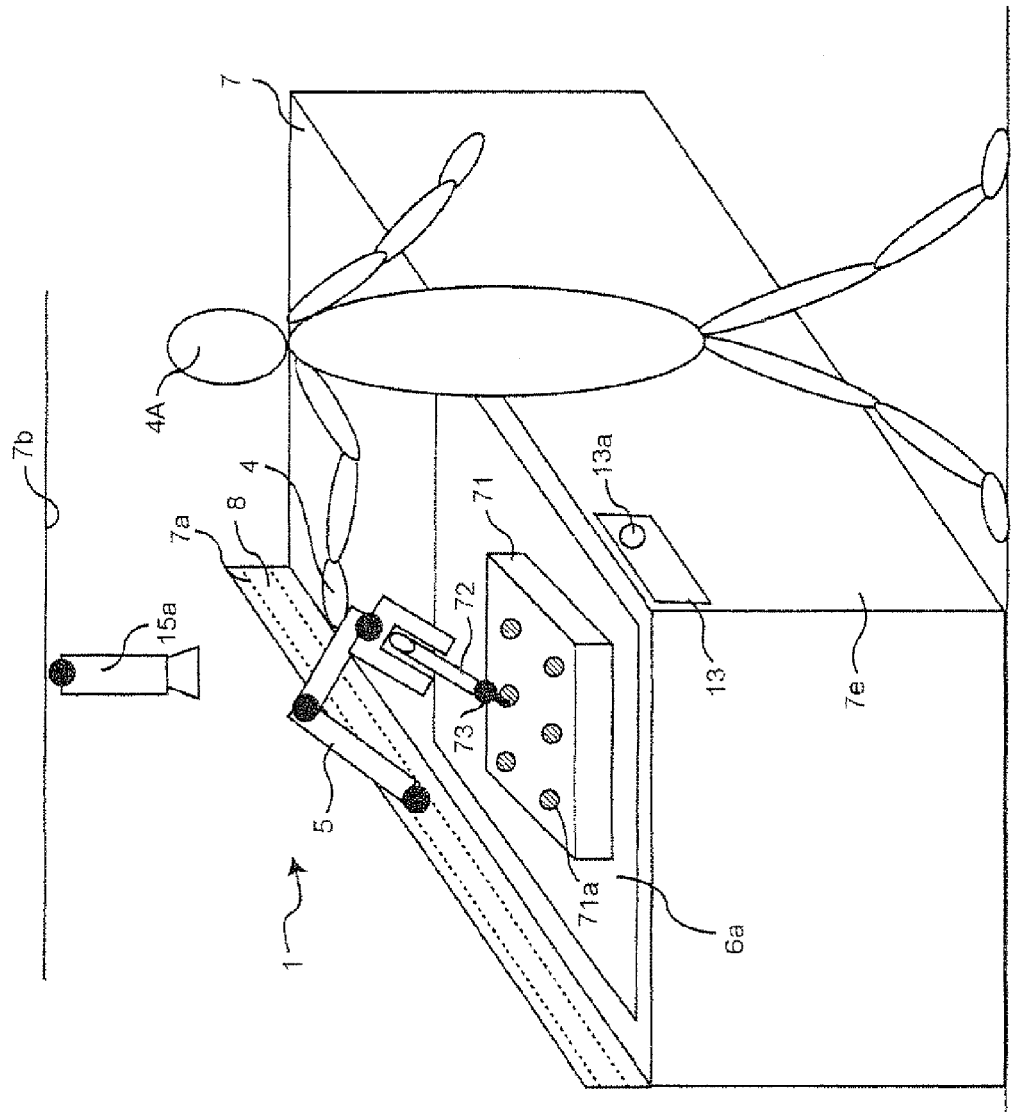
FIG. 21 is a view showing an overview of a robot according to a third embodiment of the present invention.

In the third embodiment, a description will be given of an exemplary case where, as shown in FIG. 21, a screw 73 is attached to a device 71 such as a television set, a DVD recorder or the like in a factory employing cell manufacturing, through the use of a robot 1 including the robot arm 5 and the control apparatus for the robot arm 5. A tool for attaching the screw 73 as one example of the task-use jig can be attached to the hand 30 of the robot arm 5.

As shown in FIG. 21, the robot arm 5 of the robot 1 is installed on a wall surface 7a of a workbench 7 such as a workbench table in a factory, for example. The base end of the robot arm 5 is shiftably supported by a rail 8 fixed to the wall surface 7a, such that the robot arm 5 can shift on the rail 8 in a lateral direction along the rail 8, e.g., in the horizontal direction, by a force of a person 4A. The reference numeral 15a denotes a first image pickup apparatus such as a camera, which is installed at a ceiling 7b, for example, so as to be capable of capturing an image of the workbench 7.

The robot 1 uses the robot arm 5 to perform a task which is performed by the robot arm 5 and the person 4A in cooperation with each other, such as a task of attaching a screw 73 to a television set or a DVD recorder in a factory, for example.

Similarly to the first embodiment, first, the person 4A directly grips the robot arm 5 of the robot 1 with the hand 4 and applies a force to the robot arm 5. Then, the force applied by the person 4A to the robot arm 5 allows the robot arm 5 of the robot 1 to shift along the rail 8, whereby the robot arm 5 is guided to the vicinity of the tool 71 (in this example, a device such as a television set or a DVD recorder to which the screw 73 is attached).

Next, the person 4A attaches a tool for attaching the screw 73, e.g., an electric screwdriver tool 72, as another example of the task-use jig 9 being one example of a task-target object, to the hand of the robot arm 5 of the robot 1, i.e., a hand 30 at its tip. The electric screwdriver tool 72 is capable of holding, e.g., the screw 73, at its bottom end. When the electric screwdriver tool 72 is pointed downward and pressed against the device 71, a switch is turned on and the screwdriver automatically rotates, whereby a screwing motion of the screw 73 to a screw hole 71a is achieved (i.e., a tightening motion or a removal motion can be achieved). When such pressing is released, the switch is turned off, whereby the rotation of the screwdriver being the electric screwdriver tool 72 stops.

Next, the person 4A uses a data input IF 26, for example, by pressing a button 13a of a console 13 of the robot 1 as one example of the data input IF 26 disposed at a front side surface 7e of the workbench 7 of cell manufacturing or the like, whereby the robot arm 5 actuates, to start the previously selected task, that is, the attaching (tightening) task of the screw 73 held at the tip of the electric screwdriver tool 72 gripped by the hand 30, relative to the screw hole 71a of the tool 71.

Next, in a case where the shape of the device 71 or in the specification of the screw 73 or the screw hole 71a is changed due to any specification change of the device 71, when the robot arm 5 is performing the attaching task of the screw 73 with the electric screwdriver 72 gripped by the hand 30, the person 4A checks the attaching state of the screw 73, and the person 4A applies a force to the robot arm 5, to perform a motion correction as to the tightening manner of the screw 73 or of a positional adjustment of the screw 73, so as to correct the motion of the robot arm 5 of the robot 1.

The rail 8 is arranged on the wall surface 7a of the workbench 7. However, in a case where the workbench having no wall surface is used, it may be disposed at a place which is suitable for performing a task, such as a ceiling surface, a side surface of a top board 6a of the workbench or the like.

Further, though the console 13 is fixed to the side surface of the workbench 7, the console 13 may be replaced by a remote controller with which teleoperation can be performed.

—Motion Information Database—

Similarly to the first embodiment, a motion information database 17 stores therein information as to motions of the robot arm 5 (i.e., motion information), such as the hand position and orientation of the robot arm 5 at a certain time. The database input/output unit 28 inputs and outputs the motion information to and from the motion information database 17 via the control rule generating unit 23.

FIGS. 22A and 22B each show the motion information database 17 according to the third embodiment. The motion information other than the flags is the same as that in the first embodiment and, therefore, the description thereof will not be repeated. The flags correspond to information as to flags indicative of whether any piece of information among parameters of hand position and orientation of the robot arm 5 and force is valid or not (see the column "flag" in FIG. 22A). Specifically, such information is represented by numerical values of 32 bits shown in FIG. 23. The 0th to 11th bits are the same as in the first embodiment. As to the 12th to 17th bits, in a case where respective values of hand position and orientation are valid (i.e., when one of the 0th to 5th bits is "1"), and where, as motion information of that hand position and orientation, values of hand position and orientation immediately before execution of that motion information are copied and used, the 12th to 17th bits each assume "1"; and in a case where the values are not used, the bits each assume "0". For example, with reference to FIG. 22A, the "flags" of the key motion having "key motion ID" "50" shows "1" for the 0th, 1st, 3rd to 5th, 8th, 12th, 13th, and 15th to 17th, and shows "0" for the others. This indicates that, based on the 0th, 1st, 3rd to 5th, and 8th bits each being "1", (x, y, φ, θ, ψ) out of the hand position and orientation components, and the force z-component are valid. Further because the 12th, 13th, and 15th to 17th are each "1", the (x, y, φ, θ, ψ) components out of the hand position and orientation components are copied from the (x, y, φ, θ, ψ) components of the hand position and orientation which is in motion immediately before. For example, in a case where the key motion having "key motion ID" "48" is in motion immediately before the key motion having "key motion ID" "50" is started, out of the position orientation components of the key motion having "key motion ID" "48", values of (x, y, φ, θ, ψ) (in this example, (0.2, 0.1, 0, 0, 0)) are copied to the position orientation components (x, y, φ, θ, ψ) of the key motion having "key motion ID" "50". Because the hand position and orientation immediately before is copied, the hand position and orientation immediately before becomes identical to the values of the hand position and orientation. Accordingly, the robot arm 5 stops at the hand position and orientation.

—Motion Instruction Unit (Motion Calculation Unit)—

In the following, the function of the motion instruction unit 27 will be described.

The person 4A selects, through the use of the data input IF 26, a task desired to be executed by the robot arm 5 out of the tasks relating to the "task IDs" in the tasks in the control rule database 16 via the database input/output unit 28, and the motion instruction unit 27 instructs the control parameter managing unit 21 to execute the motion relating to the selected "task ID".

When the motion instruction unit 27 refers to the control rule database 16 via the database input/output unit 28, in a case where the task of one "task ID" is selected, and where the motion instruction unit 27 determines that a plurality of "motion IDs" are stored in the task of one "task ID", the motion calculation unit 2 calculates motion information, and sets a control mode in accordance with the flags of the calculated motion information (specifically, position, orientation, time, force), and instructs, via the database input/output unit 28, the control parameter managing unit 21 to operate accordingly.

Figure 24A:
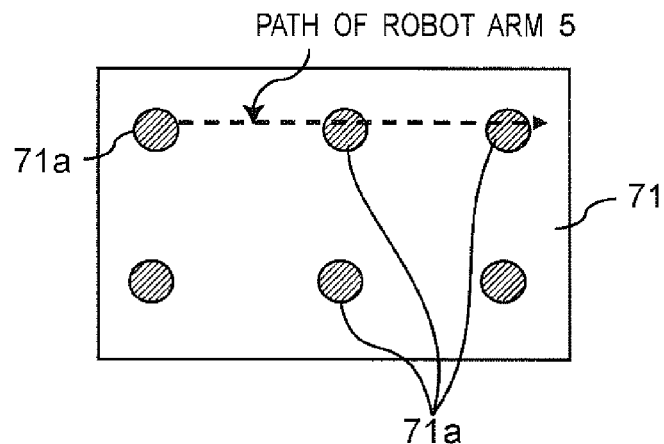
FIG. 24A is a view showing a motion state of the control apparatus for the robot arm according to the third embodiment of the present invention.

Specifically, the task having "task ID" "3" in FIG. 10A indicates, as shown in FIG. 24A (which corresponds to FIG. 21 as viewed from above), the task according to such a control rule that, when the robot 1 detects a screw hole 71a while the hand 30 at the hand position of the robot arm 5 shifts among the screw holes 71a, a motion of tightening the screw 73 held by the electric screwdriver tool 72 of the hand 30 at the hand position of the robot arm 5 to the screw hole 71a is performed. A plurality of "motion IDs" ("11" and "12") are stored for the task having "task ID" "3".

Figure 25:
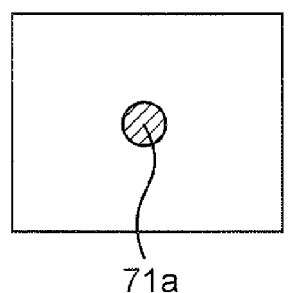
FIG. 25 is a view showing an exemplary image of environment information according to the third embodiment of the present invention.

The motion calculation unit 2 calculates one motion information piece based on a plurality of motions. Specifically, the motion calculation unit 2 calculates one motion information piece based on the motion having "motion ID" "11" and the motion having "motion ID" "12". The motion having "motion ID" "11" indicates the motion in which the hand 30 at the hand position of the robot arm 5 (to be exact, the electric screwdriver tool 72 gripped by the hand 30) shifts among the screw holes 71a as shown in FIG. 24A. Because the "environment ID" of the motion having "motion ID" "11" assumes a value of "−1", the robot arm 5 operates irrespective of the ambient environment of the robot arm 5. Accordingly, the motion instruction unit 27 selects it as the motion to be executed. The motion having "motion ID" "12" indicates a motion, as will be described below, of tightening the screw 73 when the motion instruction unit 27 determines that any object is the screw hole 71a. Because the "environment ID" of the motion having "motion ID" "12" is associated with the environment information "20", which does not assume the value of "−1", the motion instruction unit 27 refers to the environment information database 18 for the environment information having "environment ID" "20", via the database input/output unit 28. In FIG. 9A, the flags of the environment information having "environment ID" "20" shows "1" only for the 6th bit, and show "0" for the others, whereby the motion instruction unit 27 can determine that the image is valid. Accordingly, based on the image ID, the motion instruction unit 27 acquires image information stored in the environment information database 18. This image represents the image information of the screw hole 71a shown in FIG. 25. Next, the motion instruction unit 27 acquires image information at present from the environment information acquiring unit 19, and the motion instruction unit 27 compares the two images against each other based on image matching, to determine whether it is the screw hole 71a. When the motion instruction unit 27 determines that the two images agree with each other, the motion instruction unit 27 determines that it is the screw hole 71a, and the motion instruction unit 27 selects the motion stored by the motion "motion ID" "12" as the motion to be executed. When the motion instruction unit 27 determines that they do not agree with each other, the motion instruction unit 27 does not select the motion having "motion ID" "12", and the motion instruction unit 27 selects the motion "11" solely.

When the "motion ID" selected by the motion instruction unit 27 is only one, similarly to the first embodiment, the motion instruction unit 27 refers to the motion information database 17 via the database input/output unit 28 for a motion bearing the same "motion ID" as that "motion ID". As to the motion information bearing the same ID as the "motion ID", the motion instruction unit 27 sets the control modes in accordance with the flags of the motion information pieces managed by a plurality of "key motion IDs" (specifically, the positional information, the orientation information, the information as to time, and the information as to force), respectively, and instructs the control parameter managing unit 21 to operate accordingly. Then, the motion instruction unit 27 outputs the motion information pieces to the control parameter managing unit 21, such that the key motions are executed in order. In this example, when the motion instruction unit 27 determines that the ambient environment of the robot arm 5 does not agree with the environment information having "environment ID" "20" of the motion having "motion ID" "12", the motion instruction unit 27 determines that the screw hole 71a failed to be detected, and the motion instruction unit 27 instructs the control parameter managing unit 21 to execute the motion indicated by "motion ID" "11".

That is, with reference to the motion information database 17 shown in FIG. 22A, the "flags" show "1" for the 0th to 5th bits. Therefore, it is indicated that the x, y, z, ϕ, θ, ψ of the hand of the robot arm 5 are valid, and hence the motion is performed placing the x, y, z, ϕ, θ, ψ in the position control mode.

According to the foregoing, as shown in FIG. 24A (which corresponds to FIG. 21 as viewed from above), the robot arm 5 starts the motion of shifting among the screw holes 71a.

When the motion instruction unit 27 determines that the robot arm 5 has reached an upper portion of the screw hole 71a while the robot arm 5 is shifting among the screw holes 71a in the motion having "motion ID" "11", the motion instruction unit 27 determines that the image being the environment information having "environment ID" "20" of the motion having "motion ID" "12" and the image being the image information at present acquired by the environment information acquiring unit 19 agree with each other. Therefore, the motion instruction unit 27 selects the two motions, namely, the motion having "motion ID" "11" and the motion having "motion ID" "12". The motion calculation unit 2 of the motion instruction unit 27 calculates the eventual to-be-executed motion information, based on flags of respective "motion IDs" (i.e., which are the flags found as being stored when the motion instruction unit 27 refers to the motion information database 17 for the "motion ID", via the database input/output unit 28).

In this example, the motion having "motion ID" "11" and the motion having "motion ID" "12" are selected by the motion instruction unit 27, and under the "motion ID" in the control rule database 16 in FIG. 10A, they are stored in order of the motion "11", and then the motion "12". Accordingly, with reference to FIG. 22A, because the flags of the motion information of the motion having "motion ID" "11" show "1" for the 0th to 5th bits, the motion instruction unit 27 acquires motion information of the position orientation information (x, y, z, ϕ, θ, ψ) from the motion information of the motion having "motion ID" "11".

Next, the flags of the motion having "motion ID" "12" show "1" for the 0th, 1st, 3rd to 5th, 8th, 12th, 13th, and 15th to 17th, and show "0" for the others. Among those flags, because "1" is shown for the 12th, 13th, 15th to 17th bits, and here, because the key motion flags of the motion having "motion ID" "12" show "1" for the 12th, 13th, and 15th to 17th bits, the motion instruction unit 27 copies the hand positional information of the robot arm 5 presently executing the motion information of the motion having "motion ID" "11" for replacement. In this example, because the robot arm 5 is disposed above the screw hole 71a, the motion instruction unit 27 copies from the motion having "motion ID" "11" to the position and orientation information thereof. The motion instruction unit 27 performs the replacement as to the position of the other key motions also.

Next, the motion instruction unit 27 replaces the motion information of the motions having "motion ID" "12" with the values of (x, y, ϕ, θ, ψ) and force z-component of the motion information of the motion having "motion ID" "11", and the motion calculation unit 2 performs calculation.

Subsequently, until the end of "key motion ID" is reached, calculation is performed by the motion calculation unit 2 in order.

As to the flags of the motion information calculated by the motion calculation unit 2 and the motion information flag, the motion calculation unit 2 allots "1" to respective bits of the motion having "motion ID" "11" and "motion ID" "12" after calculation, in a case where the bits of either one of the motions "motion ID" "11" and "motion ID" "12" assume "1"; and allots "0" in a case where both the bits assume "0". However, only one of the components of the position and those of the force may assume "1" (because actuation can occur exclusively in the position control mode or in the force control mode). Therefore, when both the components of the position and those of the force assume "1", the force is prioritized.

Because the flags of the motions having "motion ID" "11" show "1" for the 0th and 5th bits, and the flags of the motions having "motion ID" "12" show "1" for the 0th, 1st, 3rd to 5th, 8th, 12th, 13th, 15th to 17th bits, the 0th to 5th, 8th, 12th, 13th, 15th to 17th bits assume "1". Here, both the position z-component and the force z-component both assume "1". Because force is prioritized, eventually, the 0th, 1st, 3rd to 5th, 8th, 12th, 13th, 15th to 17th bits assume "1".

The motion parameter flags of the motion having "motion ID" "11" show "1" for the 1st, 2nd, and 3rd bits, and the motion parameter flags of the motion having "motion ID" "12" show "1" for the 8th bit. Accordingly, the motion parameter flags of the motions calculated by the motion calculation unit 2 show "1" for the 1st, 2nd, 3rd, and 8th bits.

The "flags" of the motions calculated by the motion calculation unit 2 show "1" for the 0th, 1st, 3rd to 5th bits. Therefore, it is indicated that the x, y, ϕ, θ, ψ of the hand of the robot arm 5 are valid, and hence the motion is performed placing the x, y, ϕ, θ, ψ in the position control mode. Further, because the 8th bit assumes "1", the motion instruction unit 27 instructs the control parameter managing unit 21 such that the z-axis is placed in the force control mode to be operated.

Figure 24B:
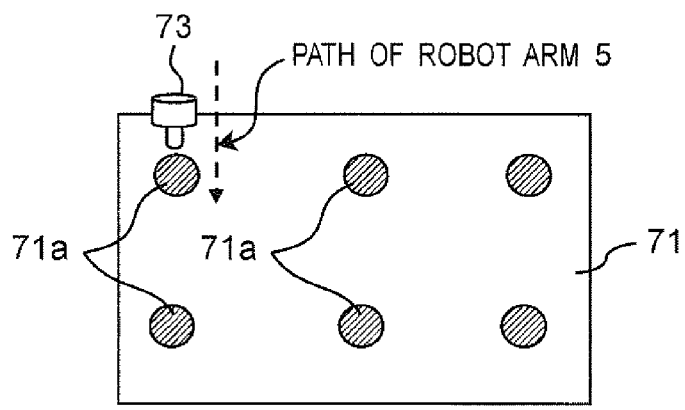
FIG. 24B is a view showing a motion state of the control apparatus for the robot arm according to the third embodiment of the present invention.

From the foregoing, as shown in FIG. 24B (which corresponds to FIG. 21 as viewed from above), the robot arm 5 starts a motion of tightening the screw 73 into the screw hole 71a.

—Motion Correction Unit—

In the following, a description will be given of the function of the motion correction unit 20.

Figure 26A:
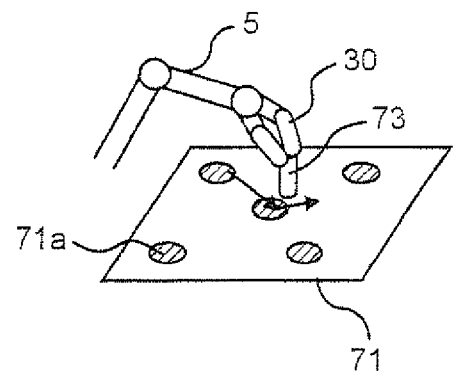
FIG. 26A is a view showing a motion state of the control apparatus for the robot arm according to the third embodiment of the present invention (note that, for the sake of simplicity of the figure, an electric screwdriver tool is not shown, and the hand appears as being directly gripping a screw)

When the person 4A specifies a task having "task ID" "3" via the data input IF 26 to instruct the motion instruction unit 27 to start the task, as shown in FIG. 26A, the robot arm 5 starts a task of removing the screw 73 from the screw hole 71a.

Figure 26B:
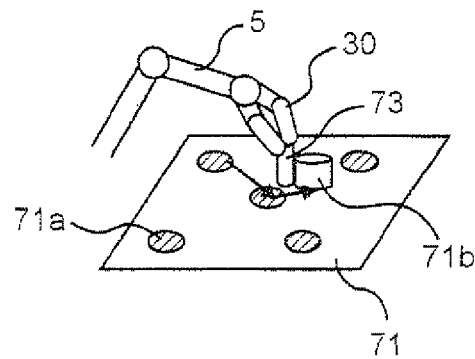
FIG. 26B is a view showing a motion state of the control apparatus for the robot arm according to the third embodiment of the present invention (note that, for the sake of simplicity of the figure, an electric screwdriver tool is not shown, and the hand appears as being directly gripping a screw)

Next, in accordance with a specification change of the device 71 such as a TV set or a DVD recorder, as shown in FIG. 26B, a device is installed, whose specification has been changed to include an added projecting member (e.g., a newly attached component, a screw or the like) 71b which is vertically disposed at a specification change portion. Because the previously generated task having "task ID" "3" is generated prior to the specification change of the projecting member 71b, if the robot arm 5 is operated as it is, the robot arm 5 will bump the projecting member 71b, and its motion will stop.

Figure 26C:
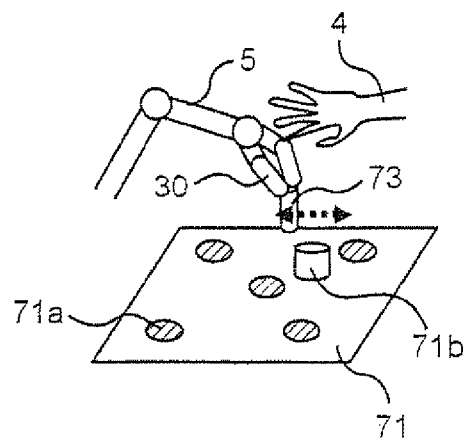
FIG. 26C is a view showing a motion of the control apparatus for the robot arm and a manipulation state of a person according to the third embodiment of the present invention (note that, for the sake of simplicity of the figure, an electric screwdriver tool is not shown, and the hand appears as being directly gripping a screw)

Accordingly, the person 4A inputs, via the data input IF 26, an environmental change reporting manipulation start instruction as shown in FIG. 26C, to the motion instruction unit 27. Upon receipt of the environmental change reporting manipulation instruction from the data input IF 26 via the motion instruction unit 27, the motion correction unit 20 sets the control mode in accordance with the flags in the motion information database 17, and instructs the control parameter managing unit 21 to operate accordingly.

Specifically, as shown in FIG. 26B, at a portion where the robot arm 5 bumped the projecting member 71b where the specification change took place, no screw hole 71a exists. Therefore, the motion correction unit 20 determines that this does not agree with the environment information having "environment ID" "20" of the motion having "motion ID" "12", and hence the motion is performed solely with the motion having "motion ID" "11". When the motion correction unit 20 refers to the motion information database 18 via the database input/output unit 28 for the motions having "motion ID" "11" which are being performed, it can be seen that, in FIG. 22A, the flags of each of the "key motion IDs" show "1" for the 0th to 5th bits, and "0" for the others. Accordingly, the motion correction unit 20 can recognize that, for the motions of the robot arm 5, the x-, y-, z-, ϕ-, θ-, and ψ-axes in relation to the position orientation are valid. Accordingly, the motion correction unit 20 instructs the control parameter managing unit 21 such that motions be performed as being switched from the position control mode to the impedance control mode (i.e., the mode for allowing the robot arm 5 to shift toward the direction in which a force of the person 4A is detected) for the x-, y-, ϕ-, θ-, and ψ-axes, such that the x-, y-, z-, ϕ-, θ-, and ψ-axes can be corrected by a force applied by the person 4A.

Next, as shown in FIG. 26C, in order to report about the projecting member 71b at the specification change portion on the device 71, an upper portion of the projecting member 71b of the specification change portion is shifted along the x-y plane in parallel to 71. In order for the motion correction unit 20 to acquire the motion of the person 4A causing the shift by applying a force by the environmental change reporting manipulation, the motion correction unit 20 acquires the hand position and force of the robot arm 5 from the control parameter managing unit 21, and the motion correction unit 20 outputs the acquired hand position and force to the control rule generating unit 23, the description of which will be given later.

Next, upon receipt of the motion correcting manipulation start instruction from the data input IF 26 via the motion instruction unit 27, the motion correction unit 20 sets the control mode in accordance with the correction parameter flags in the motion information database 17 and instructs the control parameter managing unit 21 to operate accordingly. Specifically, when the motion correction unit 20 refers to the motion information database 18 in FIG. 10A for the motion having "motion ID" "11" in motion for the task having "task ID" "3", with reference to FIG. 22A, the correction parameter flags of respective "key motion IDs" show "1" only for the 0th to 2nd bits, and "0" for the others. Accordingly, the motion correction unit 20 can recognize that, for the position orientation of the motion of the robot arm 5, the x-, y-, and z-axis components only are correctable. The motion correction unit 20 instructs the control parameter managing unit 21 such that motions be performed as being switched from the position control mode to the hybrid impedance control mode (i.e., the mode for allowing the robot arm 5, while being shifting in the position control mode, to shift toward the direction in which a force of the person 4A is detected in the impedance control) for the x-, y-, and z-axes.

Figure 26D:
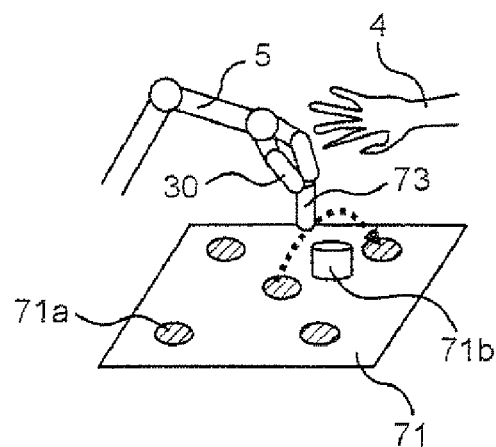
FIG. 26D is a view showing a motion of the control apparatus for the robot arm and a manipulation state of a person according to the third embodiment of the present invention (note that, for the sake of simplicity of the figure, an electric screwdriver tool is not shown, and the hand appears as being directly gripping a screw)

Next, as shown in FIG. 26D, when the person 4A directly grips the robot arm 5 to apply a force so as to reach a level high enough to avoid bumping the projecting member 71b of the specification change portion, in the hybrid impedance control mode, it becomes possible to, while the robot arm 5 is shifted in the position control mode, detect the force of the person 4A and to shift the robot arm 5 toward the direction in which the force has been applied as to the x-, y-, and z-axis directions in the impedance control mode. In order to acquire the motion of the person 4A applying the force to shift, the motion correction unit 20 acquires the hand position and time of the robot arm 5 from the control parameter managing unit 21, and outputs the acquired hand position and time to the control rule generating unit 23, the description of which will be given later. It is to be noted that, the information as to time is the relative time in which the time point at which the person 4A selects a task and issues a start instruction is regarded as 0.

—Control Rule Generating Unit—

Similarly to the first embodiment, while the robot arm 5 is in motion in one of the impedance control mode, the position control mode, the force control mode, and the control mode being the combination of the foregoing modes set for each direction, the description of which will be given later, the control rule generating unit 23 receives, from the data input IF 26 via the motion instruction unit 27, an environmental change reporting manipulation and a motion correction start instruction, by the information as to position, orientation, force, and time in the motion information database 17 referred to by the motion IDs in the control rule database 16. The control rule generating unit 23 functions to generate a control rule based on the motion information corrected by the motion correction unit 20 and the environment information acquired by the environment information acquiring unit 19, and to store the generated control rule in the control rule database 16.

In the following, the functions of the control rule generating unit 23 will be described.

As shown in FIG. 26B, the portion of the specification change portion which bumped the projecting member 71b has no screw hole 71a. Accordingly, it does not agree with the environment information having "environment ID" "20" of the motion having "motion ID" "12", and hence only the motion having "motion ID" "11" is being operated.

To the control rule generating unit 23, from the data input IF 26 via the motion instruction unit 27, for a task ID which is in motion, in response to an environmental change reporting manipulation start instruction, the motion correction unit 20 inputs a hand position of the robot arm 5 and time which is generated based on an environmental change reporting manipulation from the person 4A. Additionally, the environment information acquiring unit 19 inputs environment information to the control rule generating unit 23 from the timing of start of the environmental change reporting manipulation. Further, the control rule generating unit 23 refers to the motion information database 18 for an "motion ID" which is in motion at the start of the environmental change reporting manipulation, and the control rule generating unit 23 acquires, based on the information as to flags of the "key motion ID" of that "motion ID", the information as to the present control mode of the robot arm 5. Specifically, referring to the motion information database 18 for the key motions respectively having "key motion IDs" "41" to "48" for the motion having "motion ID" "11" in FIG. 10A, which is in motion for the task having "task ID" "3", the flags of respective "key motion IDs" show "1" only for the 0th to 5th bits in FIG. 22A, and show "0" for the others. Therefore, the control rule generating unit 23 can recognize that, for the motion of the robot arm 5, data is valid for the x-, y-, z-, φ-, θ-, and ψ-axes only. Accordingly, in order for the x-, y-, z-, φ-, θ-, and ψ-axes to be corrected by a force applied by the person 4A, the impedance control mode is set thereto.

Figure 27:
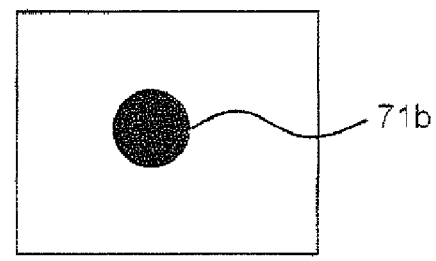
FIG. 27 is a view showing an exemplary image of the environment information of the control apparatus for the robot arm according to the third embodiment of the present invention.

Based on the control mode of the shifting direction of the robot arm 5 at the time of the environmental change reporting manipulation in relation to the presently performed motion and the detecting unit selection rule database 29, the control rule generating unit 23 selects an environment information type for generating a control rule out of a plurality of environment information pieces. Specifically, at the timing of start of the environmental change reporting manipulation of the task having "task ID" "3" in FIG. 10A, as shown in FIG. 26C, the environmental change reporting manipulation is performed as to the x- and y-axis directions. Because the correction is made having the x- and y-axes placed in the impedance control mode, with reference to FIG. 11A, the environment information type ID is "1", and with reference to FIG. 11B, "image" is selected by the control rule generating unit 23. Further, because the environmental change reporting manipulation is performed for the x- and y-axis directions in FIG. 26C, the control rule generating unit 23 selects the image by the image pickup apparatus 15a which is capable of capturing an image of the x-y plane. Specifically, as shown in FIG. 27, it is the image capturing the projecting member 71b of the specification change portion downward from above. The control rule generating unit 23 stores the selected image in the environment information database 18 via the database input/output unit 28. In this example, as represented by the environment information having "environment ID" "21" in FIG. 9A, the control rule generating unit 23 allots "21" as the new "environment ID", and the control rule generating unit 23 stores, via the database input/output unit 28, the file name of the selected image in the "image ID" of the "environment ID" in the environment information database 18. Further, because the flag is only for the image, the control rule generating unit 23 stores "1" for the 6th bit, and "0" for the other bits in the environment information database 18 via the database input/output unit 28.

Next, upon receipt of the motion correcting manipulation start instruction, the motion information corrected by the motion correction unit 20 is stored in the motion information database 17 via the database input/output unit 28.

Specifically, the motion correction unit 20 newly allots "motion ID" in the motion information database 17 in FIG. 22B (in this example, "13"), and further, the motion correction unit 20 allots "60" to "67" as "key motion IDs", and stores, via the database input/output unit 28, the motion information pieces corrected by the motion correction unit 20 by their respective "key motion IDs" in the motion information database 17. As to time, the motion correction unit 20 inputs the relative time in which the time point at which the person 4A selects a task and issues a start instruction is regarded as 0. Therefore, the motion correction unit 20 stores the value obtained by subtracting the time of the very first key motion (in this example, "60") from the time of each of all the motions in the motion information database 17 via the database input/output unit 28. As to flags, among the components of the motion information for which the flags before correction show "1", the motion correction unit 20 compares the position orientation and the force values of the key motion of the "motion ID" before correction against those after correction, for each component. Then, the motion correction unit 20 allows only those components having a resultant difference being equal to or more than a certain threshold value to have the flags showing "1" in FIG. 6; and "0" for the components being less than a threshold value.

Specifically, the flags of the motion having "motion ID" before correction "11" show "1" for the 0th to 5th bits, and show "0" for the others. Therefore, the motion correction unit 20 performs a comparison as to the position orientation components only, between the position orientation and the force values of the motion before correction and those of the motion after correction. The key motion having "key motion ID" "41" and the key motion having "key motion ID" "60" share the same $\phi$, $\theta$, $\psi$, and have differences as to x-, y-, and z-coordinates, which are (0.2, 0.2, 0.4), respectively, among their position orientation components (x, y, z, $\phi$, $\theta$, $\psi$). Provided that the threshold value of the difference is 0.1, the x-, y-, and z-components only are each equal to or more than the threshold value. Accordingly, the motion correction unit 20 sets the flags to show "1" for the 0th, 1st, and 2nd bits, and "0" for the others.

As to the correction parameter flags, the motion correction unit 20 stores the values of each motion before correction (in this example, "41" to "48") in the motion information database 17 via the database input/output unit 28.

Next, the control rule generating unit 23 generates a new control rule and stores in the control rule database 19, based on the acquired environment information and the motion corrected by the motion correcting manipulation of the motion correction unit 20.

Specifically, because a motion is corrected while the task having "task ID" "3" in the control rule database 16 is in motion, the control rule generating unit 23 adds one row to the task having "task ID" "3" as shown in FIG. 10B, and adds the motion having "motion ID" "13" which is newly added by the motion correction.

Next, the environment ID of the environment information selected by the control rule generating unit 23 is stored in the control rule database 16 via the database input/output unit 28 (in this example, the environment ID "21").

As has been described in the foregoing, the person 4A performing the environmental change reporting manipulation and the motion correcting manipulation to cause the control rule generating unit 23 to generate a new control rule eliminates the necessity of previously preparing a motion taken into consideration of any specification change of the device 71. Instead, the person 4A simply performing manipulation on site to report the environment and to correct the motion allows the robot arm 5 to autonomously operate when the similar environment is varied next time, based on the information in the control rule database 16 (in other words, based on the control rule generated by the control rule generating unit 23, while referring to the environment information acquired by the environment information acquiring unit 19).

—Motion Instruction Unit (Motion Calculation Unit)—

In this example, as shown in FIG. 10B, for the task having "task ID" "3", a plurality of "motion IDs" ("11", "12", and "13") are stored. Accordingly, the function of the motion instruction unit 27 in such a case will be described.

Figure 28A:
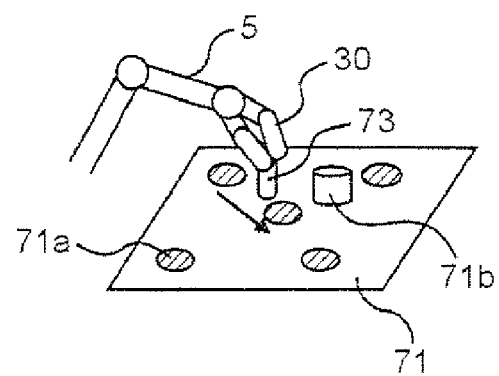
FIG. 28A is a view showing a motion state of the control apparatus for the robot arm according to the third embodiment of the present invention (note that, for the sake of simplicity of the figure, an electric screwdriver tool is not shown, and the hand appears as being directly gripping a screw)
Figure 28B:
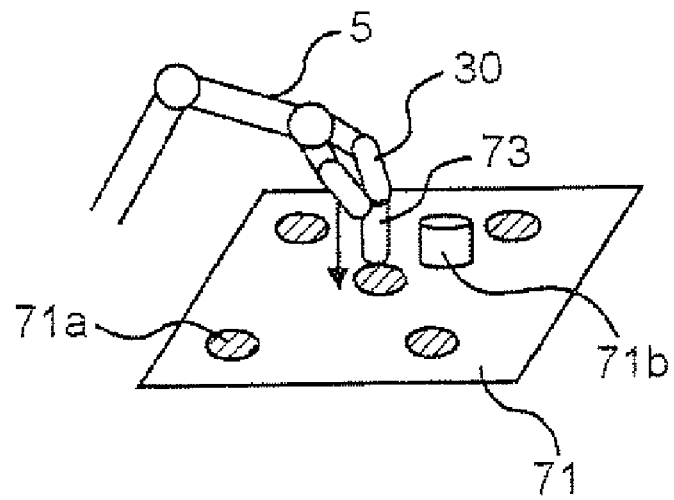
FIG. 28B is a view showing a motion state of the control apparatus for the robot arm according to the third embodiment of the present invention (note that, for the sake of simplicity of the figure, an electric screwdriver tool is not shown, and the hand appears as being directly gripping a screw)
Figure 28C:
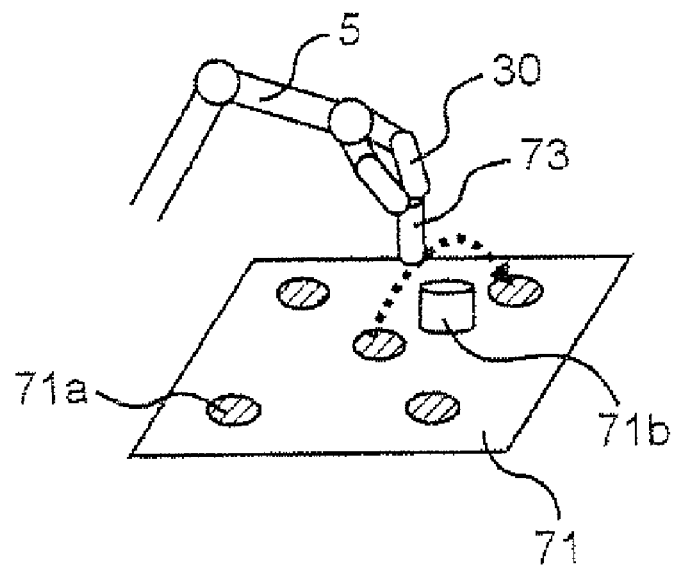
FIG. 28C is a view showing a motion state of the control apparatus for the robot arm according to the third embodiment of the present invention (note that, for the sake of simplicity of the figure, an electric screwdriver tool is not shown, and the hand appears as being directly gripping a screw)

Of the task having "task ID" "3" in FIG. 10B: the motion having "motion ID" "11" represents motion information for executing the motion shown in FIG. 28A (a motion of shifting among the screw holes 71a); the motion having "motion ID" "12" represents motion information for executing the motion shown in FIG. 28B (a motion of tightening the screw 73); and the motion having "motion ID" "13" represents motion information for executing the motion shown in FIG. 28C (a motion of avoiding the projecting member 71b of the specification change portion).

The motion calculation unit 2 calculates one motion information piece based on a plurality of motions. Specifically, because the "environment ID" of the motion having "motion ID" "11" assumes a value of "−1", the robot arm 5 operates irrespective of the ambient environment of the robot arm 5. Accordingly, the motion instruction unit 27 selects it as the motion to be executed. The motion having "motion ID" "12" represents a motion of tightening the screw 73 into the screw hole 71a when the motion instruction unit 27 determines that any object is the screw hole 71a. Because the "environment ID" of the motion having "motion ID" "12" is associated with the environment information "20", which does not assume the value of "−1", the motion instruction unit 27 refers to the environment information database 18 via the database input/output unit 28 for the environment information having "environment ID" "20". The motion instruction unit 27 acquires image information referred to by the motion instruction unit 27 for the environment information having "environment ID" "20" and the image information at present from the environment information acquiring unit 19, and the motion instruction unit 27 compares the two images against each other based on image matching. Thus, the motion instruction unit 27 examines if it is the screw hole 71a. When the motion instruction unit 27 determines that the two images agree with each other, the motion instruction unit 27 determines that it is the screw hole 71a. Then, the motion instruction unit 27 selects the motion stored by the motion having "motion ID" "12" as the motion to be executed.

Further, because the "environment ID" of the motion having "motion ID" "13" is associated with the environment information "21" which does not assume the value of "−1", the motion instruction unit 27 refers to the environment information database 18 via the database input/output unit 28 for the environment information having "environment ID" "21". The motion instruction unit 27 acquires the image information referred to by the motion instruction unit 27 for the environment information having "environment ID" "21" and the image information at present from the environment information acquiring unit 19, and the motion instruction unit 27 compares the two images based on image matching, to determine whether it is the projecting member 71b of the specification change portion. When the motion instruction unit 27 determines that the two images agree with each other, the motion instruction unit 27 determines that it is the projecting member 71b of the specification change portion. Then, the motion instruction unit 27 selects the motion stored by the motion having "motion ID" "13" as the motion to be executed.

When what is selected by the motion instruction unit 27 is solely the motion having "motion ID" "11", the motion instruction unit 27 outputs the motion information referred to for the motion having "motion ID" "11" to the control parameter managing unit 21, to execute the motion shown in FIG. 28A.

As shown in FIG. 28B, in a case where the hand 30 is operating in the upper vicinity portion of the screw hole 71a, the motion having "motion ID" "11" and the motion having "motion ID" "12" are selected by the motion instruction unit 27, and the motion having "motion ID" "13" is not selected by the motion instruction unit 27. Accordingly, as has been described above, the motion calculation unit 2 calculates one motion based on the motion "11" and the motion "12". The motion instruction unit 27 outputs the motion information calculated by the motion calculation unit 2 to the control parameter managing unit 21, whereby the motion shown in FIG. 28B is executed.

As shown in FIG. 28C, in a case where the hand 30 is operating in the upper vicinity portion of the projecting member 71b of the specification change portion, the motion having "motion ID" "11" and the motion having "motion ID" "13" are selected by the motion instruction unit 27, and the motion having "motion ID" "12" is not selected by the motion instruction unit 27. Accordingly, the motion calculation unit 2 calculates one motion based on the motion "11" and the motion "13". The motion instruction unit 27 outputs the motion information calculated by the motion calculation unit 2 to the control parameter managing unit 21, whereby the motion shown in FIG. 28C is executed.

It is to be noted that, while the detour motion of the projecting member 71b of the specification change portion is corrected in the third embodiment, this is similarly applicable to the extent of force in tightening a screw, for example.

Figure 37A:
FIG. 37A is a perspective view of a conventional screw.
Figure 37B:
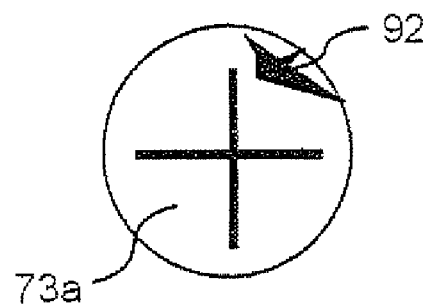
FIG. 37B is a plan view of a conventional screw head with a damaged portion.
Figure 37C:
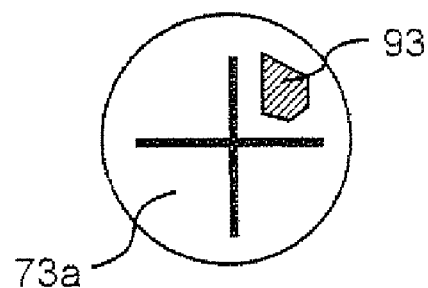
FIG. 37C is a plan view of a conventional screw head with a contaminated portion.
Figure 37D:
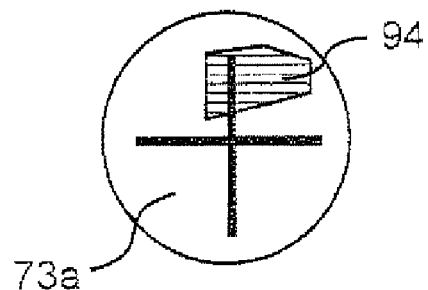
FIG. 37D is a plan view of a conventional screw head with a rusty portion.

Further, in a case where a screw 73 attached to a to-be-recycled object such as a television set or an air conditioner is to be removed in a recycling factory, the present invention is similarly applicable to a damaged portion of the screw 73 as being denoted by reference numeral 92 in FIG. 37B (which is a top view of a cross-recessed head 73a of the screw 73 shown in FIG. 37A); a contaminated portion as being denoted by reference numeral 93 in FIG. 37C (which is a top view of the cross-recessed head 73a of the screw 73 in FIG. 37A); or a rusty portion as being denoted by reference numeral 94 in FIG. 37D (which is a top view of the cross-recessed head 73a of the screw 73 in FIG. 37A). Still further, the present invention is also applicable to a case where a jig for removing any removable object not being limited to a screw (e.g., a component, a substrate, a caulking member and the like) which is to be removed from to-be-recycled objects is held by the hand 30.

FOURTH EMBODIMENT

The basic structure of a robot arm 5 and a control apparatus therefor according to a fourth embodiment is similar to that in the first embodiment. Therefore, the description as to the common constituents is not repeated herein, and the difference from the first embodiment solely will be detailed in the following.

Figure 31:
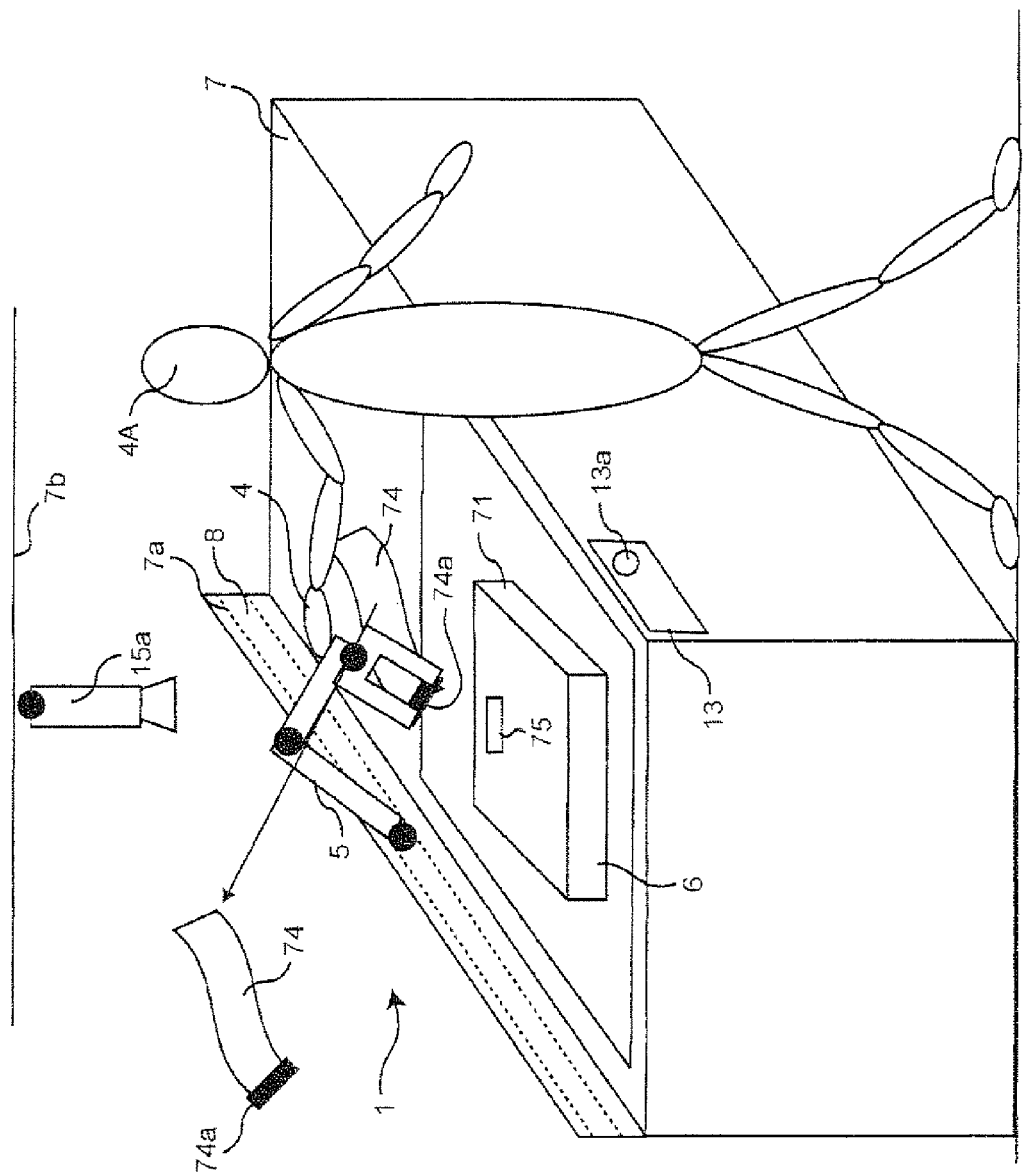
FIG. 31 is a view showing an overview of the structure of a control apparatus for a robot arm according to a fourth embodiment of the present invention.

In the fourth embodiment, a description will be given of an exemplary case where, as shown in FIG. 31, a flexible circuit board 74 being one example of a task-target object is attached to an insert slot 75 of a device 71 such as a television set or a DVD recorder in a factory employing cell manufacturing, using a robot 1 including the robot arm 5 and the control apparatus for the robot arm 5.

As shown in FIG. 31, the robot arm 5 of the robot 1 is installed on a wall surface 7a of a workbench 7 of a workbench table in a factory, for example. The base end of the robot arm 5 is shiftably supported by a rail 8 fixed to the wall surface 7a, such that the robot arm 5 can shift on the rail 8 in a lateral direction along the rail 8, e.g., in the horizontal direction, by a force of a person 4A. The reference numeral 15a denotes a first image pickup apparatus such as a camera, which is installed at a ceiling 7b, for example, so as to be capable of capturing an image of the workbench 7.

The robot 1 performs a task which is carried out in cooperation with the robot arm 5 and the person 4A, such as a task of attaching a flexible circuit board 74 of a television set or a DVD recorder in a factory, for example, through the robot arm 5.

Similarly to the first embodiment, first, the person 4A directly grips the robot arm 5 of the robot 1 with the hand 4 and applies a force to the robot arm 5. Then, the force applied by the person 4A to the robot arm 5 allows the robot arm 5 of the robot 1 to shift along the rail 8, whereby the robot arm 5 is guided to the vicinity of the tool 71 (in this example, a device such as a television set or a DVD recorder to which the flexible circuit board 74 is inserted).

Next, the person 4A uses a data input IF 26, for example by pressing a button 13a of a console 13 of the robot 1 as one example of the data input IF 26 disposed at a front side surface 7e of the workbench 7 for cell manufacturing or the like, whereby the robot arm 5 actuates, to start the previously selected task, that is, the task of inserting the flexible circuit board 74, whose connector portion 74a is held by the hand 30, into the insert slot 75 of the tool 71.

Next, in a case where the shape of the device 71 or the specification of the flexible circuit board 74 is changed due to any specification change of the device 71, when the robot arm 5 is performing the attaching task of the flexible circuit board 74, the person 4A checks the attaching state of the flexible circuit board 74, and the person 4A applies a force to the robot arm 5, to perform a motion correction as to the extent of force used for attaching, or a positional adjustment of the flexible circuit board 74, so as to correct the motion of the robot arm 5 of the robot 1.

The rail 8 is arranged on the wall surface 7a of the workbench 7. However, in a case where the workbench having no wall surface is used, it may be disposed at a place which is suitable for performing a task, such as a ceiling surface, a side surface of a top board 6a of the workbench or the like.

Further, though the console 13 is fixed to the side surface of the workbench 7, the console 13 may be replaced by a remote controller with which teleoperation can be performed.

—Motion Information Database—

Similarly to the third embodiment, a motion information database 17 stores therein information as to motions of the robot arm 5 (i.e., motion information) of the robot arm 5, such as the hand position and orientation of the robot arm 5 at a certain time. The database input/output unit 28 inputs and outputs the motion information to and from the motion information database 17 via the control rule generating unit 23.

FIGS. 32A and 32B each show the motion information database 17 according to the fourth embodiment. The motion information is the same as that in the first embodiment and, therefore, the description thereof will not be repeated.

—Motion Instruction Unit (Motion Calculation Unit)—

In the following, the function of the motion instruction unit 27 will be described.

The person 4A selects, through the use of the data input IF 26, a task desired to be executed by the robot arm 5 out of the tasks relating to the "task IDs" in the tasks in the control rule database 16 via the database input/output unit 28, and the motion instruction unit 27 instructs the control parameter managing unit 21 to execute the motion relating to the selected "task ID".

When the motion instruction unit 27 refers to the control rule database 16 via the database input/output unit 28, in a case where the task of one "task ID" is selected, and where the motion instruction unit 27 determines that a plurality of "motion IDs" are stored in the task of one "task ID", the motion calculation unit 2 calculates motion information, and sets a control mode in accordance with the flags of the calculated motion information (specifically, position, orientation, time, force), and instructs, via the database input/output unit 28, the control parameter managing unit 21 to operate accordingly.

Figure 33A:
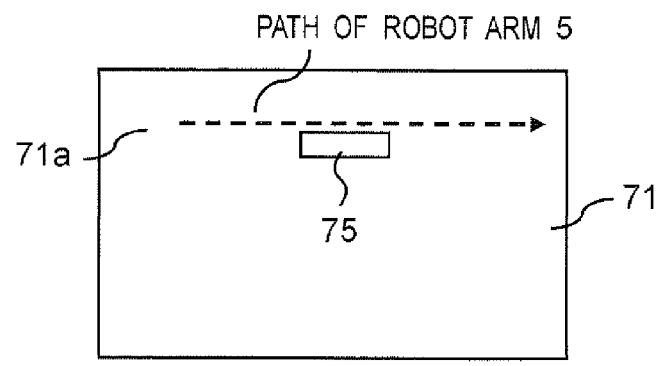
FIG. 33A is a view showing a motion state of the control apparatus for the robot arm according to the fourth embodiment of the present invention.

Specifically, the task having "task ID" "4" in FIG. 10A indicates, as shown in FIG. 33A (which corresponds to FIG. 31 as viewed from above), the task according to such a control rule that, when the robot 1 detects an insert slot 75 while the robot arm 5 is shifting, a motion of inserting into the insert slot 75 the connector portion 74a of the flexible circuit board 74 having its connector portion 74a gripped by the hand 30 at the hand position of the robot arm 5 is performed. A plurality of "motion IDs" (motions of "21", "22", and "23") are stored for the task having "task ID" "4".

Figure 34:
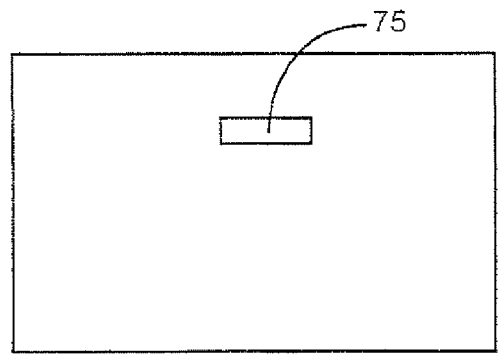
FIG. 34 is a view showing an exemplary image of environment information according to the fourth embodiment of the present invention.

The motion calculation unit 2 calculates one motion information piece based on a plurality of motions. Specifically, the motion calculation unit 2 calculates one motion information piece based on the motion having "motion ID" "21", the motion having "motion ID" "22", and the motion having "motion ID" "23". The motion having "motion ID" "21" indicates the motion in which the hand 30 at the hand position of the robot arm 5 (to be exact, the flexible circuit board 74 gripped by the hand 30) shifts in an upper portion in the vicinity of the insert slot 75 of the device 71, as shown in FIG. 33A. Because the "environment ID" of the motion having "motion ID" "21" assumes a value of "−1", the robot arm 5 operates irrespective of the ambient environment of the robot arm 5. Accordingly, the motion instruction unit 27 selects it as the motion to be executed. The motion having "motion ID" "22" indicates a motion, as will be described below, of shifting the flexible circuit board 74 until the connector portion 74a of the flexible circuit board 74 is brought into contact with the inlet of the insert slot 75, when the motion instruction unit 27 determines any portion to be the insert slot 75. Because the "environment ID" of the motion having "motion ID" "22" is associated with the environment information "30", which does not assume the value of "−1", the motion instruction unit 27 refers to the environment information database 18 for the environment information having "environment ID" "30", via the database input/output unit 28. In FIG. 9A, the flags of the environment information having "environment ID" "30" show "1" only for the 6th bit, and show "0" for the others, whereby the motion instruction unit 27 can determine that the image is valid. Accordingly, based on the image ID, the motion instruction unit 27 acquires image information stored in the environment information database 18. This image represents the image information of the insert slot 75 shown in FIG. 34. Next, the motion instruction unit 27 acquires image information at present from the environment information acquiring unit 19, and the motion instruction unit 27 compares the two images against each other based on image matching, to determine whether it is the insert slot 75. When the motion instruction unit 27 determines that the two images agree with each other, the motion instruction unit 27 determines that it is the insert slot, and the motion instruction unit 27 selects the motion stored by "motion ID" "22" as the motion to be executed. When the motion instruction unit 27 determines that they do not agree with each other, the motion instruction unit 27 does not select the motion having "motion ID" "22", and the motion instruction unit 27 selects the motion "21" solely.

The motion having "motion ID" "23" indicates a motion of shifting the flexible circuit board 74, in order to insert the connector portion 74a of the flexible circuit board 74 into the insert slot 75. Because the "environment ID" of the motion having "motion ID" "23" is associated with the environment information "31", which does not assume a value of "−1", the motion instruction unit 27 refers to the environment information database 18 for the environment information having "environment ID" "31", via the database input/output unit 28. In FIG. 9A, the flags of the environment information having "environment ID" "31" show "1" only for the 0th to 5th bits, and show "0" for the others, whereby the motion instruction unit 27 can determine that the force is valid. The motion instruction unit 27 acquires the value of the force detecting unit at present from the environment information acquiring unit 19, and the motion instruction unit 27 compares the acquired force and the force stored in the environment information database 18 against each other. When the motion instruction unit 27 determines that the two forces agree with each other, the motion instruction unit 27 determines that the force applied to the flexible circuit board 74 from the insert slot 75 agrees with the force stored in the environment information database 18, and the motion instruction unit 27 selects the motion stored by the motion "motion ID" "23" as the motion to be executed. When the motion instruction unit 27 determines that they do not agree with each other, the motion instruction unit 27 does not select the motion having "motion ID" "23", and the motion instruction unit 27 selects one of the motion "21" and the motion "22".

In a case where a single "motion ID" is selected, similarly to the first embodiment, the motion instruction unit 27 refers to the motion information database 17 via the database input/output unit 28 for a motion bearing the same "motion ID" as that "motion ID". As to the motion information bearing the same ID as the "motion ID", the motion instruction unit 27 sets the control modes in accordance with the flags of the motion information pieces managed by a plurality of "key motion IDs" (specifically, the positional information, the orientation information, the information as to time, and the information as to force), respectively, and instructs the control parameter managing unit 21 to operate accordingly. Then, the motion instruction unit 27 outputs the motion information pieces to the control parameter managing unit 21, such that the key motions are executed in order. In this example, when the motion instruction unit 27 determines that the ambient environment of the robot arm 5 does not agree with the environment information having "environment ID" "30" of the motion having "motion ID" "22", the motion instruction unit 27 determines that the insert slot 75 failed to be detected, and the motion instruction unit 27 instructs the control parameter managing unit 21 to execute the motion indicated by motion having "motion ID" "21".

That is, with reference to the motion information database 17 shown in FIG. 32A, the "flags" show "1" for the 0th to 5th bits. Therefore, it is indicated that the x, y, z, φ, θ, ψ of the hand of the robot arm 5 are valid, and hence the motion is performed placing the x, y, z, φ, θ, ψ in the position control mode.

According to the foregoing, as shown in FIG. 33A (which corresponds to FIG. 31 as viewed from above), the robot arm 5 starts the motion of shifting over the device 71.

When the motion instruction unit 27 determines that the robot arm 5 has reached an upper portion of the insert slot 75 while the robot arm 5 is shifting over the device 71 in the motion having "motion ID" "21", the motion instruction unit 27 determines that the image being the environment information having "environment ID" "30" of the motion having "motion ID" "22" and the image being the image information at present acquired by the environment information acquiring unit 19 agree with each other. Therefore, the motion instruction unit 27 selects the two motions, namely, the motion having "motion ID" "21" and the motion having "motion ID" "22". The motion calculation unit 2 of the motion instruction unit 27 calculates the eventual to-be-executed motion information, based on flags of respective "motion IDs" (i.e., which are the flags found as being stored when the motion instruction unit 27 refers to the motion information database 17 for the "motion ID", via the database input/output unit 28).

In this example, the motion having "motion ID" "21" and the motion having "22" are selected by the motion instruction unit 27, and under the "motion ID" in the control rule database 16 in FIG. 10A, they are stored in order of the motion "21" and the motion "22". Accordingly, with reference to FIG. 32A, because the flags of the motion information of the motion having "motion ID" "21" show "1" for the 0th to 5th bits, the motion information of position orientation information (x, y, z, $\phi$, $\theta$, $\psi$) from the motion information of the motion having "motion ID" "21" is acquired.

Next, the flags of the motion having "motion ID" "22" show "1" for the 0th, 1st, 3rd to 5th, 8th, 12th, 13th, and 15th to 17th, and show "0" for the others. Among those flags, because "1" is shown for the 12th, 13th, 15th to 17th bits, and here, because the key motion flags of the motion having "motion ID" "22" show "1" for the 12th, 13th, and 15th to 17th bits, the motion instruction unit 27 copies the hand positional information of the robot arm 5 presently executing the motion information of the motion having "motion ID" "21" for replacement. In this example, because the robot arm 5 is disposed above the insert slot 75, the motion instruction unit 27 copies from the motion having "motion ID" "21" to the position and orientation information thereof. The motion instruction unit 27 performs the replacement as to the position of the other key motions also.

Next, the motion instruction unit 27 replaces the motion information of the motion having "motion ID" "22" with the values of (x, y, $\phi$, $\theta$, $\psi$) of the motion information of the motion having "motion ID" "21", and the motion calculation unit 2 performs calculation.

Subsequently, until the end of "key motion ID" is reached, calculation is performed by the motion calculation unit 2 in order.

As to the flags of the motion information calculated by the motion calculation unit 2 and the motion information flag, the motion calculation unit 2 allots "1" to respective bits of the motion having "motion ID" "21" and "motion ID" "22" after calculation, in a case where the bits of either one of the motions "motion ID" "21" and "motion ID" "22" assume "1"; and allots "0" in a case where both the bits assume "0". However, only one of the components of the position and those of the force may assume "1" (because actuation can occur exclusively in the position control mode or in the force control mode). Therefore, when both the components of the position and those of the force assume "1", the force is prioritized.

Because the flags of the motions having "motion ID" "21" show "1" for the 0th and 5th bits, and the flags of the motions having "motion ID" "22" show "1" for the 0th, 1st, 3rd to 5th, 8th, 12th, 13th, 15th to 17th bits, the 0th to 5th, 8th, 12th, 13th, 15th to 17th bits assume "1". Here, both the position z-component and the force z-component both assume "1". Because force is prioritized, eventually, the 0th, 1st, 3rd to 5th, 8th, 12th, 13th, 15th to 17th bits assume "1".

The motion parameter flags of the motion having "motion ID" "21" show "1" for the 1st, 2nd, and 3rd bits, and the motion parameter flags of the motion having "motion ID" "22" show "1" for the 8th bit. Accordingly, the motion parameter flags of the motions calculated by the motion calculation unit 2 show "1" for the 1st, 2nd, 3rd, and 8th bits.

The "flags" of the motions calculated by the motion calculation unit 2 show "1" for the 0th, 1st, 3rd to 5th bits.

Therefore, it is indicated that the x, y, $\phi$, $\theta$, $\psi$ of the hand of the robot arm 5 are valid, and hence the motion is performed placing the x, y, $\phi$, $\theta$, $\psi$ in the position control mode. Further, because the 8th bit assumes "1", the motion instruction unit 27 instructs the control parameter managing unit 21 such that the z-axis is placed in the force control mode to be operated.

Figure 33B:
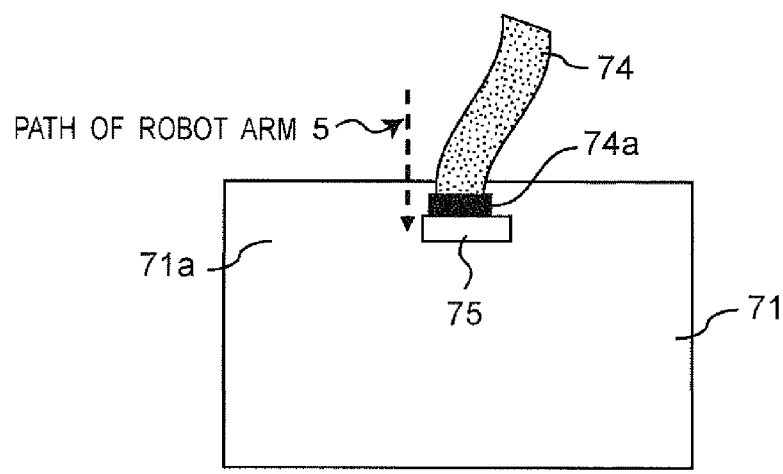
FIG. 33B is a view showing a motion state of the control apparatus for the robot arm according to the fourth embodiment of the present invention.
Figure 33C:
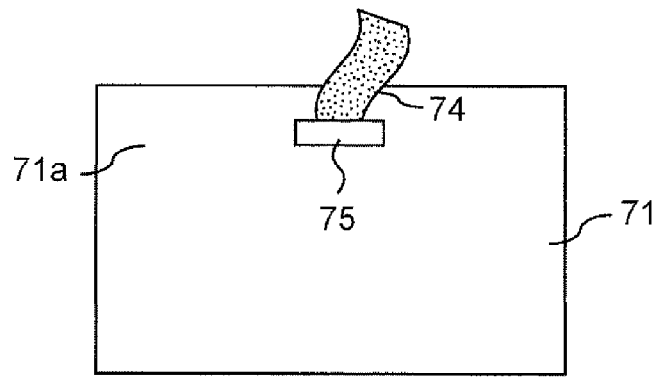
FIG. 33C is a view showing a motion state of the control apparatus for the robot arm according to the fourth embodiment of the present invention.

From the foregoing, as shown in FIG. 33B, the robot arm 5 starts a motion of shifting until the connector portion 24a of the flexible circuit board 74 is brought into contact with the insert slot 75.

At the time point where the motion having "motion ID" "22", i.e., the motion of shifting the connector portion 24a of the flexible circuit board 74 until being brought into contact with the insert slot 75, has finished, the motion instruction unit 27 selects the motion to be operated next. When the motion instruction unit 27 determines that the force of the environment information having "environment ID" "31" of the motion having "motion ID" "23" and the force acquired by the environment information acquiring unit 19 agree with each other, the motion instruction unit 27 selects the two motions, namely, the motion having "motion ID" "21" and the motion having "motion ID" "23". Further, when the motion instruction unit 27 determines that the force of the environment information having "environment ID" "30" of the motion having "motion ID" "22" and the image acquired by the environment information acquiring unit 19 agree with each other, the motion instruction unit 27 selects the three motions, namely, the motion having "motion ID" "21", the motion having "motion ID" "22", and the motion having "motion ID" "23".

The motion calculation unit 2 calculates the eventual to-be-executed motion information, based on flags of respective "motion IDs" (i.e., which are the flags found as being stored when the motion instruction unit 27 refers to the motion information database 17 for the "motion ID", via the database input/output unit 28).

In this example, the motion having "motion ID" "21", the motion having "motion ID" "22", the motion having "motion ID" "23" are selected, and under the "motion ID" in the control rule database 16 in FIG. 10A, they are stored in order of the motion "21", the motion "22", and the motion "23". In this case, the motion instruction unit 27 selects prioritizing the "motion ID" with the greatest number. With reference to FIG. 32A, because the flags of the motion information of the motion having "motion ID" "22" show "1" for the 0th, 1st, 3rd to 5th, 8th, 12th, 13th, and 15th to 17th bits, motion information of the position orientation information (x, y, $\phi$, $\theta$, $\psi$) and the force information of the z-component from the motion information of the motion having "motion ID" "22" is acquired. Next, the flags of the motion having "motion ID" "23" show "1" for the 0th, 1st, 3rd to 5th, 8th, 12th, 13th, and 15th to 17th, and show "0" for the others. Among those flags, because "1" is shown for the 12th, 13th, 15th to the 17th bits, and here, because the key motion flags of the motion having "motion ID" "22" show "1" for the 12th, 13th, 15th to 17th bits, the motion instruction unit 27 copies the hand positional information of the robot arm 5 presently executing the motion information of the motion having "motion ID" "11" for replacement. In this example, because the robot arm 5 is disposed above the insert slot, the motion instruction unit 27 copies from the motion having "motion ID" "21" to the position and orientation information thereof. The motion instruction unit 27 performs the replacement as to the position of the other key motion also. Next, values of the (x, y, ϕ, θ, ψ) components included in the motion information of the motion having "motion ID" "22" replace corresponding motion information of the motion having "motion ID" "23", and the motion calculation unit 2 performs calculation.

Subsequently, until the end of "key motion ID" is reached, calculation is performed by the motion calculation unit 2 in order.

—Motion Correction Unit—

In the following, a description will be given of the function of the motion correction unit 20.

Figure 35A:
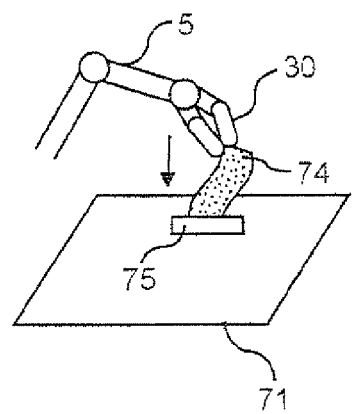
FIG. 35A is a view showing a motion state of the control apparatus for the robot arm according to the fourth embodiment of the present invention.

When the person 4A specifies a task having "task ID" "4" via the data input IF 26 to instruct the motion instruction unit 27 to start the task, as shown in FIG. 35A, the robot arm 5 starts a task of inserting the connector portion 74a of the flexible circuit board 74 into the insert slot 74.

Figure 35B:
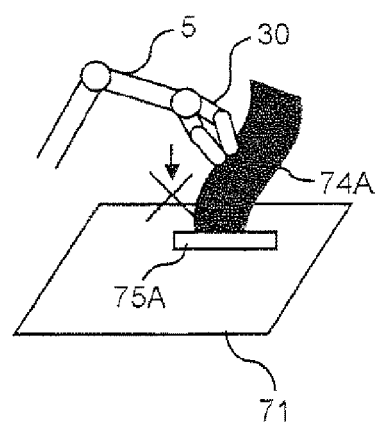
FIG. 35B is a view showing a motion state of the control apparatus for the robot arm according to the fourth embodiment of the present invention.

Next, in accordance with a specification change of the device 71 such as a TV set or a DVD recorder, as shown in FIG. 35B, a change occurs in size or thickness of the flexible circuit board 74A, rigidity of the flexible circuit board itself, and the size of the insert slot 75A. Because the previously generated task having "task ID" "4" is generated prior to such a specification change, if the robot arm 5 is operated as it is, due to the change in the flexible circuit board 74A or the insert slot 75A, for example, the extent of force for insertion based on the motion of the task having "task ID" "4" may be insufficient, which hinders full insertion into the insert slot 75A.

Accordingly, the person 4A inputs, via the data input IF 26, an environmental change reporting manipulation start instruction to the motion instruction unit 27. Upon receipt of the environmental change reporting manipulation instruction from the data input IF 26 via the motion instruction unit 27, the motion correction unit 20 sets the control mode in accordance with the flags in the motion information database 17, and instructs the control parameter managing unit 21 to operate accordingly.

Specifically, as shown in FIG. 35B, when the flexible circuit board 74A is inserted, it is operated in the motion having "motion ID" "23". The motion correction unit 20 refers to, via the database input/output unit 28, the motion information database 18 for the motion having "motion ID" "23" which is in motion, to find that the flags of each of the "key motion IDs" in FIG. 32A show "1" for the 0th, 1st, 3rd to 5th, 8th, 12th, 13th, and 15th to 17th, and "0" for the others. This represents that, as to the motion of the robot arm 5, x-, y-, ϕ-, θ-, and ψ-axes in relation to the position orientation, and the z-axis in relation to force are valid. Accordingly, the motion correction unit 20 instructs the control parameter managing unit 21 such that motions be performed as being switched from the position control mode to the impedance control mode (i.e., the mode for shifting toward the direction in which a force of the person 4A is detected) for the x-, y-, ϕ-, θ-, and ψ-axes, such that the x-, y-, ϕ-, θ-, and ψ-axes can be corrected by a force applied by the person 4A, and that the motion be performed in the high-rigidity position control mode for the z-axis.

Next, as shown in FIG. 35C, in order to report about the change in the force state in accordance with the specification change portion on the device 71, the person 4A applies a force in the z-axis direction. In order for the motion correction unit 20 to acquire the motion of the person 4A applying a force by the environmental change reporting manipulation, the motion correction unit 20 acquires the force to the robot arm 5 from the control parameter managing unit 21, and the motion correction unit 20 outputs the acquired force to the control rule generating unit 23, the description of which will be given later.

Next, upon receipt of the motion correcting manipulation start instruction from the data input IF 26 via the motion instruction unit 27, the motion correction unit 20 sets the control mode in accordance with the correction parameter flags in the motion information database 17 and instructs the control parameter managing unit 21 to operate accordingly. Specifically, when the motion correction unit 20 refers to the motion information database 18 in FIG. 10A for the motion having "motion ID" "23" in motion for the task having "task ID" "4", with reference to FIG. 22A, the correction parameter flags of respective "key motion IDs" show "1" only for the 8th bit, and "0" for the others. Accordingly, the motion correction unit 20 can recognize that, for the force of the motion of the robot arm 5, the z-axis component solely is correctable. The motion correction unit 20 instructs the control parameter managing unit 21 such that motions be performed in the high-rigidity position control mode for the z-axis.

Next, as shown in FIG. 35D, when the person 4A directly grips the robot arm 5 so as to cause it to operate with a somewhat greater force as to the projecting member 71b of the specification change portion. In order to acquire the force applied by the person 4A, the motion correction unit 20 acquires a force of the hand of the robot arm 5 from the control parameter managing unit 21, and the motion correction unit 20 outputs the acquired force to the control rule generating unit 23, the description of which will be given later.

It is to be noted that, though the environmental change reporting manipulation and the motion correcting manipulation are separately input herein, in a case where the manipulation direction of the environmental change reporting manipulation and that of the motion correcting manipulation are identical to each other, one of the motion correcting manipulation and the environmental change reporting manipulation can be omitted. Specifically, in a case where, from the data input IF 26, the environmental change reporting manipulation start instruction is issued while the motion correcting manipulation start instruction is omitted, the motion correcting manipulation can be omitted (see the fifth embodiment). In such a case, when the person 4 performs a motion correcting manipulation, the motion correction unit 20 acquires environment information, and thereafter executes a motion correction.

—Control Rule Generating Unit—

Similarly to the third embodiment, while the robot arm 5 is in motion in one of the impedance control mode, the position control mode, the force control mode, and the control mode being the combination of the foregoing modes set for each direction, the description of which will be given later, the control rule generating unit 23 receives, from the data input IF 26 via the motion instruction unit 27, an environmental change reporting manipulation and a motion correction start instruction, by the information as to position, orientation, force, and time in the motion information database 17 referred to by the "motion IDs" in the control rule database 16. The control rule generating unit 23 functions to generate a control rule based on the motion information corrected by the motion correction unit 20 and the environment information acquired by the environment information acquiring unit 19, and to store the generated control rule in the control rule database 16.

In the following, the functions of the control rule generating unit 23.

As shown in FIG. 35B, the motion having "motion ID" "23" is being operated when the flexible circuit board is inserted.

To the control rule generating unit 23, from the data input IF 26 via the motion instruction unit 27, for a task ID which is in motion, in response to an environmental change reporting manipulation start instruction, the motion correction unit 20 inputs a hand position of the robot arm 5 and time which is generated based on an environmental change reporting manipulation from the person 4A. Additionally, the environment information acquiring unit 19 inputs environment information to the control rule generating unit 23 from the timing of start of the environmental change reporting manipulation. Further, the control rule generating unit 23 refers to the motion information database 18 for an "motion ID" which is in motion at the start of the environmental change reporting manipulation, and the control rule generating unit 23 acquires, based on the information as to flags of the "key motion ID" of that "motion ID", the information as to the present control mode of the robot arm 5. Specifically, when the control rule generating unit 23 refers to the motion information database 18 for the key motions respectively having "key motion IDs" "78" to "86" for the motion having "motion ID" "23" in FIG. 10A, which is in motion for the task having "task ID" "4", the flags of respective "key motion IDs" show "1" only for the 0th, 1st, 3rd to 5th, 8th, 12th, 13th, and 15th to 17 in FIG. 32A, and show "0" for the others. Therefore, the control rule generating unit 23 can recognize that, for the motions of the robot arm 5, data is valid for the x-, y-, φ-, θ-, and ψ-axes in relation to the position orientation, and for the z-axis component in relation to the force. Accordingly, in order for the x-, y-, θ-, and ψ-axes to be corrected by a force applied by the person 4A, the impedance control mode is set thereto; and the high-rigidity position control mode is set to the z-axis.

Based on the control mode of the shifting direction of the robot arm 5 at the time of the environmental change reporting manipulation in relation to the presently performed motion and the detecting unit selection rule database 29, the control rule generating unit 23 selects an environment information type for generating a control rule out of a plurality of environment information pieces. Specifically, at the timing of start of the environmental change reporting manipulation of the task having "task ID" "4" in FIG. 10A, as shown in FIG. 35C, the environmental change reporting manipulation is performed as to the z-axis direction. Because the correction is made having the z-axis placed in the high-rigidity position control mode, with reference to FIG. 11A, the environment information type ID is "2", and with reference to FIG. 11B, "force" is selected by the control rule generating unit 23. Accordingly, the control rule generating unit 23 selects the force detected by the force detecting unit 53. The control rule generating unit 23 stores the acquired force in the environment information database 18 via the database input/output unit 28. In this example, as shown in FIG. 9A, the control rule generating unit 23 allots "32" as the new "environment ID", and the control rule generating unit 23 stores, via the database input/output unit 28, the acquired information as to force in "force" of the "environment ID" in the environment information database 18. Further, because the flag is only for the force, the control rule generating unit 23 stores "1" only for the 0th to 5th bits, and "0" for the other bits in the environment information database 18 via database input/output unit 28.

Next, upon receipt of the motion correcting manipulation start instruction, the motion information corrected by the motion correction unit 20 is stored in the motion information database 17 via the database input/output unit 28.

Specifically, the motion correction unit 20 newly allots "motion ID" in the motion information database 17 in FIG. 32B (in this example, "24"), and further, the motion correction unit 20 allots "90" to "98" as "key motion IDs", and stores, via the database input/output unit 28, the motion information pieces corrected by the motion correction unit 20 by their respective "key motion IDs" in the motion information database 17. As to time, the motion correction unit 20 inputs the relative time in which the time point at which the person 4A selects a task and issues a start instruction is regarded as 1. Therefore, the motion correction unit 20 stores the value obtained by subtracting the time of the very first key motion (in this example, "90") from the time of each of all the motions in the motion information database 17 via the database input/output unit 28. As to flags, among the components of the motion information for which the flags before correction show "1", the motion correction unit 20 compares the position orientation and the force values of the key motion of the "motion ID" before correction against those after correction, for each component. Then, the motion correction unit 20 allows only those components having resultant difference being equal to or more than a certain threshold value to have the flags showing "1" in FIGS. 6; and "0" for the components being less than a threshold value.

Specifically, the flags of the motion of "motion ID" before correction "23" show "1" for the 0th, 1st, 3rd to 5th, 8th, 12th, 13th, and 15th to 17th, and "0" for the others. Therefore, the motion correction unit 20 performs a comparison as to the x, y, φ, θ, ψ components of position orientation and the z-axis component of force, between the position orientation and the force values of the motion before correction and those of the motion after correction. The key motion having "key motion ID" "77" and the key motion having "key motion. ID" "86" share the same (x, y, φ, θ, ψ) components of position orientation, and have a difference in z-axis component of force. Provided that the threshold value of the difference is 0.1 (N), the force z-component solely is equal to or more than the threshold value. Accordingly, the motion correction unit 20 sets the flags to show "1" for the 8th bit, and "0" for the others.

As to the correction parameter flags, the motion correction unit 20 stores the values of each motion before correction (in this example, "78" to "86") in the motion information database 17 via the database input/output unit 28.

Next, the control rule generating unit 23 generates a new control rule and stores in the control rule database 19, based on the acquired environment information and the motion corrected by the motion correcting manipulation of the motion correction unit 20.

Specifically, because a motion is corrected while the task having "task ID" "4" in the control rule database 16 is in motion, the control rule generating unit 23 adds one row to the task having "task ID" 4" as shown in FIG. 10B, and adds the motion having "motion ID" "24" which is newly added by the motion correction.

Next, the environment ID of the environment information selected by the control rule generating unit 23 is stored in the control rule database 16 via the database input/output unit 28 (in this example, the environment information having "environment ID" "32").

The motion instruction unit (motion calculation unit 2) 27, specifically, the correction described in the foregoing, allows, as shown in FIG. 35E, the motion of the robot arm 5 to automatically be performed after a specification change. Such a motion automatically performed after the specification change is the same as in the third embodiment or the foregoing embodiments and, therefore, the description thereof will not be repeated.

As has been described in the foregoing, the person 4A performing the environmental change reporting manipulation and the motion correcting manipulation to cause the control rule generating unit 23 to generate a new control rule eliminates the necessity of previously preparing a motion taken into consideration of any specification change of the device 71. Instead, the person 4A simply performing manipulation on site to report the environment and to correct the motion allows the robot arm 5 to autonomously operate when the similar environment is varied next time, based on the information in the control rule database 16 (in other words, based on the control rule generated by the control rule generating unit 23, while referring to the environment information acquired by the environment information acquiring unit 19).

FIFTH EMBODIMENT

The basic structure of a robot arm 5 and a control apparatus therefor according to a fifth embodiment of the present invention is similar to those in the first or the fourth embodiment. Therefore, the description as to the common constituents is not repeated herein, and the difference therefrom solely will be detailed in the following. It is to be noted that, in the fifth embodiment, a description will be given of an exemplary case where the environmental change reporting manipulation and the motion correcting manipulation are identical to each other, instead of performing the two manipulations, the motion correcting manipulation is omitted and the one manipulation (as used herein, it is referred to as the environmental change and motion reporting manipulation) can solely be performed.

In the fifth embodiment, similarly to the fourth embodiment, a description will be given of an exemplary case where, as shown in FIG. 31, a flexible circuit board 74 being one example of a task-target object is attached to an insert slot 75 of a device 71 such as a television set or a DVD recorder in a factory employing cell manufacturing, using a robot 1 including the robot arm 5 and the control apparatus for the robot arm 5.

As shown in FIG. 31, the robot arm 5 of the robot 1 is installed on a wall surface 7a of a workbench 7 of a workbench table in a factory, for example. The base end of the robot arm 5 is shiftably supported by a rail 8 fixed to the wall surface 7a, such that the robot arm 5 can shift on the rail 8 in a lateral direction along the rail 8, e.g., in the horizontal direction, by a force of a person 4A. The reference numeral 15a denotes a first image pickup apparatus such as a camera, which is installed at a ceiling 7b, for example, so as to be capable of capturing an image of the workbench 7.

The robot 1 performs a task which is carried out in cooperation with the robot arm 5 and the person 4A, such as a task of attaching a flexible circuit board 74 of a television set or a DVD recorder in a factory, for example, through the robot arm 5.

Similarly to the fourth embodiment, first, the person 4A directly grips the robot arm 5 of the robot 1 with the hand 4 and applies a force to the robot arm 5. Then, the force applied by the person 4A to the robot arm 5 allows the robot arm 5 of the robot 1 to shift along the rail 8, whereby the robot arm 5 is guided to the vicinity of the tool 71 (in this example, a device such as a television set or a DVD recorder to which the flexible circuit board 74 is inserted).

Next, the person 4A uses a data input IF 26, for example by pressing a button 13a of a console 13 of the robot 1 as one example of the data input IF 26 disposed at a front side surface 7e of the workbench 7 for cell manufacturing or the like, whereby the robot arm 5 actuates, to start the previously selected task, that is, the task of inserting the flexible circuit board 74, whose connector portion 74a is held by the hand 30, into the insert slot 75 of the tool 71.

Next, in a case where the shape of the device 71 or the specification of the flexible circuit board 74 is changed due to any specification change of the device 71, when the robot arm 5 is performing the attaching task of the flexible circuit board 74, the person 4A checks the attaching state of the flexible circuit board 74, and the person 4A applies a force to the robot arm 5, to perform a motion correction as to the extent of force used for attaching, or a positional adjustment of the flexible circuit board 74, so as to correct the motion of the robot arm 5 of the robot 1.

The rail 8 is arranged on the wall surface 7a of the workbench 7. However, in a case where the workbench having no wall surface is used, it may be disposed at a place which is suitable for performing a task, such as a ceiling surface, a side surface of a top board 6a of the workbench or the like.

Further, though the console 13 is fixed to the side surface of the workbench 7, the console 13 may be replaced by a remote controller with which teleoperation can be performed.

—Motion Information Database—

Similarly to the fourth embodiment, a motion information database 17 stores therein information as to motions of the robot arm 5 (i.e., motion information) of the robot arm 5, such as the hand position and orientation of the robot arm 5 at a certain time. The database input/output unit 28 inputs and outputs the motion information to and from the motion information database 17 via the control rule generating unit 23.

Similarly to the fourth embodiments, FIGS. 32A and 325 each show the motion information database 17 according to the fifth embodiment. The motion information is the same as that in the first embodiment and, therefore, the description thereof will not be repeated.

—Motion Instruction Unit (Motion Calculation Unit)—

In the following, the function of the motion instruction unit 27 will be described.

The person 4A selects, through the use of the data input IF 26, a task desired to be executed by the robot arm 5 out of the tasks relating to the "task IDs" in the tasks in the control rule database 16 via the database input/output unit 28, and the motion instruction unit 27 instructs the control parameter managing unit 21 to execute the motion relating to the selected "task ID".

When the motion instruction unit 27 refers to the control rule database 16 via the database input/output unit 28, in a case where the task of one "task ID" is selected, and where the motion instruction unit 27 determines that a plurality of "motion IDs" are stored in the task of one "task ID", the motion calculation unit 2 calculates motion information, and sets a control mode in accordance with the flags of the calculated motion information (specifically, position, orientation, time, force), and instructs, via the database input/output unit 28, the control parameter managing unit 21 to operate accordingly.

Specifically, the task having "task ID" "4" in FIG. 10A indicates, as shown in FIG. 33A (which corresponds to FIG. 31 as viewed from above), the task according to such a control rule that, when the robot 1 detects an insert slot 75 while the robot arm 5 is shifting, a motion of inserting into the insert slot 75 the connector portion 74a of the flexible circuit board 74 having its connector portion 74a gripped by the hand 30 at the hand position of the robot arm 5 is performed. A plurality of "motion IDs" (motions of "21", "22", and "23") are stored for the task having "task ID" "4"

The motion calculation unit 2 calculates one motion information piece based on a plurality of motions. Specifically, the motion calculation unit 2 calculates one motion information piece based on the motion having "motion ID" "21", the motion having "motion ID" "22", and the motion having "motion ID" "23". The motion having "motion ID" "21" indicates the motion in which the hand 30 at the hand position of the robot arm 5 (to be exact, the flexible circuit board 74 gripped by the hand 30) shifts in an upper portion in the vicinity of the insert slot 75 of the device 71, as shown in FIG. 33A. Because the "environment ID" of the motion having "motion ID" "21" assumes a value of "−1", the robot arm 5 operates irrespective of the ambient environment of the robot arm 5. Accordingly, the motion instruction unit 27 selects it as the motion to be executed. The motion having "motion ID" "22" indicates a motion, as will be described below, of shifting the flexible circuit board 74 until the connector portion 74a of the flexible circuit board 74 is brought into contact with the inlet of the insert slot 75, when the motion instruction unit 27 determines any portion to be the insert slot 75. Because the "environment ID" of the motion having "motion ID" "22" is associated with the environment information "30", which does not assume the value of "−1", the motion instruction unit 27 refers to the environment information database 18 for the environment information having "environment ID" "30", via the database input/output unit 28. In FIG. 9A, the flags of the environment information having "environment ID" "30" show "1" only for the 6th bit, and show "0" for the others, whereby the motion instruction unit 27 can determine that the image is valid. Accordingly, based on the image ID, the motion instruction unit 27 acquires image information stored in the environment information database 18. This image represents the image information of the insert slot 75 shown in FIG. 34. Next, the motion instruction unit 27 acquires image information at present from the environment information acquiring unit 19, and the motion instruction unit 27 compares the two images against each other based on image matching, to determine whether it is the insert slot 75. When the motion instruction unit 27 determines that the two images agree with each other, the motion instruction unit 27 determines that it is the insert slot, and the motion instruction unit 27 selects the motion stored by "motion ID" "22" as the motion to be executed. When the motion instruction unit 27 determines that they do not agree with each other, the motion instruction unit 27 does not select the motion having "motion ID" "22", and the motion instruction unit 27 selects the motion "21" solely.

The motion having "motion ID" "23" indicates a motion of shifting the flexible circuit board 74, in order to insert the connector portion 74a of the flexible circuit board 74 into the insert slot 75. Because the "environment ID" of the motion having "motion ID" "23" is associated with the environment information "31", which does not assume a value of "−1", the motion instruction unit 27 refers to the environment information database 18 for the environment information having "environment ID" "31", via the database input/output unit 28. In FIG. 9A, the flags of the environment information having "environment ID" "31" show "1" only for the 0th to 5th bits, and show "0" for the others, whereby the motion instruction unit 27 can determine that the force is valid. The motion instruction unit 27 acquires the value of the force detecting unit at present from the environment information acquiring unit 19, and the motion instruction unit 27 compares the acquired force and the force stored in the environment information database 18 against each other. When the motion instruction unit 27 determines that the two forces agree with each other, the motion instruction unit 27 determines that the force applied to the flexible circuit board 74 from the insert slot 75 agrees with the force stored in the environment information database 18, and the motion instruction unit 27 selects the motion stored by the motion "motion ID" "23" as the motion to be executed. When the motion instruction unit 27 determines that they do not agree with each other, the motion instruction unit 27 does not select the motion having "motion ID" "23", and the motion instruction unit 27 selects one of the motion "21" and the motion "22".

In a case where a single "motion ID" is selected, similarly to the first embodiment, the motion instruction unit 27 refers to the motion information database 17 via the database input/output unit 28 for a motion bearing the same "motion ID" as that "motion ID". As to the motion information bearing the same ID as the "motion ID", the motion instruction unit 27 sets the control modes in accordance with the flags of the motion information pieces managed by a plurality of "key motion IDs" (specifically, the positional information, the orientation information, the information as to time, and the information as to force), respectively, and instructs the control parameter managing unit 21 to operate accordingly. Then, the motion instruction unit 27 outputs the motion information pieces to the control parameter managing unit 21, such that the key motions are executed in order. In this example, when the motion instruction unit 27 determines that the ambient environment of the robot arm 5 does not agree with the environment information having "environment ID" "30" of the motion having "motion ID" "22", the motion instruction unit 27 determines that the insert slot 75 failed to be detected, and the motion instruction unit 27 instructs the control parameter managing unit 21 to execute the motion indicated by motion having "motion ID" "21".

That is, with reference to the motion information database 17 shown in FIG. 32A, the "flags" show "1" for the 0th to 5th bits. Therefore, it is indicated that the x, y, z, ϕ, θ, ψ of the hand of the robot arm 5 are valid, and hence the motion is performed placing the x, y, z, ϕ, θ, ψ in the position control mode.

According to the foregoing, as shown in FIG. 33A (which corresponds to FIG. 31 as viewed from above), the robot arm 5 starts the motion of shifting over the device 71.

When the motion instruction unit 27 determines that the robot arm 5 has reached an upper portion of the insert slot 75 while the robot arm 5 is shifting over the device 71 in the motion having "motion ID" "21", the motion instruction unit 27 determines that the image being the environment information having "environment ID" "30" of the motion having "motion ID" "22" and the image being the image information at present acquired by the environment information acquiring unit 19 agree with each other. Therefore, the motion instruction unit 27 selects the two motions, namely, the motion having "motion ID" "21" and the motion having "motion ID" "22". The motion calculation unit 2 of the motion instruction unit 27 calculates the eventual to-be-executed motion information, based on flags of respective "motion IDs" (i.e., which are the flags found as being stored when the motion instruction unit 27 refers to the motion information database 17 for the "motion ID", via the database input/output unit 28).

In this example, the motion having "motion ID" "21" and the motion having "22" are selected by the motion instruction unit 27, and under the "motion ID" in the control rule database 16 in FIG. 10A, they are stored in order of the motion "21" and the motion "22". Accordingly, with reference to FIG. 32A, because the flags of the motion information of the motion having "motion ID" "21" show "1" for the 0th to 5th bits, the motion information of position orientation information (x, y, z, ϕ, θ, ψ) from the motion information of the motion having "motion ID" "21" is acquired.

Next, the flags of the motion having "motion ID" "22" show "1" for the 0th, 1st, 3rd to 5th, 8th, 12th, 13th, and 15th to 17th, and show "0" for the others. Among those flags, because "1" is shown for the 12th, 13th, 15th to 17th bits, and here, because the key motion flags of the motion having "motion ID" "22" show "1" for the 12th, 13th, and 15th to 17th bits, the motion instruction unit 27 copies the hand positional information of the robot arm 5 presently executing the motion information of the motion having "motion ID" "21" for replacement. In this example, because the robot arm 5 is disposed above the insert slot 75, the motion instruction unit 27 copies from the motion having "motion ID" "21" to the position and orientation information thereof. The motion instruction unit 27 performs the replacement as to the position of the other key motions also.

Next, the motion instruction unit 27 replaces the motion information of the motion having "motion ID" "22" with the values of (x, y, ϕ, θ, ψ) of the motion information of the motion having "motion ID" "21", and the motion calculation unit 2 performs calculation.

Subsequently, until the end of "key motion ID" is reached, calculation is performed by the motion calculation unit 2 in order.

As to the flags of the motion information calculated by the motion calculation unit 2 and the motion information flag, the motion calculation unit 2 allots "1" to respective bits of the motion having "motion ID" "21" and "motion ID" "22" after calculation, in a case where the bits of either one of the motions "motion ID" "21" and "motion ID" "22" assume "1"; and allots "0" in a case where both the bits assume "0". However, only one of the components of the position and those of the force may assume "1" (because actuation can occur exclusively in the position control mode or in the force control mode). Therefore, when both the components of the position and those of the force assume "1", the force is prioritized.

Because the flags of the motions having "motion ID" "21" show "1" for the 0th and 5th bits, and the flags of the motions having "motion ID" "22" show "1" for the 0th, 1st, 3rd to 5th, 8th, 12th, 13th, 15th to 17th bits, the 0th to 5th, 8th, 12th, 13th, 15th to 17th bits assume "1". Here, both the position z-component and the force z-component both assume "1". Because force is prioritized, eventually, the 0th, 1st, 3rd to 5th, 8th, 12th, 13th, 15th to 17th bits assume "1".

The motion parameter flags of the motion having "motion ID" "21" show "1" for the 1st, 2nd, and 3rd bits, and the motion parameter flags of the motion having "motion ID" "22" show "1" for the 8th bit. Accordingly, the motion parameter flags of the motions calculated by the motion calculation unit 2 show "1" for the 1st, 2nd, 3rd, and 8th bits.

The "flags" of the motions calculated by the motion calculation unit 2 show "1" for the 0th, 1st, 3rd to 5th bits. Therefore, it is indicated that the x, y, ϕ, θ, ψ of the hand of the robot arm 5 are valid, and hence the motion is performed placing the x, y, ϕ, θ, ψ in the position control mode. Further, because the 8th bit assumes "1", the motion instruction unit 27 instructs the control parameter managing unit 21 such that the z-axis is placed in the force control mode to be operated.

From the foregoing, as shown in FIG. 33B, the robot arm 5 starts a motion of shifting until the connector portion 24a of the flexible circuit board 74 is brought into contact with the insert slot 75.

At the time point where the motion having "motion ID" "22", i.e., the motion of shifting the connector portion 24a of the flexible circuit board 74 until being brought into contact with the insert slot 75, has finished, the motion instruction unit 27 selects the motion to be operated next. When the motion instruction unit 27 determines that the force of the environment information having "environment ID" "31" of the motion having "motion ID" "23" and the force acquired by the environment information acquiring unit 19 agree with each other, the motion instruction unit 27 selects the two motions, namely, the motion having "motion ID" "21" and the motion having "motion ID" "23". Further, when the motion instruction unit 27 determines that the force of the environment information having "environment ID" "30" of the motion having "motion ID" "22" and the image acquired by the environment information acquiring unit 19 agree with each other, the motion instruction unit 27 selects the three motions, namely, the motion having "motion ID" "21", the motion having "motion ID" "22", and the motion having "motion ID" "23".

The motion calculation unit 2 calculates the eventual to-be-executed motion information, based on flags of respective "motion IDs" (i.e., which are the flags found as being stored when the motion instruction unit 27 refers to the motion information database 17 for the "motion ID", via the database input/output unit 28).

In this example, the motion having "motion ID" "21", the motion having "motion ID" "22", the motion having "motion ID" "23" are selected, and under the "motion ID" in the control rule database 16 in FIG. 10A, they are stored in order of the motion "21", the motion "22", and the motion "23". In this case, the motion instruction unit 27 selects prioritizing the "motion ID" with the greatest number. With reference to FIG. 32A, because the flags of the motion information of the motion having "motion ID" "22" show "1" for the 0th, 1st, 3rd to 5th, 8th, 12th, 13th, and 15th to 17th bits, motion information of the position orientation information (x, y, ϕ, θ, ψ) and the force information of the z-component from the motion information of the motion having "motion ID" "22" is acquired. Next, the flags of the motion having "motion ID" "23" show "1" for the 0th, 1st, 3rd to 5th, 8th, 12th, 13th, and 15th to 17th, and show "0" for the others. Among those flags, because "1" is shown for the 12th, 13th, 15th to the 17th bits, and here, because the key motion flags of the motion having "motion ID" "22" show "1" for the 12th, 13th, 15th to 17th bits, the motion instruction unit 27 copies the hand positional information of the robot arm 5 presently executing the motion information of the motion having "motion ID" "11" for replacement. In this example, because the robot arm 5 is disposed above the insert slot, the motion instruction unit 27 copies from the motion having "motion ID" "21" to the position and orientation information thereof. The motion instruction unit 27 performs the replacement as to the position of the other key motion also. Next, values of the (x, y, ϕ, θ, ψ) components included in the motion information of the motion having "motion ID" "22" replace corresponding motion information of the motion having "motion ID" "23", and the motion calculation unit 2 performs calculation.

Subsequently, until the end of "key motion ID" is reached, calculation is performed by the motion calculation unit 2 in order.

—Motion Correction Unit—

In the following, a description will be given of the function of the motion correction unit 20.

When the person 4A specifies a task having "task ID" "4" via the data input IF 26 to instruct the motion instruction unit 27 to start the task, as shown in FIG. 35A, the robot arm 5 starts a task of inserting the connector portion 74a of the flexible circuit board 74 into the insert slot 74.

Next, in accordance with a specification change of the device 71 such as a TV set or a DVD recorder, as shown in FIG. 35B, a change occurs in size or thickness of the flexible circuit board 74A, rigidity of the flexible circuit board itself, and the size of the insert slot 75A. Because the previously generated task having "task ID" "4" is generated prior to such a specification change, if the robot arm 5 is operated as it is, due to the change in the flexible circuit board 74A or the insert slot 75A, for example, the extent of force for insertion based on the motion of the task having "task ID" "4" may be insufficient, which hinders full insertion into the insert slot 75A.

A description will be given of an embodiment in which, in a case where a correction similar to that in the fourth embodiment is made, the environmental change reporting manipulation shown in FIG. 35C and the motion correcting manipulation shown in FIG. 35D are identical to each other.

In order to manipulate the environmental change reporting manipulation and the motion correcting manipulation with a single manipulation, the person 4A inputs, via the data input IF 26, one environmental change and motion reporting manipulation start instruction to the motion instruction unit 27. The environmental change and motion reporting manipulation is a manipulation which allows the environmental change reporting manipulation and the motion correcting manipulation according to the fourth embodiment with one manipulation (e.g., in a case where an identical manipulation direction is specified, instead of the two manipulation directions, namely, the manipulation direction by the environmental change reporting manipulation and the manipulation direction by the motion correcting manipulation, the identical one manipulation direction as the environmental change and motion reporting manipulation is input). Upon receipt of the environmental change and motion reporting manipulation instruction from the data input IF 26 via the motion instruction unit 27, the motion correction unit 20 sets the control mode in accordance with the flags in the motion information database 17 and instructs the control parameter managing unit 21 to operate accordingly.

Specifically, as shown in FIG. 35B, when the flexible circuit board 74A is inserted, it is operated in the motion having "motion ID" "23". The motion correction unit 20 refers to, via the database input/output unit 28, the motion information database 18 for the motion having "motion ID" "23" which is in motion, to find that the flags of each of the "key motion IDs" in FIG. 32A show "1" for the 0th, 1st, 3rd to 5th, 8th, 12th, 13th, and 15th to 17th, and "0" for the others. This represents that, as to the motion of the robot arm 5, x-, y-, ϕ, θ, and ψ-axes in relation to the position orientation, and the z-axis in relation to force are valid. Accordingly, the motion correction unit 20 instructs the control parameter managing unit 21 such that motions be performed as being switched from the position control mode to the impedance control mode (i.e., the mode for shifting toward the direction in which a force of the person 4A is detected) for the x-, y-, ϕ-, θ- and ψ-axes, such that the x-, y-, ϕ-, θ-, and ψ-axes can be corrected by a force applied by the person 4A, and that the motion be performed in the high-rigidity position control mode for the z-axis.

Next, as shown in FIG. 35C, in order to report both the change in the force state and the to-be-corrected motion attributed to the specification change portion on the device 71, the person 4A applies a force in the z-axis direction. In order for the motion correction unit 20 to acquire the motion of the person 4A applying a force by the environmental change and motion reporting manipulation, the motion correction unit 20 acquires the force to the robot arm 5 from the control parameter managing unit 21, and the motion correction unit 20 outputs the acquired force to the control rule generating unit 23, the description of which will be given later.

Next, by the environmental change and motion reporting manipulation, the motion correction unit 20 causes a motion of insertion to occur with a somewhat greater force. In order to acquire the force applied by the person 4A, the motion correction unit 20 acquires the force of the hand of the robot arm 5 from the control parameter managing unit 21, and the motion correction unit 20 outputs the acquired force to the control rule generating unit 23, the description of which will be given later.

—Control Rule Generating Unit—

While the robot arm 5 is in motion in one of the impedance control mode, the position control mode, the force control mode, and the control mode being the combination of the foregoing modes set for each direction, the description of which will be given later, the control rule generating unit 23 receives, from the data input IF 26 via the motion instruction unit 27, an environmental change and motion correction start instruction, by the information as to position, orientation, force, and time in the motion information database 17 referred to by the "motion IDs" in the control rule database 16. The control rule generating unit 23 functions to generate a control rule based on the motion information corrected by the motion correction unit 20 and the environment information acquired by the environment information acquiring unit 19, and to store the generated control rule in the control rule database 16.

In the following, the functions of the control rule generating unit 23.

As shown in FIG. 35B, the motion having "motion ID" "23" is being operated when the flexible circuit board is inserted.

To the control rule generating unit 23, from the data input IF 26 via the motion instruction unit 27, for a task ID which is in motion, in response to an environmental change and motion reporting manipulation start instruction, the motion correction unit 20 inputs a hand position of the robot arm 5 and time which is generated based on an environmental change and motion reporting manipulation from the person 4A. Additionally, the environment information acquiring unit 19 inputs environment information to the control rule generating unit 23 from the timing of start of the environmental change and motion reporting manipulation. Further, the control rule generating unit 23 refers to the motion information database 18 for an "motion ID" which is in motion at the start of the environmental change and motion reporting manipulation, and the control rule generating unit 23 acquires, based on the information as to flags of the "key motion ID" of that "motion ID", the information as to the present control mode of the robot arm 5. Specifically, when the control rule generating unit 23 refers to the motion information database 18 for the key motions respectively having "key motion IDs" "78" to "86" for the motion having "motion ID" "23" in FIG. 10A, which is in motion for the task having "task ID" "4", the flags of respective "key motion IDs" show "1" only for the 0th, let, 3rd to 5th, 8th, 12th, 13th, and 15th to 17 in FIG. 32A, and show "0" for the others. Therefore, the control rule generating unit 23 can recognize that, for the motions of the robot arm 5, data is valid for the x-, y-, ϕ-, θ-, and ψ-axes in relation to the position orientation, and for the z-axis component in relation to the force. Accordingly, in order for the x-, y-, θ-, and ψ-axes to be corrected by a force applied by the person 4A, the impedance control mode is set thereto; and the high-rigidity position control mode is set to the z-axis.

Based on the control mode of the shifting direction of the robot arm 5 at the time of the environmental change and motion reporting manipulation in relation to the presently performed motion and the detecting unit selection rule database 29, the control rule generating unit 23 selects and determines an environment information type for generating a control rule out of a plurality of environment information pieces. Specifically, at the timing of start of the environmental change and motion reporting manipulation of the task having "task ID" "4" in FIG. 10A, as shown in FIG. 35C, the environmental change and motion reporting manipulation is performed as to the z-axis direction. Because the correction is made having the z-axis placed in the high-rigidity position control mode, with reference to FIG. 11A, the environment information type ID is "2", and with reference to FIG. 11B, "force" is selected by the control rule generating unit 23. Accordingly, the control rule generating unit 23 selects the force detected by the force detecting unit 53. The control rule generating unit 23 stores the acquired force in the environment information database 18 and the motion information database 17 via the database input/output unit 28. In this example, as shown in FIG. 9A, the control rule generating unit 23 allots "32" as the new "environment ID", and the control rule generating unit 23 stores, via the database input/output unit 28, the acquired information as to force in "force" of the "environment ID" in the environment information database 18. Further, because the flag is only for the force, the control rule generating unit 23 stores "1" only for the 0th to 5th bits, and "0" for the other bits in the environment information database 18 via database input/output unit 28.

Further, the motion correction unit 20 newly allots "motion ID" in the motion information database 17 in FIG. 32B (in this example, "24"), and further, the motion correction unit 20 allots "90" to "98" as "key motion IDs", and stores, via the database input/output unit 28, the motion information pieces corrected by the motion correction unit 20 by their respective "key motion IDs" in the motion information database 17. As to time, the motion correction unit 20 inputs the relative time in which the time point at which the person 4A selects a task and issues a start instruction is regarded as 1. Therefore, the motion correction unit 20 stores the value obtained by subtracting the time of the very first key motion (in this example, "90") from the time of each of all the motions in the motion information database 17 via the database input/output unit 28. As to flags, among the components of the motion information for which the flags before correction show "1", the motion correction unit 20 compares the position orientation and the force values of the key motion of the "motion ID" before correction against those after correction, for each component. Then, the motion correction unit 20 allows only those components having a resultant difference being equal to or more than a certain threshold value to have the flags showing "1" in FIGS. 6; and "0" for the components being less than a threshold value.

Specifically, the flags of the motion of "motion ID" before correction "23" show "1" for the 0th, 1st, 3rd to 5th, 8th, 12th, 13th, and 15th to 17th, and "0" for the others. Therefore, the motion correction unit 20 performs a comparison as to the x, y, $\phi$, $\theta$, $\psi$ components of position orientation and the z-axis component of force, between the position orientation and the force values of the motion before correction and those of the motion after correction. The key motion having "key motion ID" "77" and the key motion having "key motion ID" "86" share the same (x, y, $\phi$, $\theta$, $\psi$) components of position orientation, and have a difference in z-axis component of force. Provided that the threshold value of the difference is 0.1 (N), the force z-component solely is equal to or more than the threshold value. Accordingly, the motion correction unit 20 sets the flags to show "1" for the 8th bit, and "0" for the others.

As to the correction parameter flags, the motion correction unit 20 stores the values of each motion before correction (in this example, "78" to "86") in the motion information database 17 via the database input/output unit 28.

Next, the control rule generating unit 23 generates a new control rule and stores in the control rule database 19, based on the acquired environment information and the motion corrected by the motion correcting manipulation of the motion correction unit 20.

Specifically, because a motion is corrected while the task having "task ID" "4" in the control rule database 16 is in motion, the control rule generating unit 23 adds one row to the task having "task ID" 4" as shown in FIG. 10B, and adds the motion having "motion ID" "24" which is newly added by the motion correction.

Next, the environment ID of the environment information selected by the control rule generating unit 23 is stored in the control rule database 16 via the database input/output unit 28 (in this example, the environment information having "environment ID" "32").

The motion instruction unit (motion calculation unit 2) 27, specifically, the correction described in the foregoing, allows, as shown in FIG. 35E, the motion of the robot arm 5 to automatically be performed after a specification change. Such a motion automatically performed after the specification change is the same as in the third embodiment or the foregoing embodiments and, therefore, the description thereof will not be repeated.

As has been described in the foregoing, in a case where the environmental change reporting manipulation and the motion correcting manipulation are identical to each other, realizing them as one environmental change and motion correction manipulation, it becomes possible to reduce the burden on the person 4A performing manipulation. Further, causing the control rule generating unit 23 to generate a new control rule eliminates the necessity of previously preparing a motion taken into consideration of any specification change of the device 71. Instead, the person 4A simply performing manipulation on site to report the environment and to correct the motion allows the robot arm 5 to autonomously operate when the similar environment is varied next time, based on the information in the control rule database 16 (in other words, based on the control rule generated by the control rule generating unit 23, while referring to the environment information acquired by the environment information acquiring unit 19).

(Variation)

It is to be noted that, in the first to fifth embodiments, though the robot arm 5 performing a task is directly gripped and manipulated, the present invention is also applicable to the master-slave scheme. That is, the present invention is also applicable to a method in which the person 4A manipulates any easily-movable manipulation device (i.e., the master) other than the robot arm 5 which is actually to perform a task, so as to move the actual robot arm (i.e., the slave) connected thereto, to thereby correct a motion.

Further, in the first to fifth embodiments, though the description has been given of the exemplary robot arm 5, the present invention is also applicable to a mobile robot moved by wheels without being limited to an arm, or a biped walking robot, or a multi-legged walking robot, and exhibits similar effects in relation to the contact between the mobile robot or the like and a person.

By properly combining the arbitrary embodiments of the aforementioned various embodiments, the effects possessed by the embodiments can be produced.

INDUSTRIAL APPLICABILITY

The present invention is useful for, in connection with, e.g., a household robot, where a person and the robot carries out a task in cooperation with each other: a control apparatus and a control method for a robot arm for controlling motions of the robot arm; a robot; a control program for a robot arm; and a robot arm control-purpose integrated electronic circuit. Further, the present invention is not limited to a household robot, but also is applicable to, in connection with an industrial robot or a movable mechanism in any production facilities and the like: a control apparatus and a control method for a robot arm thereof, a robot having control apparatus for a robot arm, a control program for a robot arm, and a robot arm control-purpose integrated electronic circuit.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus for a robot arm controlling a motion of the robot arm, comprising:
    a motion information acquiring unit that acquires motion information, from a motion information database having stored therein as the motion information in a time-oriented manner a force that the robot arm applies to an object as being corresponding to the motion;
    a correction motion information acquiring unit that acquires correction motion information relating to the motion information acquired by the motion information acquiring unit and as to a force that the robot arm applies, when a person corrects the motion of the robot arm by manipulating the robot arm;
    an environment information acquiring unit that acquires environment information being information as to the object on which the robot arm acts upon, in accordance with an environmental change reporting manipulation of the person to the robot arm;
    a control unit that controls the robot arm in a force control mode, such that the robot arm exerts a force control over the object with the force set in the motion information acquired by the motion information acquiring unit;
    a motion correction unit that corrects the motion information in accordance with the correction motion information at each time acquired by the correction motion information acquiring unit while the control unit is controlling the robot arm in the force control mode; and
    a control rule generating unit that generates a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other, wherein
    the motion of the robot arm is controlled based on the control rule generated by the control rule generating unit, while referring to the environment information acquired by the environment information acquiring unit.

2. The control apparatus for a robot arm according to claim 1, wherein
    the environment information acquiring unit includes a force detecting unit detecting a force of the person applied to the robot arm, and
    the correction motion information acquiring unit detects a manipulation performed by the person to the robot arm in accordance with the force of the person detected by the force detecting unit and corresponding time of the detection, and acquires the correction motion information as to a force that the robot arm applies when the motion of the robot arm is corrected.

3. The control apparatus for a robot arm according to claim 1, wherein
    the environment information acquiring unit includes a force detecting unit detecting a force of the person applied to the robot arm, and
    the control rule generating unit uses the environment information acquired by the force detecting unit in generating the control rule, in accordance with the force control mode of the robot arm when the person manipulates the robot arm.

4. The control apparatus for a robot arm according to claim 1, wherein
    when the environmental change reporting manipulation and a motion correcting manipulation of the person correcting the motion of the robot arm by manipulating the robot arm are an identical manipulation, the environmental change reporting manipulation is used instead of the motion correcting manipulation.

5. The control apparatus for a robot arm according to claim 4, wherein
    the environment information includes environment information detected and acquired in a plurality of types of detection directions, and
    the control rule generating unit determines a detection direction of the environment information to be acquired in accordance with the manipulation of the person to the robot arm.

6. The control apparatus for a robot arm according to claim 1, further comprising
    a motion calculation unit that calculates one motion information piece by referring to the environment information acquired by the environment information acquiring unit, based on a plurality of motion information pieces included in the control rule generated by the control rule generating unit.

7. The control apparatus for a robot arm according to claim 1, wherein
    after the correction motion information acquiring unit acquires the correction motion information corresponding to the at least one piece of the motion information included in the motion information acquired by the motion information acquiring unit based on the person correcting the motion of the robot arm by manipulating the robot arm,
    when the environment information acquired by the environment information acquiring unit is identical to the environment information when the correction manipulation is performed, based on the control rule generated by the control rule generating unit, the motion of the robot arm is controlled so as to be corrected based on the correction motion information acquired by the correction motion information acquiring unit.

8. The control apparatus for a robot arm according to claim 1, wherein
the environment information acquiring unit includes a plurality of image pickup apparatuses each capable of capturing an image of the robot arm and an ambient environment in which the motion of the robot arm is performed,
the robot arm is provided with, at its tip, a hand capable of releasably gripping a flexible circuit board, the flexible circuit board being the object, and
the motion of the robot arm in performing a task of attaching the flexible circuit board gripped by the hand of the robot arm to a device is controlled based on the control rule generated by the control rule generating unit while referring to the environment information acquired by the plurality of image pickup apparatuses.

9. A control method for a robot arm controlling a motion of the robot arm, comprising:
acquiring, by a motion information acquiring unit implemented by a processor, motion information, from a motion information database having stored therein as the motion information in a time-oriented manner a force that the robot arm applies to an object as being corresponding to the motion;
acquiring, by a correction motion information acquiring unit implemented by a processor, correction motion information relating to the motion information acquired by the motion information acquiring unit and as to a force that the robot arm applies, when a person corrects the motion of the robot arm by manipulating the robot arm;
acquiring, by an environment information acquiring unit implemented by a processor, environment information being information as to the object on which the robot arm acts upon, in accordance with an environmental change reporting manipulation of the person to the robot arm;
controlling, by a control unit implemented by a processor, the robot arm in a force control mode, such that the robot arm exerts a force control over the object with the force set in the motion information acquired by the motion information acquiring unit;
correcting, by a motion correction unit implemented by a processor, the motion information in accordance with the correction motion information at each time acquired by the correction motion information acquiring unit while the control unit is controlling the robot arm in the force control mode; and
generating, by a control rule generation unit implemented by a processor, a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other, wherein
the motion of the robot arm is controlled based on the control rule generated by the control rule generating unit, while referring to the environment information acquired by the environment information acquiring unit.

10. A robot, comprising
the robot arm, and
the control apparatus for a robot arm according to claim 1 for controlling the robot arm.

11. A control program being stored on a non-transitory computer readable medium for a robot arm for controlling a motion of the robot arm, for causing a computer to execute the steps of:
acquiring, by a motion information acquiring unit, motion information, from a motion information database having stored therein as the motion information in a time-oriented manner a force that the robot arm applies to an object as being corresponding to the motion;
acquiring, by a correction motion information acquiring unit, correction motion information relating to the motion information acquired by the motion information acquiring unit and as to a force that the robot arm applies, when a person corrects the motion of the robot arm by manipulating the robot arm;
acquiring, by an environment information acquiring unit, environment information being information as to the object on which the robot arm acts upon, in accordance with an environmental change reporting manipulation of the person to the robot arm;
controlling, by a control unit, the robot arm in a force control mode, such that the robot arm exerts a force control over the object with the force set in the motion information acquired by the motion information acquiring unit;
correcting, by a motion correction unit, the motion information in accordance with the correction motion information at each time acquired by the correction motion information acquiring unit while the control unit is controlling the robot arm in the force control mode;
generating, by a control rule generating unit, a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other; and
controlling the motion of the robot arm based on the control rule generated by the control rule generating unit, while referring to the environment information acquired by the environment information acquiring unit.

12. A robot arm control-purpose integrated electronic circuit for controlling a motion of a robot arm, comprising:
acquiring, by a motion information acquiring unit, motion information, from a motion information database having stored therein as the motion information in a time-oriented manner a force that the robot arm applies to an object as being corresponding to the motion;
acquiring, by a correction motion information acquiring unit, correction motion information relating to the motion information acquired by the motion information acquiring unit and as to a force that the robot arm applies, when a person corrects the motion of the robot arm by manipulating the robot arm;
acquiring, by an environment information acquiring unit, environment information being information as to the object on which the robot arm acts upon, in accordance with an environmental change reporting manipulation of the person to the robot arm;
controlling, by a control unit, the robot arm in a force control mode, such that the robot arm exerts a force control over the object with the force set in the motion information acquired by the motion information acquiring unit;

correcting, by a motion correction unit, the motion information in accordance with the correction motion information at each time acquired by the correction motion information acquiring unit while the control unit is controlling the robot arm in the force control mode;

generating, by a control rule generating unit, a control rule for allowing the robot arm to automatically operate, by determining the environment information to be acquired by the environment information acquiring unit in accordance with the environmental change reporting manipulation of the person to the robot arm, and by associating the motion information corrected by the motion correction unit and the environment information acquired by the environment information acquiring unit with each other; and controlling the motion of the robot arm based on the control rule generated by the control rule generating unit, while referring to the environment information acquired by the environment information acquiring unit.

* * * * *